(12) United States Patent
Suzuki et al.

(10) Patent No.: US 12,461,647 B2
(45) Date of Patent: Nov. 4, 2025

(54) PORTABLE TERMINAL DEVICE

(71) Applicant: MAXELL, LTD., Kyoto (JP)

(72) Inventors: Motoyuki Suzuki, Kyoto (JP);
Yasunobu Hashimoto, Kyoto (JP);
Kazuhiko Yoshizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/610,490

(22) Filed: Mar. 20, 2024

(65) Prior Publication Data

US 2024/0231595 A1 Jul. 11, 2024

Related U.S. Application Data

(63) Continuation of application No. 17/691,520, filed on Mar. 10, 2022, now abandoned, which is a
(Continued)

(30) Foreign Application Priority Data

Apr. 19, 2016 (JP) ................................ 2016-083539
May 9, 2016 (JP) ................................ 2016-093789

(51) Int. Cl.
*G06F 3/0485* (2022.01)
*G06F 3/0346* (2013.01)
(Continued)

(52) U.S. Cl.
CPC .......... *G06F 3/0485* (2013.01); *G06F 3/0346* (2013.01); *G06F 3/04817* (2013.01); *G06F 3/0488* (2013.01)

(58) Field of Classification Search
CPC .. G06F 3/0485; G06F 3/0346; G06F 3/04817; G06F 3/0488
See application file for complete search history.

(56) References Cited

U.S. PATENT DOCUMENTS

| 6,259,432 B1 | 7/2001 | Yamada |
| 2009/0024314 A1 | 1/2009 | Kim |
| (Continued) | | |

FOREIGN PATENT DOCUMENTS

| CN | 101464777 A | 6/2009 |
| CN | 103324426 A | 9/2013 |
| (Continued) | | |

OTHER PUBLICATIONS

International Search Report of PCT/JP2017/015661 dated Jun. 6, 2017.
(Continued)

*Primary Examiner* — Andrew T Chiusano
(74) *Attorney, Agent, or Firm* — MATTINGLY & MALUR, PC

(57) ABSTRACT

Provided is a portable terminal device capable of realizing more preferable usability. The portable terminal device includes a display displaying information such as content on a display screen; a detector detecting a pressing onto the display screen; a tilt angle detector detecting a tilt angle of the portable terminal device; and a display controller performing control for changing a display range of display information displayed on the display screen. The display controller sets, as a reference angle θ0, a tilt angle detected when a pressing having a strength equal to or more than a predetermined value is detected, and controls scrolls so as to change the display range of the display information in the display screen in accordance with a value of a difference between the reference angle θ0 and a tilt angle θn detected in a pressing-held state.

20 Claims, 43 Drawing Sheets

Related U.S. Application Data continuation of application No. 16/094,211, filed as application No. PCT/JP2017/015661 on Apr. 19, 2017, now abandoned.

(51) Int. Cl.
*G06F 3/04817* (2022.01)
*G06F 3/0488* (2022.01)

(56) References Cited

U.S. PATENT DOCUMENTS

| | | | |
|---|---|---|---|
| 2009/0128484 A1 | 5/2009 | Hanyu | |
| 2009/0160793 A1 | 6/2009 | Rekimoto | |
| 2009/0303204 A1 | 12/2009 | Nasiri | |
| 2010/0134312 A1* | 6/2010 | Park | G06F 3/038 345/169 |
| 2010/0279738 A1 | 11/2010 | Kim | |
| 2013/0254705 A1* | 9/2013 | Mooring | G06F 3/0488 715/784 |
| 2013/0257768 A1 | 10/2013 | Lee | |
| 2014/0002374 A1* | 1/2014 | Hunt | G06F 3/0488 345/173 |
| 2014/0139471 A1 | 5/2014 | Matsuki | |
| 2014/0152581 A1* | 6/2014 | Case | G06F 3/041 345/173 |
| 2014/0210729 A1 | 7/2014 | Chattopadhyay | |
| 2014/0215398 A1* | 7/2014 | Fleizach | G06F 3/0487 715/823 |
| 2016/0224220 A1 | 8/2016 | Ganguly | |
| 2016/0266761 A1 | 9/2016 | Kuwabara | |
| 2017/0003796 A1* | 1/2017 | Kono | G06F 1/169 |

FOREIGN PATENT DOCUMENTS

| | | |
|---|---|---|
| CN | 104737221 A | 6/2015 |
| JP | 2002-109557 A | 4/2002 |
| JP | 2002-213989 W | 7/2002 |
| JP | 2007-310888 W | 11/2007 |
| JP | 2009-110178 A | 5/2009 |
| JP | 2011-076349 A | 4/2011 |
| JP | 2012-048583 A | 3/2012 |
| JP | 2012-230573 W | 11/2012 |
| JP | 2012-247861 W | 12/2012 |

OTHER PUBLICATIONS

Japanese Office Action received in corresponding Japanese Application No. 2016-083539 dated Mar. 17, 2020.
Japanese Office Action received in corresponding Japanese Application No. 2020-109266 dated Jul. 13, 2021.
Chinese Office Action received in corresponding Chinese Application No. 201780024655.4 dated Dec. 8, 2021.
Japanese Office Action received in corresponding Japanese Application No. 2020-109266 dated Mar. 29, 2022.
Nakai, Y. et al., "Tangential Force Input of Touch Panel Using Shear Force Deformation of Elastic Material: Discrimination of Force and Swipe Input", Entertainment Computing Symposium, Information Processing Society of Japan, Oct. 27, 2015, pp. 116-121 with partial translation.

* cited by examiner

FIG. 1
EMBODIMENT 1
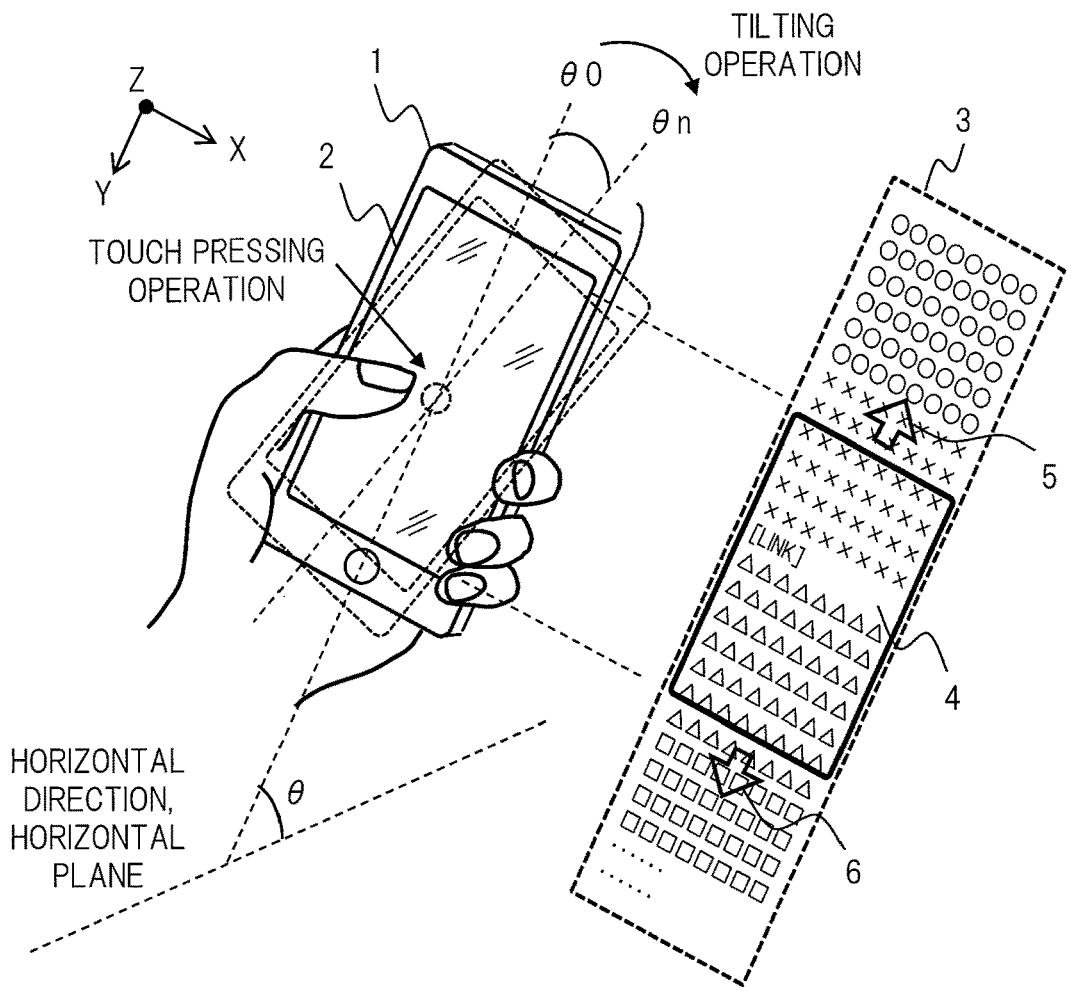
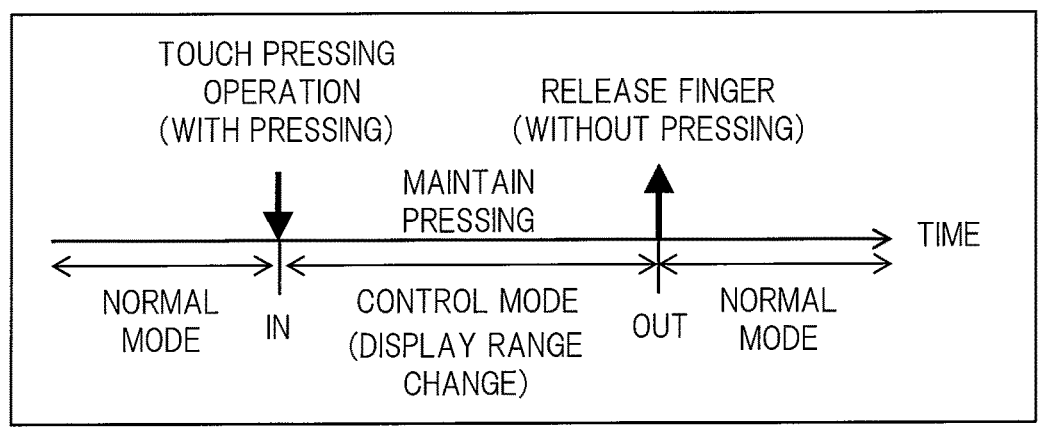
1: CASING
2: DISPLAY SCREEN
3: DISPLAY INFORMATION
4: DISPLAY RANGE
5,6: SCROLL
$\theta$ : ANGLE
$\theta 0$ : REFERENCE ANGLE
$\theta n$ : ANGLE

G1~G4: APPLICATION SCREEN

FIG. 19
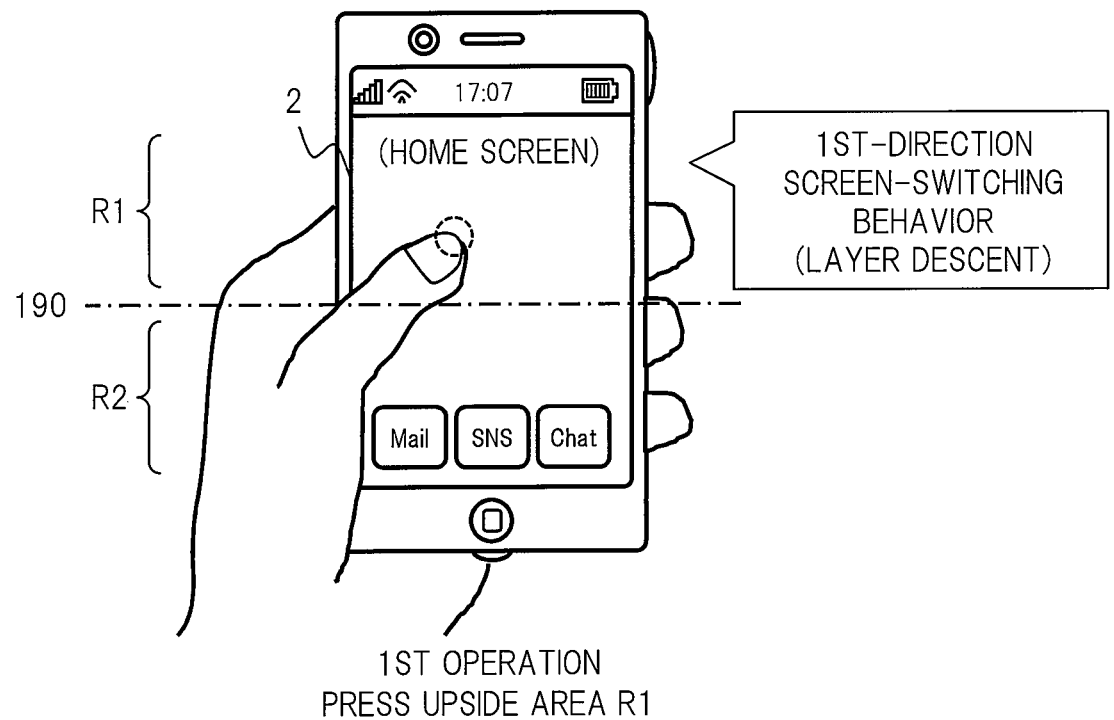
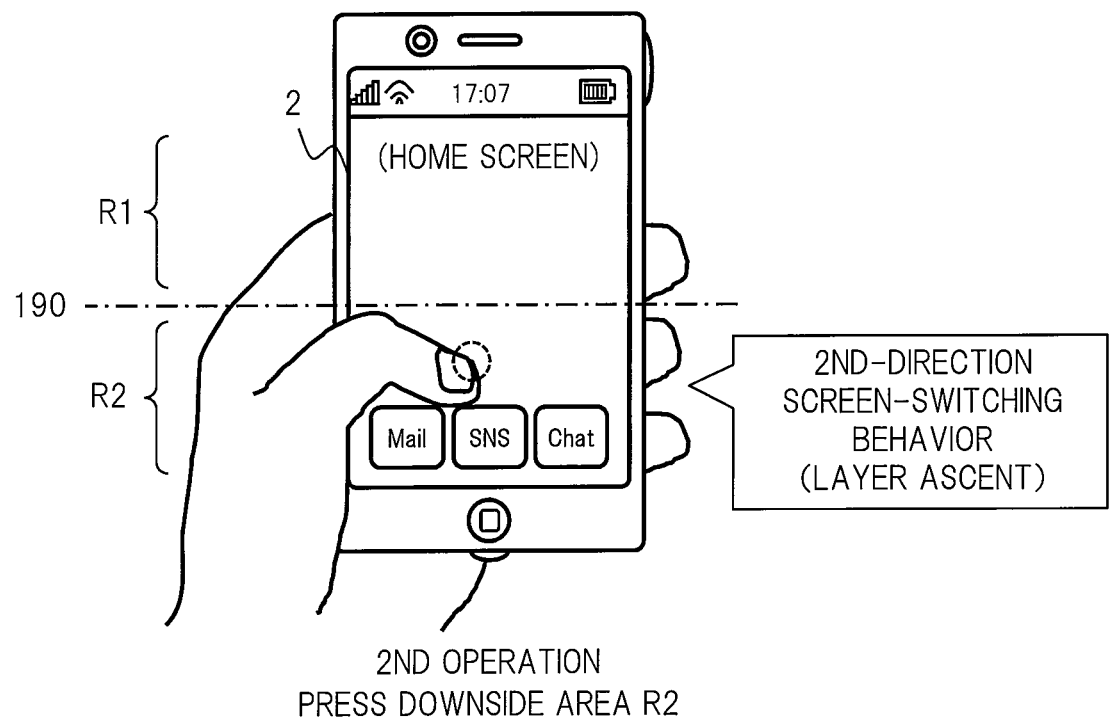

FIG. 26
FRONT SURFACE
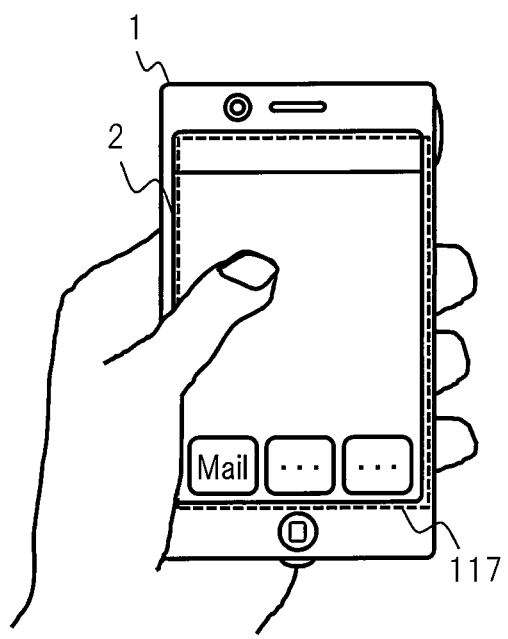
BACK SURFACE
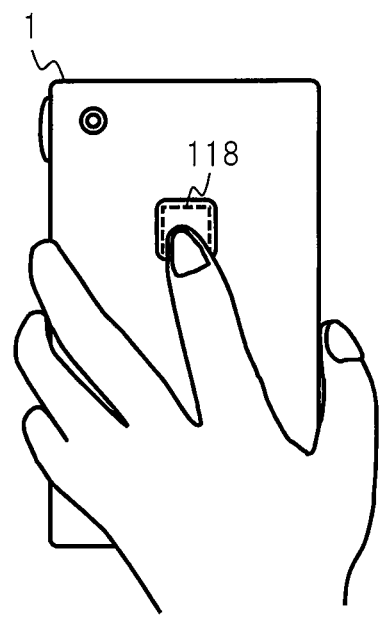

1ST ARRANGEMENT STATE

2ND ARRANGEMENT STATE

1ST PRESSING OPERATION

ICON ARRANGEMENT CHANGE BEHAVIOR (ROTATINGLY MOVEMENT: CLOCKWISE)

PORTABLE TERMINAL DEVICE

TECHNICAL FIELD

The present invention relates to a technique of a portable terminal device. The present invention also relates to a user interface technique for a display screen.

BACKGROUND ART

A portable terminal device such as a smartphone that allows an input operation by a touch of a user's finger(s) or the like onto a display screen of a touch panel has become widespread. The portable terminal device controls display of content etc. in the display screen in accordance with a touch input operation. The portable terminal device acquires content information from, for example, the Internet in accordance with the input operation, and displays it on the display screen. At that time, the portable terminal device displays a part of display information of the content if the entire content cannot be displayed within the display screen. The portable terminal device accepts various operations such as tap, swipe, flick, and pinch operations as a touch input operation in the display screen. For example, in a case of the swipe operation, a user touches the display screen with the finger(s), moves it under a touching state, and releases the finger therefrom. In a case of the flick operation, the user quickly moves the finger after touching the display screen with the finger, and then releases the finger therefrom. The portable terminal device scrolls etc. a display range of the content in the display screen in accordance with the touch input operation. Consequently, the user can browse etc. other parts of the content or the entire content on the display screen.

Additionally, the portable terminal device is provided with a screen called a basic operation screen, a home screen, or the like. For example, arranged on the home screen are icons of a plurality of applications such as mails and browsers. The portable terminal device may also be provided with a plurality of home screens. When an icon(s) is selected by the input operation on the home screen, the application associated with the icon is executed and an application screen is displayed. When the plural applications are executed, the portable terminal device is provided with a plurality of application screens. Displayed on the application screen is the whole or a part of the content etc. The user can switch, by the touch input operation, a display range of the home screen or the like displayed in the display screen.

Japanese Patent Application Laid-Open No. 2011-76349 (Patent Document 1) is recited as a related art example about a user interface of the portable terminal device as described above. Patent Document 1 discloses the following as a mobile information terminal etc. The mobile information terminal detects its own tilt, generates tilt information indicating a direction and magnitude (inclination) of the tilt, and changes a display image(s) based on the tilt information about the tilt detected in a state in which the touch due to the touch operation onto the screen is maintained.

Additionally, a touch panel and a portable terminal device, which include not only a touch sensor but also a pressing sensor capable of detecting a pressing state, have been recently realized.

RELATED ART DOCUMENTS

Patent Documents

Patent Document 1: Japanese Patent Application Laid-open No. 2011-76349

SUMMARY OF THE INVENTION

Problems to be Solved by the Invention

However, a size of the display screen of the portable terminal device is limited. Consequently, when a size of content display information is large or many home screens etc. exist, only a part of the content or a part of the plural screens becomes the display range on the display screen. When the user wishes to browse etc. a part or the entirety of the desired content and/or screen, scrolling etc. the display range need to repeat the touch input operation such as a swipe operation many times. Repeating the touch input operation many times is troublesome, and places a burden also on a user's body. Additionally, when many icons etc. are arranged on the display screen, the user performs an operation of searching for the desired icon etc. and touching a spot of the searched icon, but the user's finger may not reach the spot in performing such an operation. In this case, attainment of the above operation as a user's purpose needs to handle a change of a state of a user's hand holding the terminal, an operation of the terminal by user's both hands, or the like, thereby taking time and effort.

When a technique like Patent Document 1 is used, the user touches a display screen of a substantially tabular terminal in a horizontal state to tilt it by an angle, thereby making it possible to scroll etc. the display image. However, a tilt state of the terminal and a state of the holding hand or/and the finger are variously changed in accordance with individual users, a situation, a purposed operation(s), or the like. When viewing the display screen in the state of holding the terminal in the hand, the user may always make, in many cases, the terminal a state of slantwise tilting an up-down direction of the display screen with respect to a horizontal ground in accordance with a visual line and the holding hand of the user. Consequently, the technique like Patent Document 1 cannot suitably adapt to various states, and may often make it difficult to visually recognize the content of the display screen, may perform the scroll operation by the unintended touch, or the like, thus having room for improvement in terms of usability.

An object of the present invention is to provide, regarding the techniques of the portable terminal device and the user interface with respect to the display screen, a technique which can realize a change of the display range of the content etc. with less time and labor correspondingly to the various states of the user and can realize more preferable usability.

Means for Solving the Problems

A representative embodiment of the present invention is a portable terminal device, which is characterized by configurations described later.

A portable terminal device according to an embodiment includes: a display displaying information on a display screen; a pressing detector detecting a pressing onto the display screen; and a display controller performing control for changing a display range of the information displayed on the display screen, wherein when a pressing having a strength equal to or more than a predetermined value is detected, the display controller changes the display range of the information displayed on the display screen in a state in which the pressing is held.

A portable terminal device according to an embodiment includes: a display displaying information on a display screen; a pressing detector detecting a pressing onto the display screen; and a display controller performing control for changing a display range of the information displayed on the display screen, wherein the display controller changes the display range in a state in which a first pressing having a strength equal to or more than a predetermined value is detected by the pressing detector and then the first pressing is not held.

Effects of the Invention

The representative embodiment of the present invention can realize, regarding the techniques of the portable terminal device and the user interface with respect to the display screen, the change of the display range of the content etc. with less time and effort correspondingly to the various states of the user, and can realize more preferable usability.

BRIEF DESCRIPTIONS OF THE DRAWINGS

FIG. 1 is a diagram showing a configuration outline of a portable terminal device according to Embodiment 1 of the present invention;

FIG. 19 is a diagram showing display control in a portable terminal device according to Embodiment 3 of the present invention;

Figures 23A, 23B:
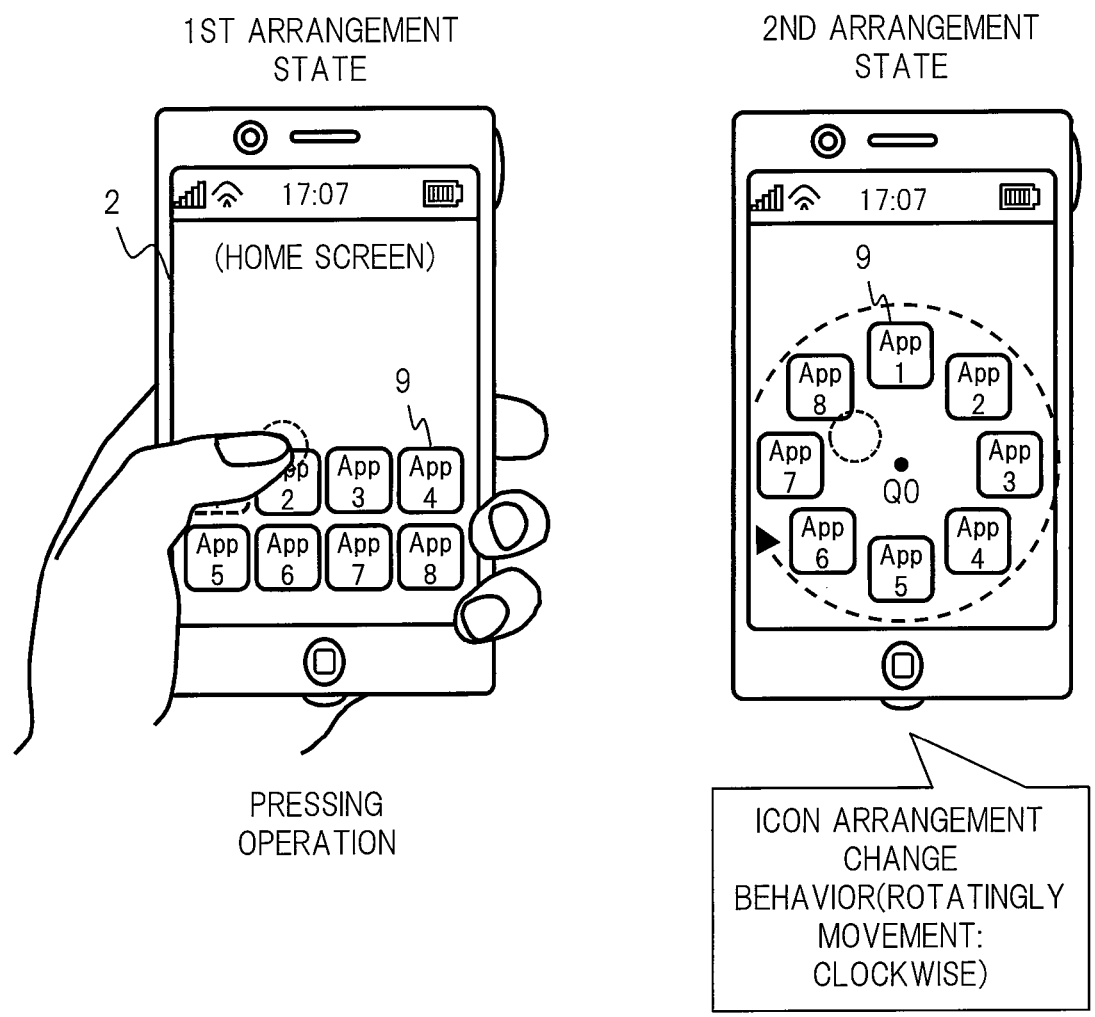
Figure 24:
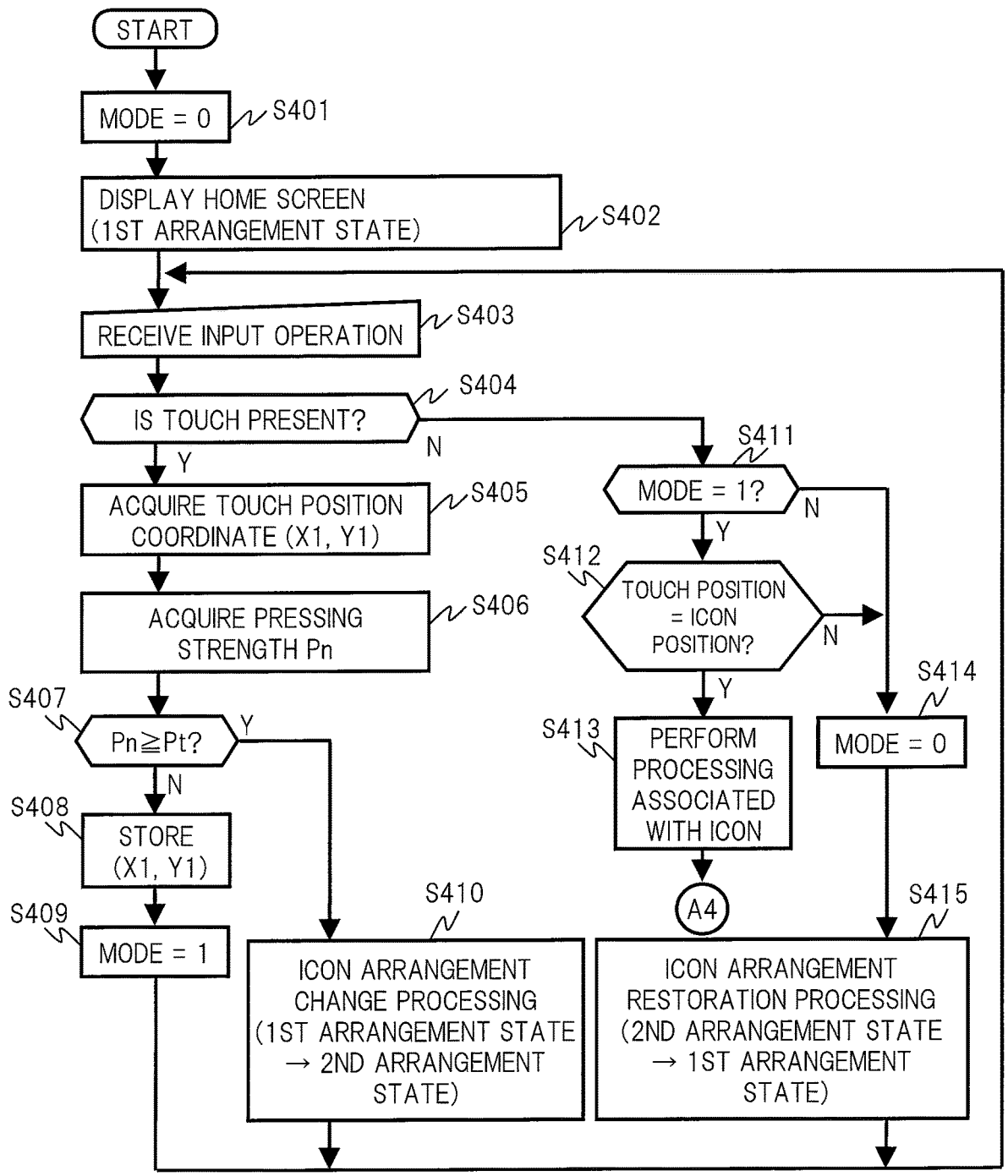
Figure 25:
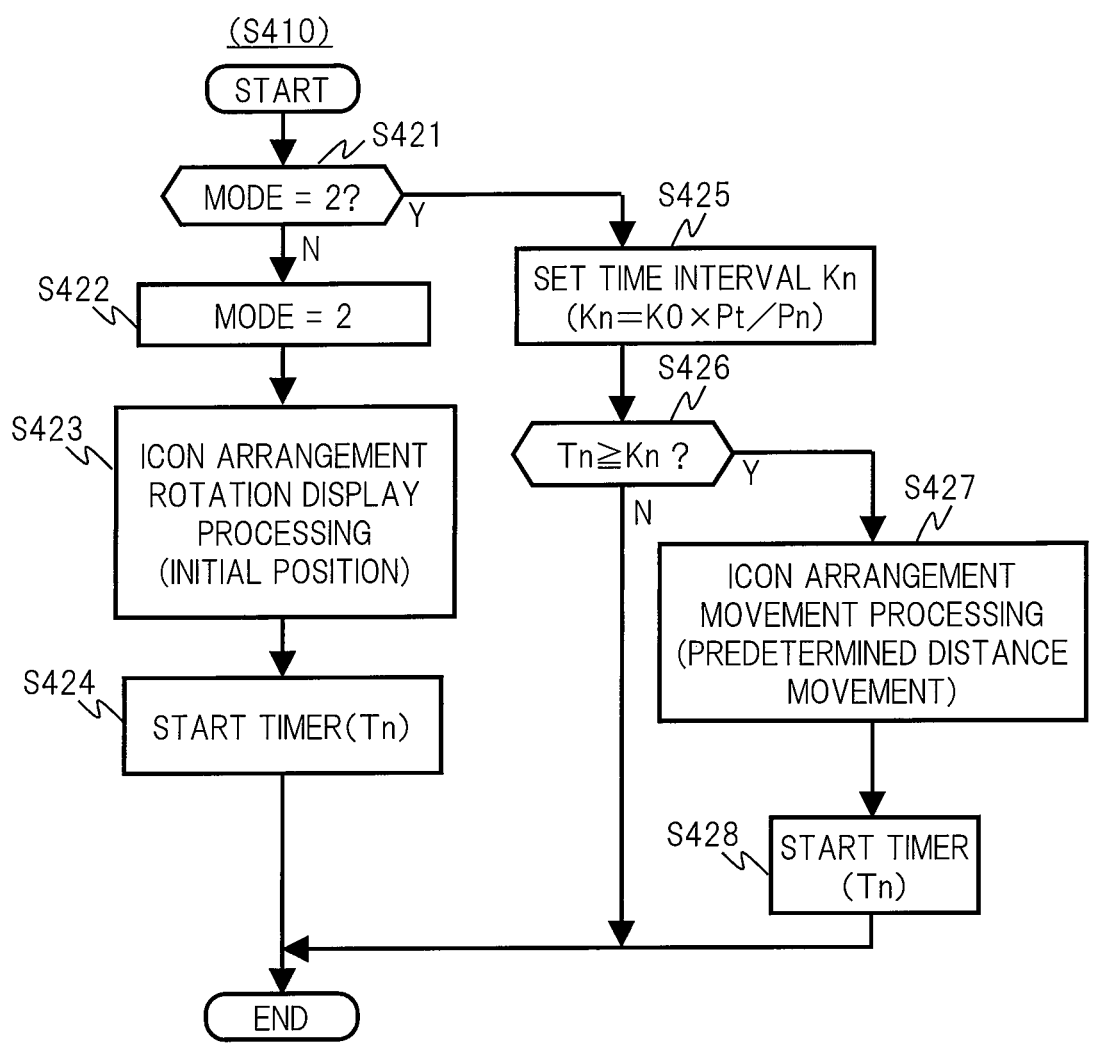
Figure 27:
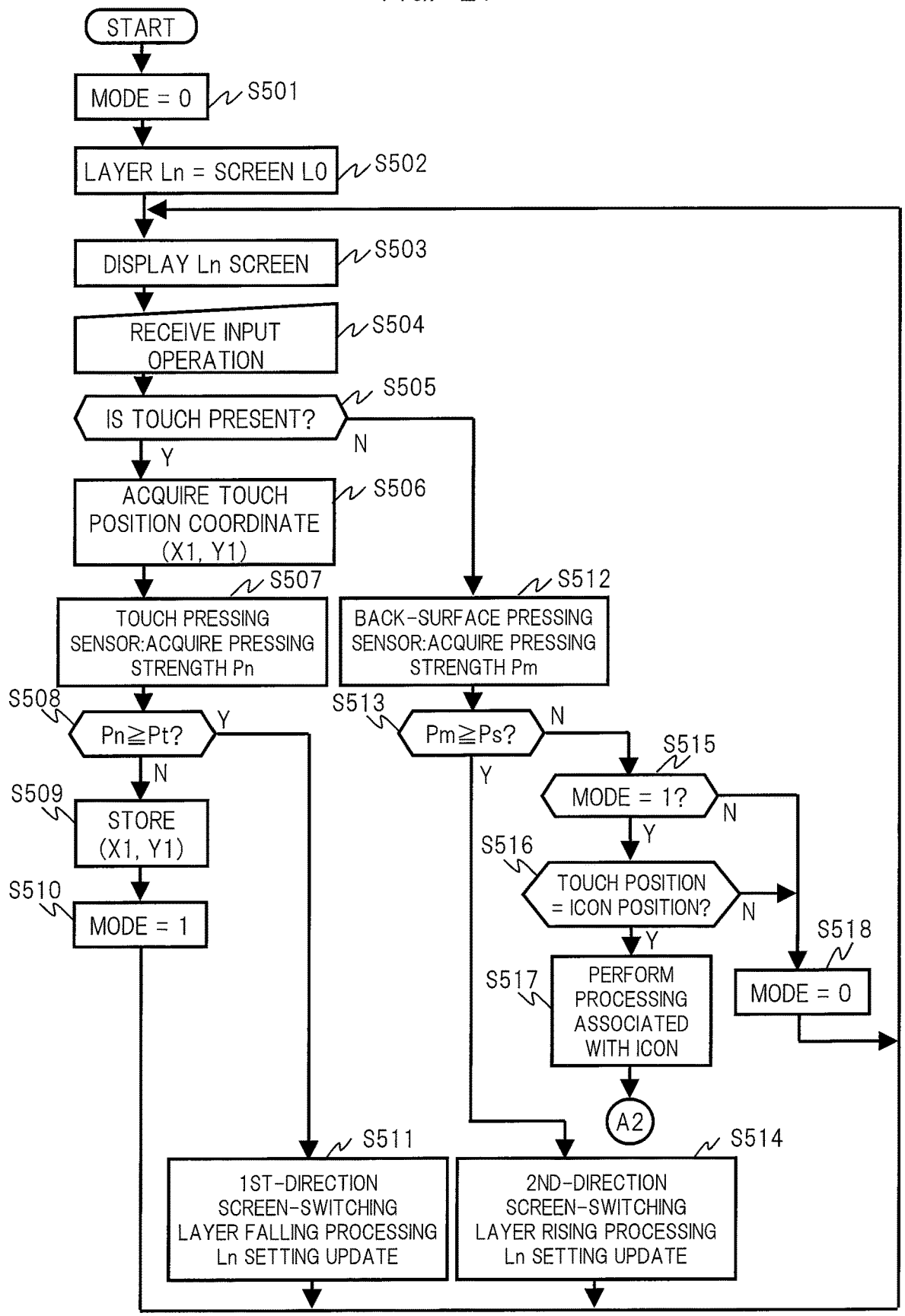
Figure 28:
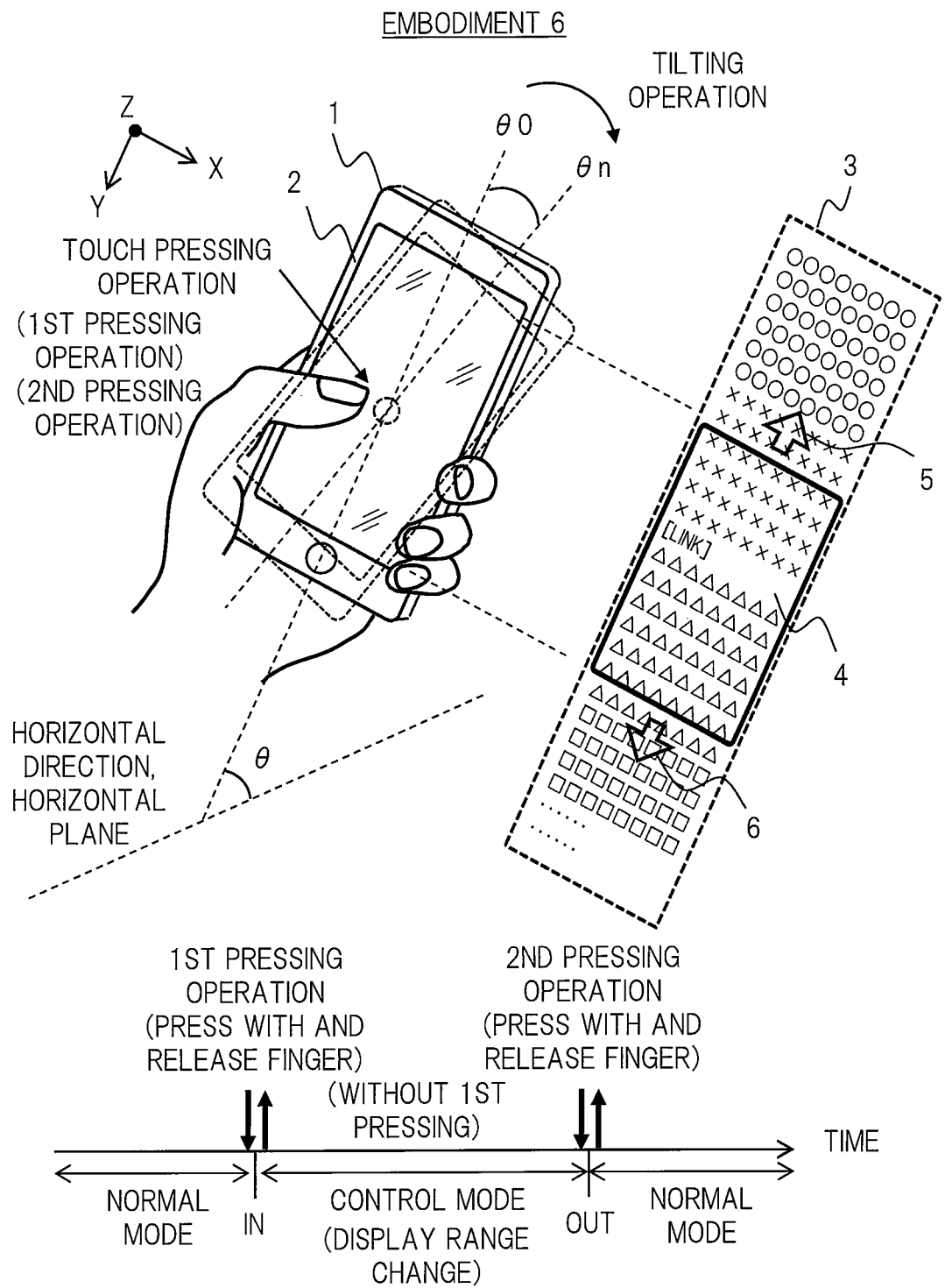
Figure 29:
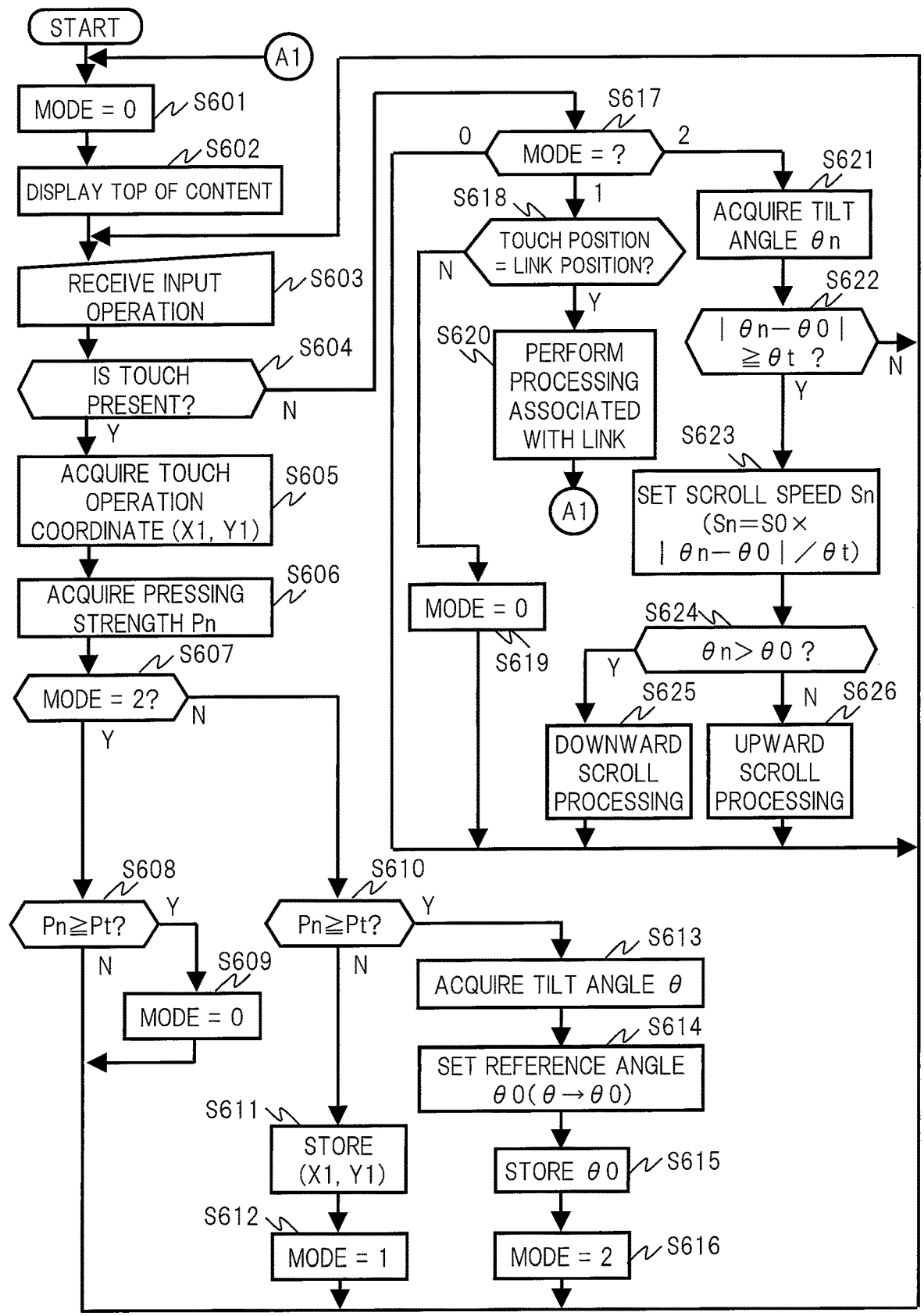
Figure 30:
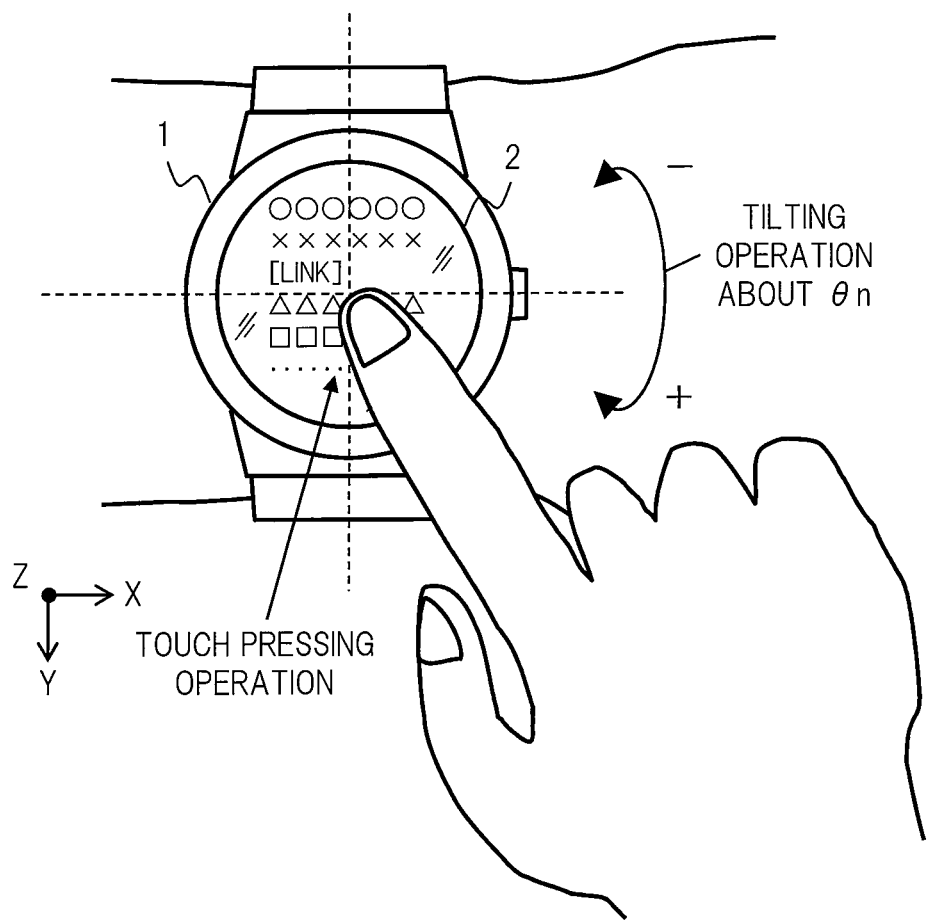
Figure 31:
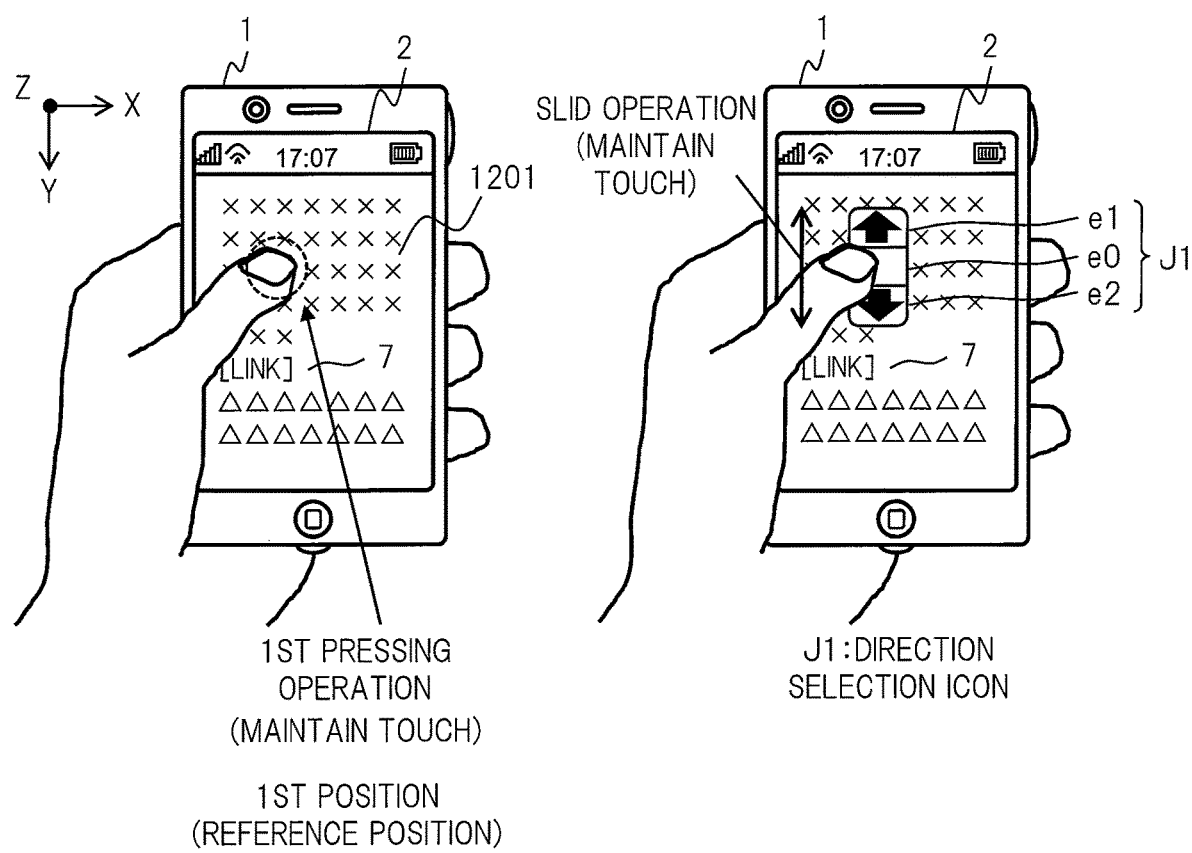
Figure 32:
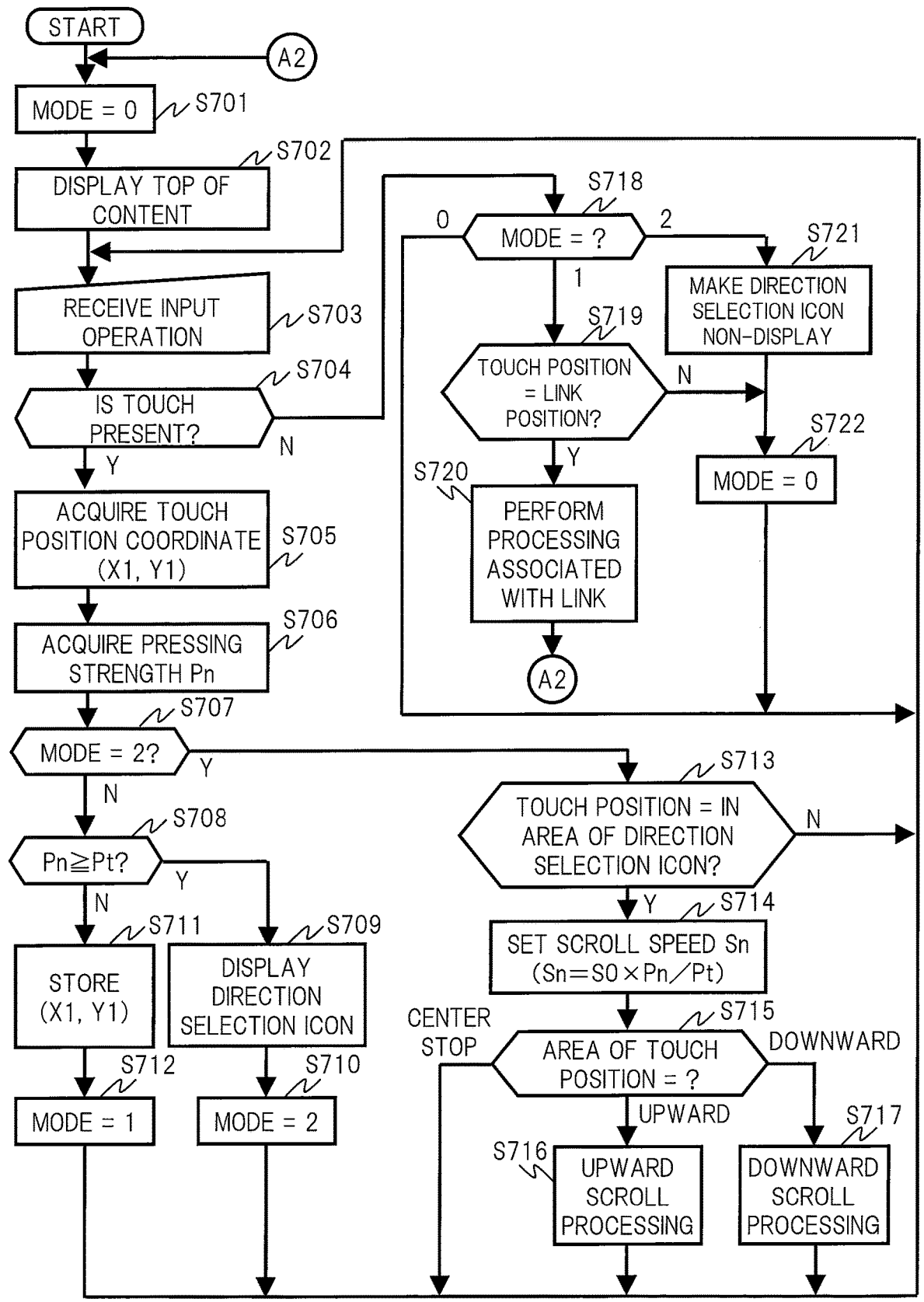
Figure 33:
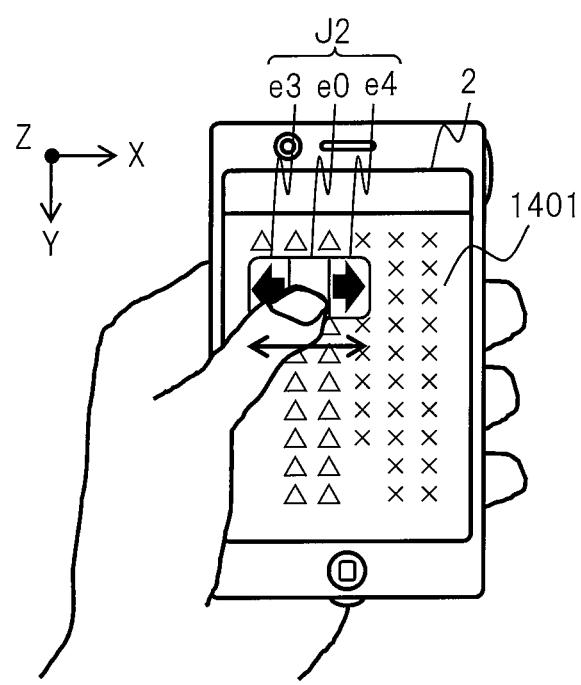
Figure 34:
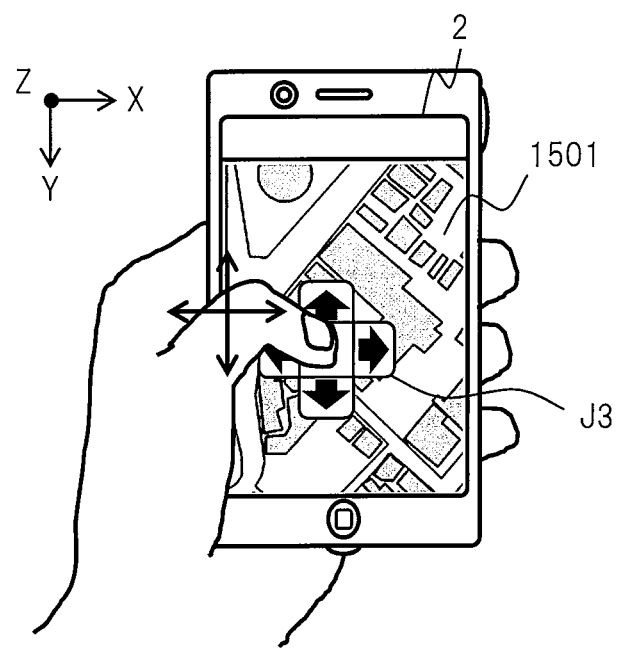
Figure 35:
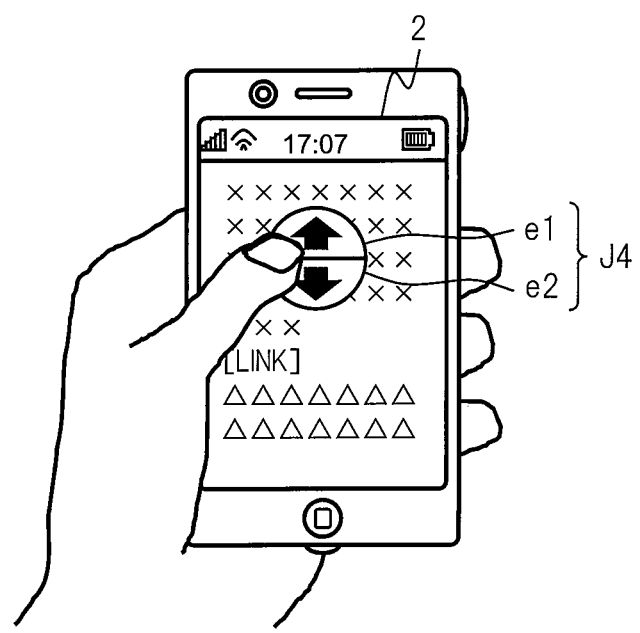
Figure 36:
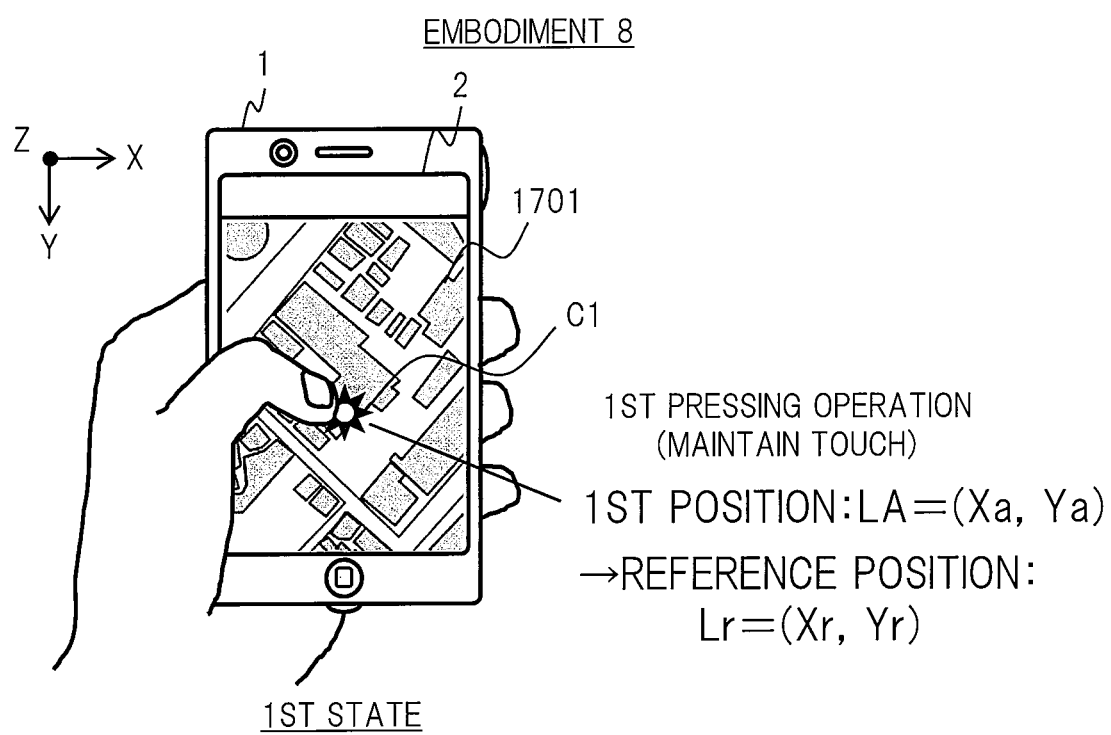
Figure 37:
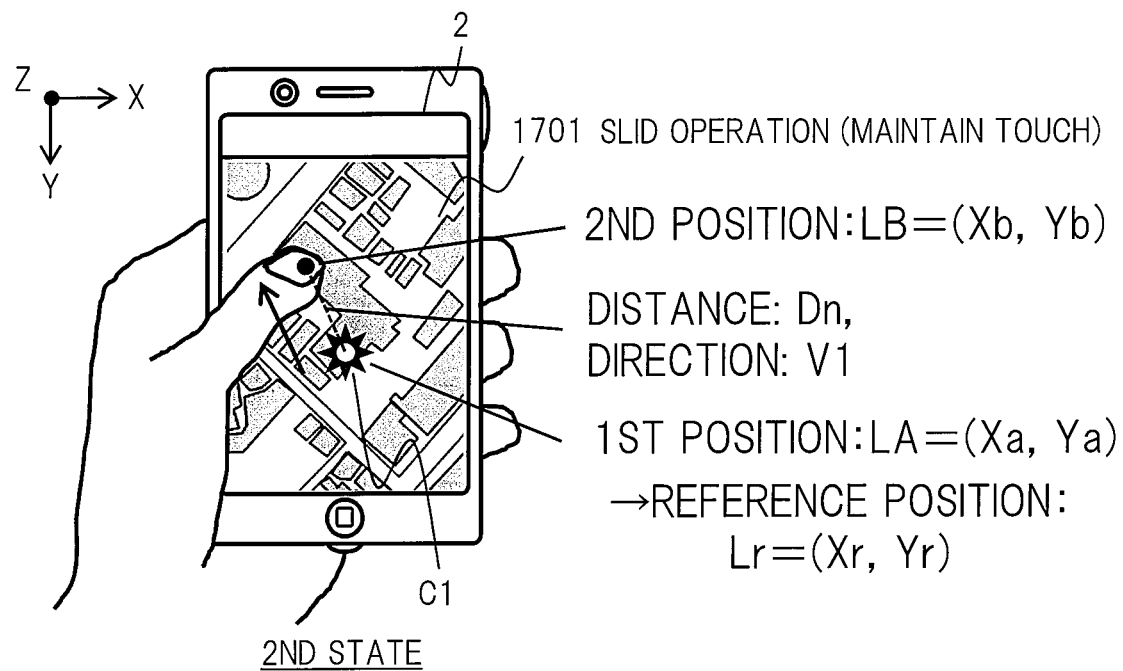
Figure 38:
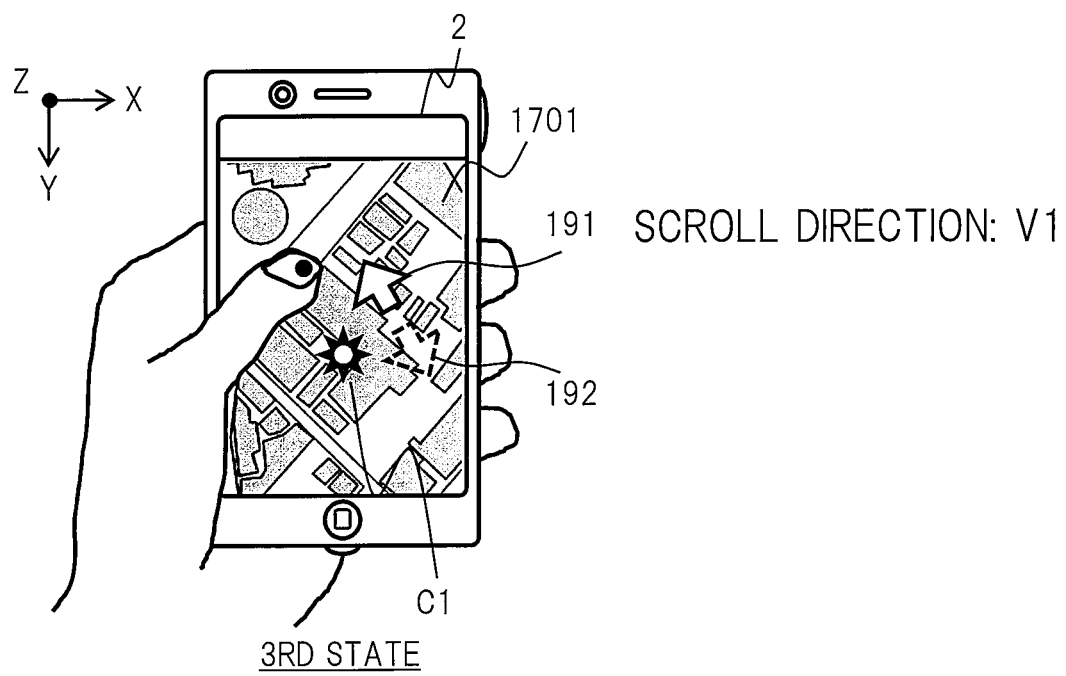
Figure 39:
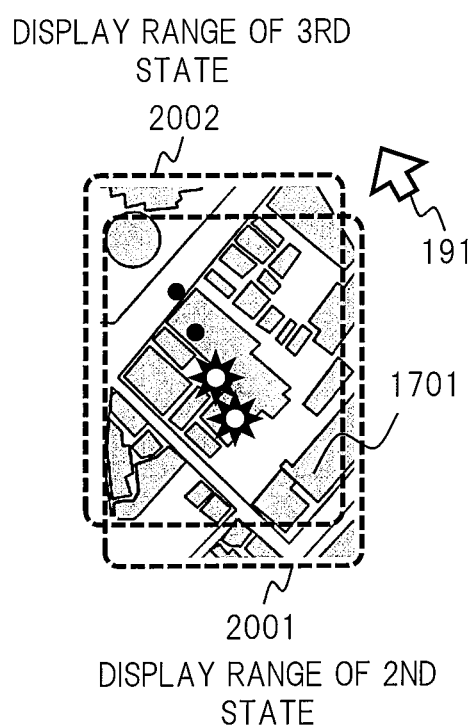
Figure 40:
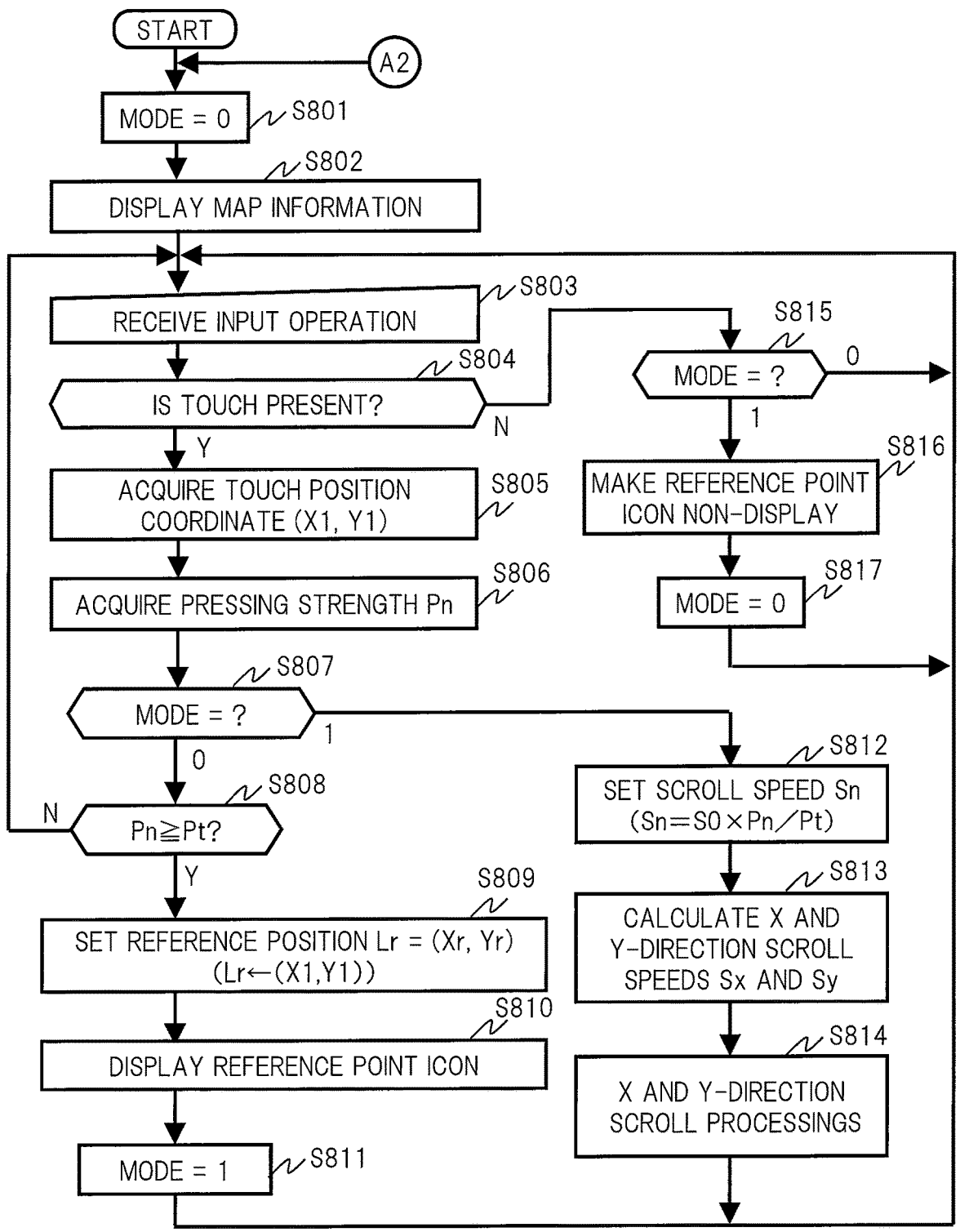
Figure 41:
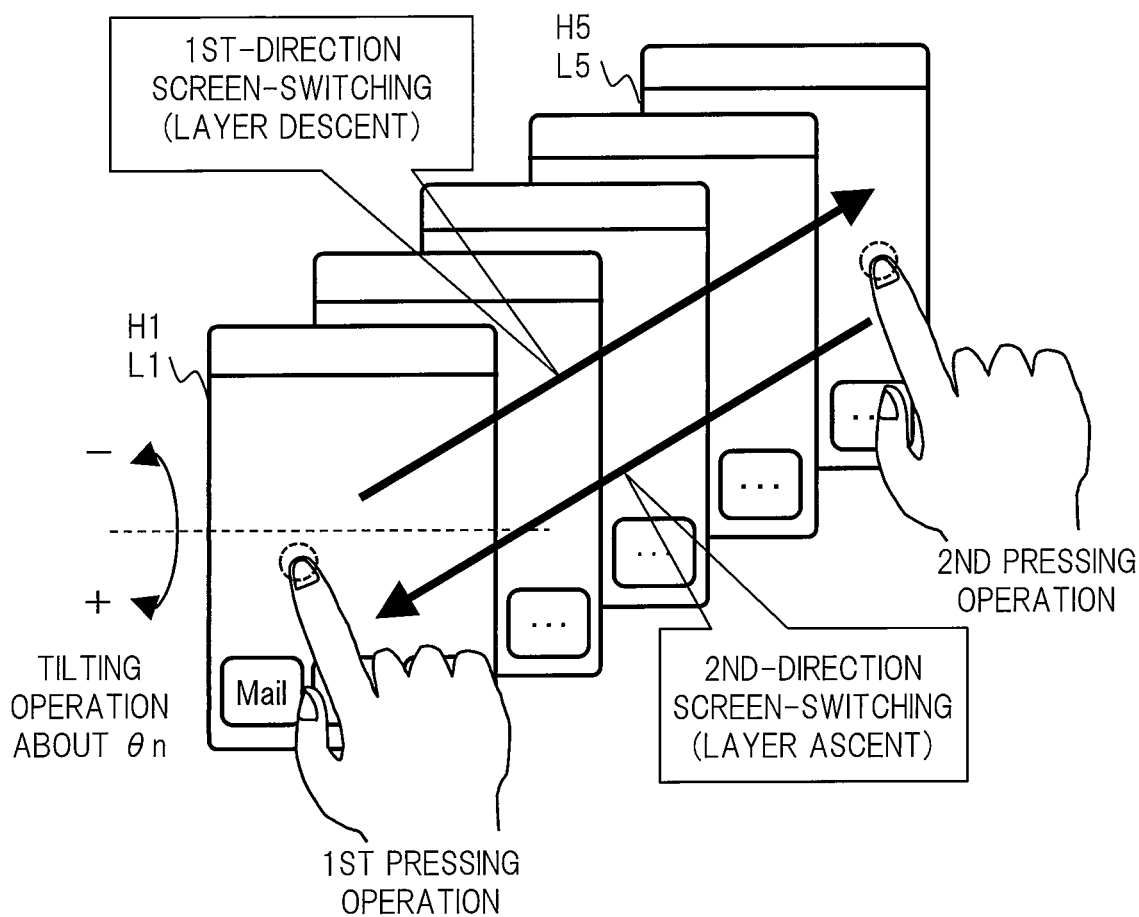
Figure 42:
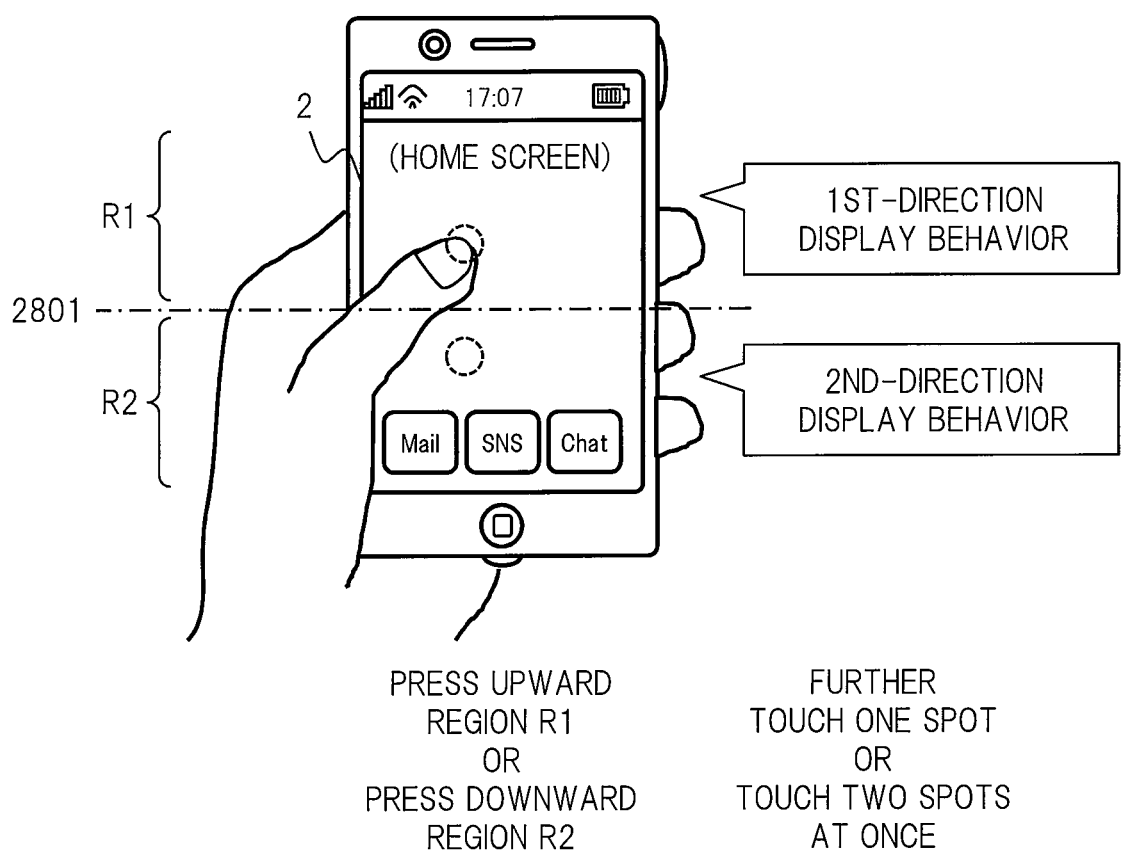
Figure 43:
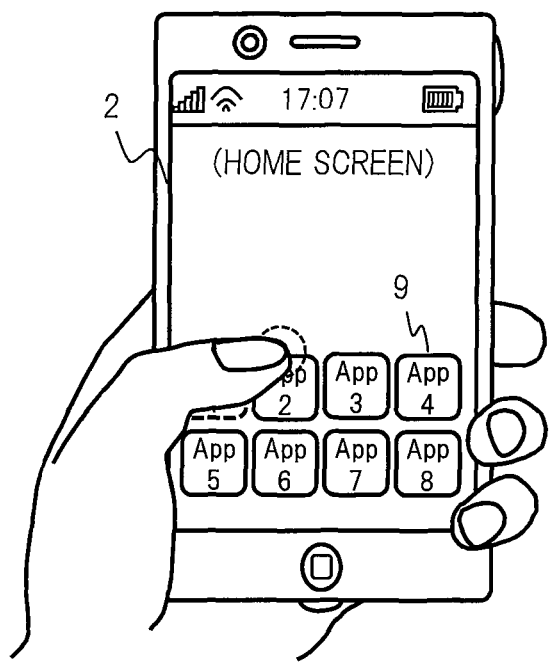
Figure 43:
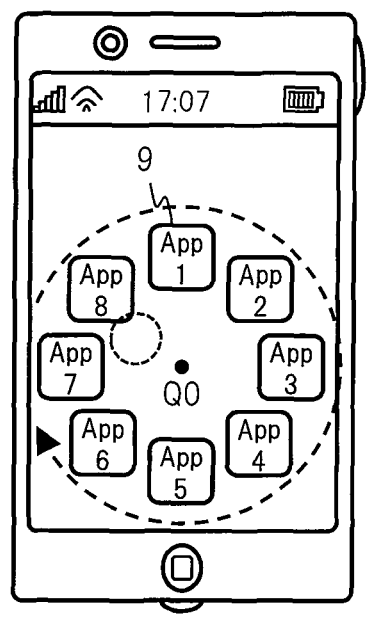

FIGS. 22(a)-22(d) are diagrams showing operations corresponding to left and right hands in the portable terminal device according to Embodiment 3;

FIGS. 23(a)-23(b) are diagrams showing display control in a portable terminal device according to Embodiment 4 of the present invention;

FIG. 24 is a diagram showing a flow of a control processing in the portable terminal device according to Embodiment 4;

FIG. 25 is a diagram showing a flow of an icon arrangement change processing in the portable terminal device according to Embodiment 4;

FIG. 26 is a diagram showing an appearance and an operation in a portable terminal device according to Embodiment 5 of the present invention;

FIG. 27 is a diagram showing a flow of a control processing in the portable terminal device according to Embodiment 5;

FIG. 28 is a diagram showing a configuration outline of a portable terminal device according to Embodiment 6 of the present invention;

FIG. 29 is a diagram showing a flow of a control processing in the portable terminal device according to Embodiment 6;

FIG. 30 is a diagram showing a case of being applied to a smart watch in the portable terminal device according to Embodiment 6;

FIG. 31 is a diagram showing an operation and display control as a configuration outline of a portable terminal device according to Embodiment 7 of the present invention;

FIG. 32 is a diagram showing a flow of a control processing in the portable terminal device according to Embodiment 7;

FIG. 33 is a diagram showing display control of a portable terminal device that is a first modification example of Embodiment 7;

FIG. 34 is a diagram showing display control of a portable terminal device that is a second modification example of Embodiment 7;

FIG. 35 is a diagram showing display control of a portable terminal device that is a third modification example of Embodiment 7;

FIG. 36 is a diagram showing a first state of an operation and display control as a configuration outline of a portable terminal device according to Embodiment 8 of the present invention;

FIG. 37 is a diagram showing a second state of an operation and display control in the portable terminal device according to Embodiment 8;

FIG. 38 is a diagram showing a third state in the portable terminal device according to Embodiment 8;

FIG. 39 is a diagram showing a change of a display range in the portable terminal device according to Embodiment 8;

FIG. 40 is a diagram showing a flow of a control processing in the portable terminal device according to Embodiment 8;

FIG. 41 is a diagram showing display control in a portable terminal device according to Embodiment 9 of the present invention;

FIG. 42 is a diagram showing a distinction between positions and the number of touch-pressing operations in a portable terminal device that is a modification example of Embodiment 9; and FIGS. 43(a)-43(b) are diagrams showing display control for arrangement of a plurality of icons in a portable terminal device according to Embodiment 10 of the present invention.

DETAILED DESCRIPTION OF PREFERRED EMBODIMENTS

Hereinafter, embodiments of the present invention will be detailed with reference to the drawings. Incidentally, in all the drawings for explaining the embodiments, the same reference numerals are attached in principle to the same parts, and repeated descriptions thereof will be omitted.

Embodiment 1

Described with reference to FIGS. 1 to 10 will be a portable terminal device according to Embodiment 1 of the present invention.
[Configuration Outline]

FIG. 1 shows a configuration outline of a portable terminal device according to Embodiment 1. FIG. 1 shows a state in which a user holds a casing 1 of a portable terminal device in his/her left hand and touches and presses a spot in a display screen 2 with his/her thumb. The portable terminal device is in a state of inclining with an absolute tilt angle θ with respect to a horizontal plane and/or a horizontal direction. Some of all pieces of display information 3 on content etc. are displayed, as a display range 4, on the display screen 2. Incidentally, X, Y, and Z directions are shown for explanation. The X and Y directions are directions forming each plane of the casing 1, the display screen 2, the display information 3 on the content, and the like. The X direction means a horizontal direction, traverse direction, or right-left direction in the screen. The Y direction means a vertical direction, longitudinal direction, or up-down direction in the screen. The Z direction means a direction perpendicular to the X and Y directions, and means a thickness direction of each of the casing 1 etc.

The portable terminal device includes a display, a touch detector, a pressing detector, a tilt angle detector, and a display controller, etc. The display displays the display information 3 on the content etc. on the display screen 2. The touch detector detects presence or absence of a touch onto the display screen 2, and its position coordinate(s), etc. The pressing detector detects strength etc. of a pressing onto the display screen 2. The tilt angle detector detects an angle θ, and an angle θn, etc. as a tilt angle of the portable terminal device. By the display controller, scrolls 5 and 6 etc. are controlled as control for varying the display range 4 of the display information 3 based on a state of the pressing or tilt angle.

When wishing to browse another part of the contents displayed on the display screen 2, the user touches and presses a spot in the display screen 2 with, for example, the thumb in a handheld state suitable for him/her. At this time, the pressing detector detects the pressing equal to or more than a predetermined value (magnitude). The tilt angle detector detects the tilt angle of the casing 1 at that time. When detecting a predetermined pressing, the display controller sets, as a reference angle θ0, the tilt angle θ detected at the time.

The user performs an operation of tilting the casing 1 while touching and pressing the display screen 2. In other words, the casing 1 is rotated around a predetermined rotation axis and in a predetermined direction. The tilt angle detector similarly detects a tilt angle θn associated with its tilt operation and rotation. The display controller performs control for varying (changing) the display range 4 on the display screen 2 in accordance with magnitude of a difference between the reference angle θ0 and the tilt angle θn detected in a state where the touch and pressing are held. The display controller controls, as its change control, display behaviors such as scrolls 5 and 6 and screen-switching. The scrolls 5 and 6 are behaviors for continuously moving the display range 4, which is displayed on the display screen 2, upward and downward etc. in the Y direction. The screen switching is a behavior for moving the display range 4 so as to switch a part of the content per region or a below-described screen etc. per unit.

The user releases the finger from the display screen 2 in a state in which a place of the desired content or screen is displayed by actions of the scroll 5 and 6 etc. The pressing detector detects a state of having no pressing equal to or more than a predetermined value that time. The display controller stops the scrolls 5 and 6 etc. based on the detection of the state of having no pressing.

A chart on a lower side of FIG. 1 indicates the above control by a time axis. The portable terminal device firstly enters, from a state of a normal mode, a specific control mode when the touch and pressing operations with the pressing equal to or more than the predetermined value are performed onto the display screen 2. At the control mode, the reference angle θ0 is set, and the display range 4 is changed and controlled in accordance with the tilting operation with the pressing maintained. When the user releases the finger therefrom, the touch and pressing operations become a state of having no pressing equal to or more than the predetermined value and the control mode is canceled and the device returns to the normal mode. Thus, the user changes the display range 4 of the contents etc. by a simple operation, thereby being capable of quickly browsing etc. the desired place.
[Portable Terminal Device (1)]

Figure 2:
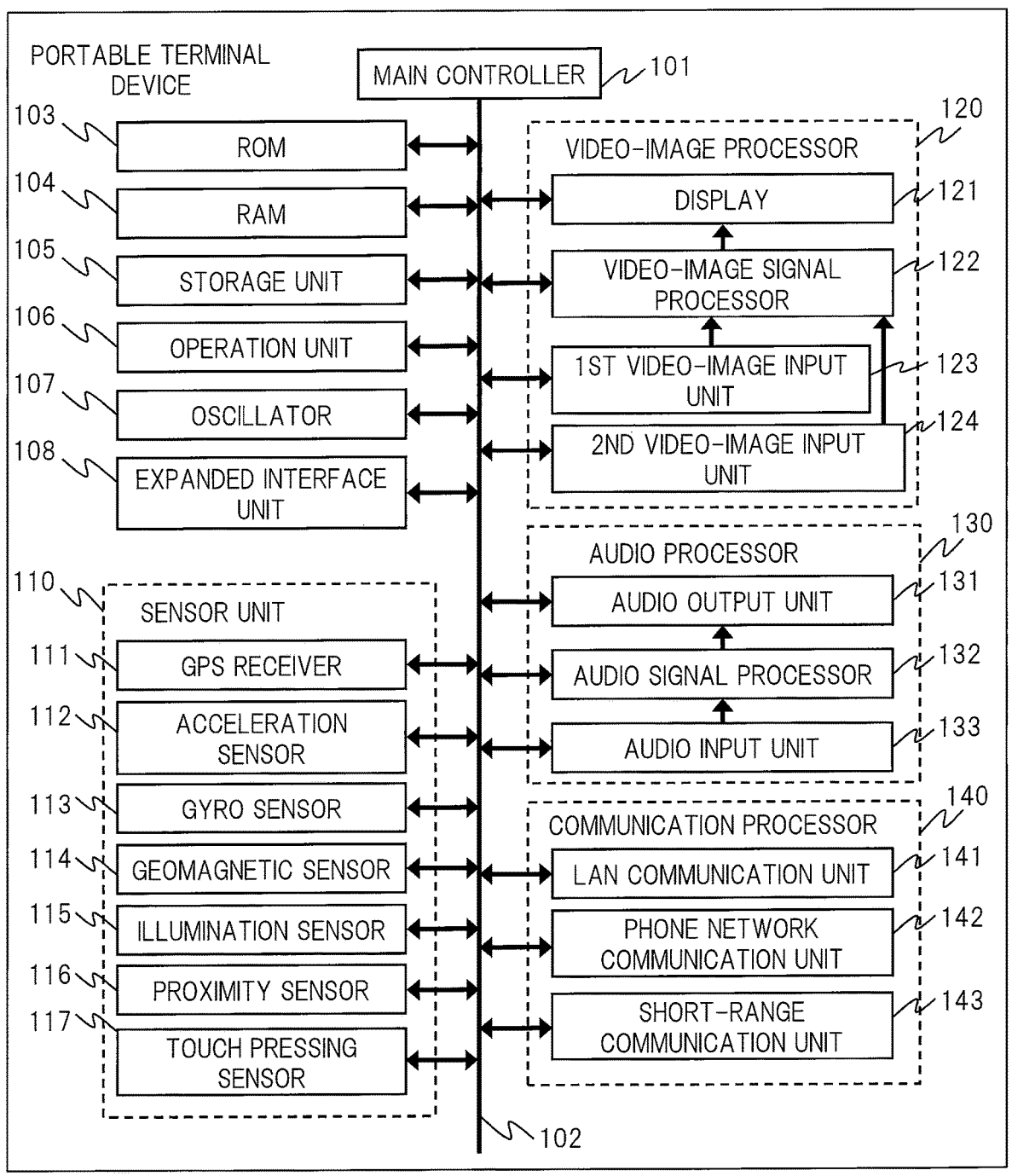
FIG. 2 is a diagram showing a functional block configuration of the portable terminal device according to Embodiment 1.

FIG. 2 shows a functional block configuration of the portable terminal device according to Embodiment 1. The portable terminal device according to Embodiment 1 is a smartphone. Various other portable digital devices such as a mobile phone, a tablet PC, and a PDA are applicable as portable terminal devices.

The portable terminal device according to Embodiment 1 includes a main controller 101, a system bus 102, a ROM 103, a RAM 104, a storage unit 105, an operation unit 106, an oscillator (vibration generator) 107, an expanded interface unit 108, a sensor 110, a video-image processor 120, an audio processor 130, and a communication processor 140, etc.

The main controller 101 is configured by a microprocessor unit etc., and controls the entire portable terminal device in accordance with a program processing(s). The system bus 102 is a data communication path for performing data transmission/reception between the main controller 101 and each unit. The ROM 103 is a memory that stores an application program(s) etc. and a basic behavior program such as an OS. Used as the ROM 103 is, for example, a rewritable ROM such as an EEPROM or a flash ROM. Updating the program stored in the ROM 103 makes it possible to perform version-up and/or functional expansion of the basic behavior program etc. The RAM 104 serves as a work area at a time of executing the basic behavior program, and the application program, etc. The application program etc. are stored in the storage unit 105.

The operation unit 106 is a unit including an input device enabling an input operation by the user, and includes an operation key(s). The operation key includes an operation key for enabling power-on/off and standby of the portable terminal device, an operation key for displaying a basic operation screen, and the like.

The oscillator 107 oscillates (vibrates) the portable terminal device with an eccentric motor or the like. Thus, the user can be informed of a state of the portable terminal device. The extended interface unit 108 is an interface group for extending functions of the portable terminal device. The expanded interface unit 108 is composed of, for example, a USB interface, and a memory interface, etc. The USB interface connects a keyboard(s) and other USB devices. The memory interface connects a memory card(s) and other memory media, and transmits and receives data thereto and therefrom.

The sensor 110 is a sensor group for detecting a state(s) related to the portable terminal device. The sensor 110 includes a GPS receiver 111, an acceleration sensor 112, a gyro sensor 113, a geomagnetic sensor 114, an illuminance sensor 115, a proximity sensor 116, and a touch pressing sensor 117. The sensor 110 may include other sensors.

Using the GPS receiver 111 makes it possible to detect a position of the portable terminal device, for example, as latitude and longitude. Using the acceleration sensor 112 and the gyro sensor 113 makes it possible to detect movement and a tilt of the portable terminal device. The tilt means at least an absolute inclination, and can be detected as an angle of inclination to the horizontal plane. Using the geomagnetic sensor 114 makes it possible to detect a direction of the portable terminal device. Using the illuminance sensor 115 makes it possible to detect brightness around the portable terminal device. Using the proximity sensor 116 makes it possible to detect a proximity situation of the portable terminal device with its surrounding object(s).

Using the touch pressing sensor 117 makes it possible to detect states of touching and pressing the finger onto the display screen 2 of a display 121. For example, detected as a touch state can be presence or absence of the touch, and positional coordinates of the touch. For example, presence or absence of the pressing and its pressing strength can be detected as a pressing state. Incidentally, the touch pressing sensor 117 is not limited to an integrated type of a touch sensor and a pressing sensor, and the touch sensor and the pressing sensor may be provided as separate devices.

The video-image processor 120 includes a display 121, a video-image signal processor 122, a first video-image input unit 123, and a second video-image input unit 124. The display 121 forms the display screen 2 and includes, for example, a display device such as a liquid crystal panel. The display 121 displays, on the display screen 2, video-image data processed by the video-image signal processor 122. The display 121 corresponds to a function of the touch pressing sensor 117, and may include a touch panel in which the touch pressing sensor 117 is built. The video-image signal processor 122 includes a video RAM etc., and drives the display 121 based on video-image data inputted in the video RAM. The video-image signal processor 122 performs format conversion of video-image data, a superimposition processing of menus and/or other OSD signals, and the like as the need arises. The first and second video-image input units 123 and 124 are configured by, for example, camera units. Each camera unit converts light inputted from a lens into an electric signal(s) by using an element such as a CCD or a CMOS sensor, thereby obtaining video-image data of a surrounding(s) and an object(s).

The audio processor 130 includes an audio output unit 131, an audio signal processor 132, and an audio input unit 133. The audio output unit 131 includes a speaker(s), and outputs, as an audio, an audio signal (s) processed by the audio signal processor 132. The audio input unit 133 includes a microphone(s), and converts ambient audio into audio data, and inputs it.

The communication processor 140 includes a LAN communication unit 141, a telephone network communication unit 142, and a short-range communication unit 143. The LAN communication unit 141 performs wireless communication connection with a wireless communication access point(s), and data transmission/reception thereto/therefrom. The telephone network communication unit 142 performs wireless communication connection and telephone communication with a base station(s) of a mobile telephone communication network(s), and data transmission/reception thereto/therefrom. The short-range communication unit 143 corresponds to a communication interface such as BlueTooth (registered trademark) and, for example, performs short-range wireless communication with a corresponding device(s). Each unit of the communication processor 140 includes a coding circuit(s), a decoding circuit(s), an antenna(s), and the like. The communication processor 140 may include an infrared communication unit or the like.

[Portable Terminal Device (2)]

Figure 3:
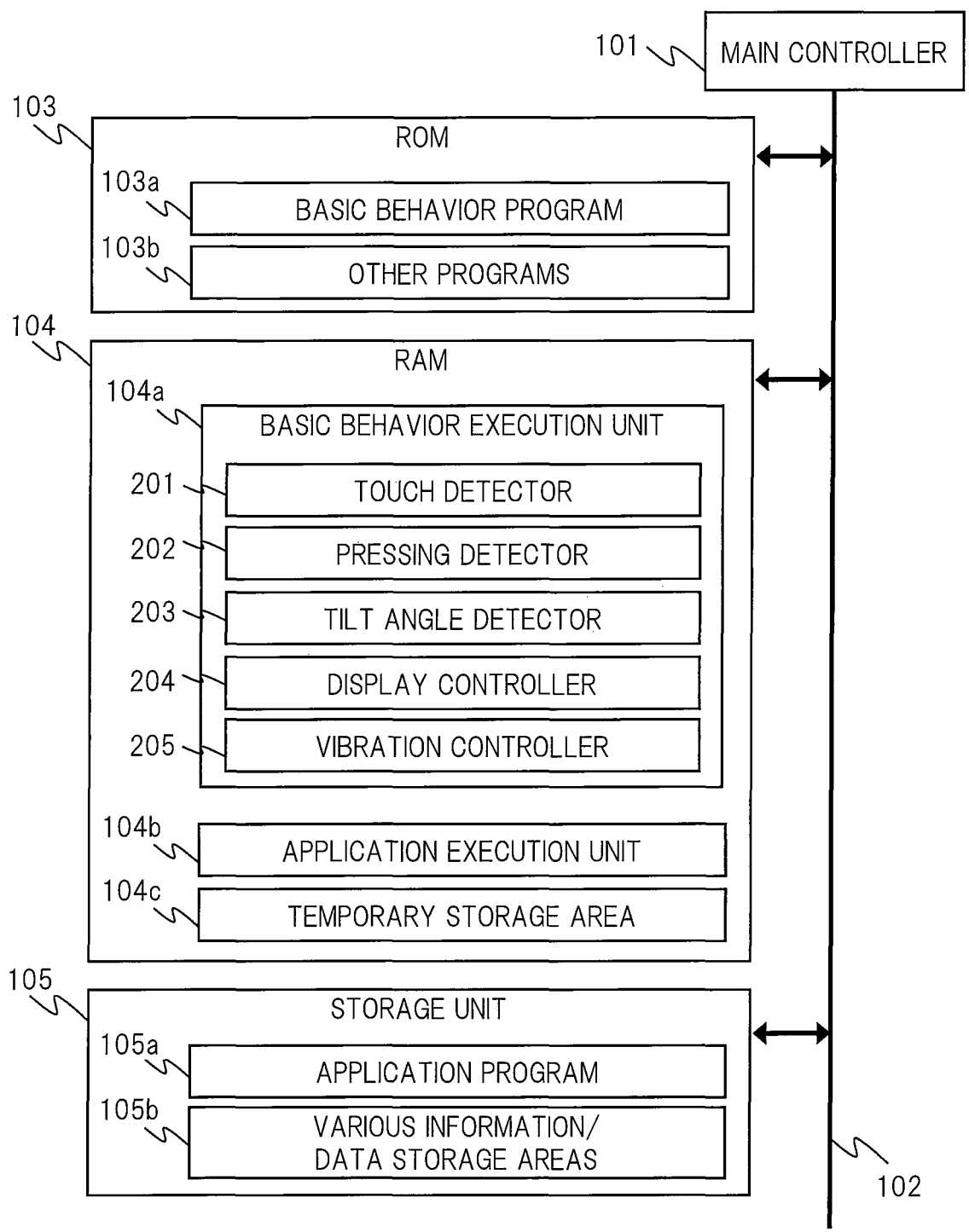
FIG. 3 is a diagram showing a configuration of software etc. in the portable terminal device according to Embodiment 1.

FIG. 3 shows a software configuration of the portable terminal device according to Embodiment 1, particularly, a configuration of programs and data of the ROM 103, the RAM 104, and the storage unit 105. Stored in the ROM 103 are a basic behavior program 103*a*, and the other programs 103*b*. The RAM 104 includes a basic behavior execution unit 104*a*, an application execution unit 104*b*, and a temporary storage area 104*c*, etc. When the basic behavior program etc. are executed, data is held (retained) in the temporary storage area 104*c* as the need arises.

The storage unit 105 has an application program 105*a*, and various information/data storage areas 105*b*, etc. The application program 105*a* is a program for realizing various functions such as mails, browsers, maps, games, and electronic book readers. Various pieces of information and data such as setting information of the portable terminal device and setting information for each application are stored in the various information/data storage areas 105*b*. The storage unit 105 includes a nonvolatile storage device such as a flash ROM, an SSD, and an HDD, and holds the stored information even in a state of supplying no power to the portable terminal device.

Incidentally, the ROM 103 and the RAM 104 may be integrated with the main controller 101. A part or all of the functions of the ROM 103 may be realized, as an alternative, by a partial storage area of the storage unit 105.

The main controller 101 reads out the basic behavior program 103a from the ROM 103, loads it into the RAM 104, and executes the basic behavior program 103a, thereby realizing the basic behavior execution unit 104a. The main controller 101 reads out the application program 105a from the storage unit 105, loads it into the RAM 104, and executes it, thereby realizing the application execution unit 104b.

The basic behavior execution unit 104a includes, as each execution unit, a touch detector 201, a pressing detector 202, a tilt angle detector 203, a display controller 204, and a vibration controller 205. Each execution unit works together.

The touch detector 201 uses the touch pressing sensor 117 to perform a touch detection processing. The touch detector 201 realizes a known function of detecting touches onto a plurality of spots in the display screen 2. The touch detector 201 realizes a known function of detecting operations such as tap, swipe, flick, and pinch. The pressing detector 202 uses the touch pressing sensor 117 to perform a pressing detection processing. The pressing detector 202 detects presence or absence of a pressing at a touched position, and strength of the pressing at the same position.

The tilt angle detector 203 uses the acceleration sensor 112 and the gyro sensor 113 to perform a processing for detecting a tilt angle of the portable terminal device. The display controller 204 performs a processing for controlling the display content of the display screen 2 in accordance with an input operation onto the display screen 2 of the display 121. This processing includes a control processing such as a scroll display behavior. The vibration controller 205 uses the oscillator 107 to perform a processing for generating vibration at the portable terminal device.

Incidentally, an OS of the portable terminal device realized by the basic behavior program 103a includes a known graphical user interface controller. The graphical user interface controller realizes a function of obtaining input information through a touch input operation onto the display screen 2, and a function of controlling an output(s) to the display screen 2 based on the control processing in accordance with the input information.

[Appearance and Content Display]

Figure 4:
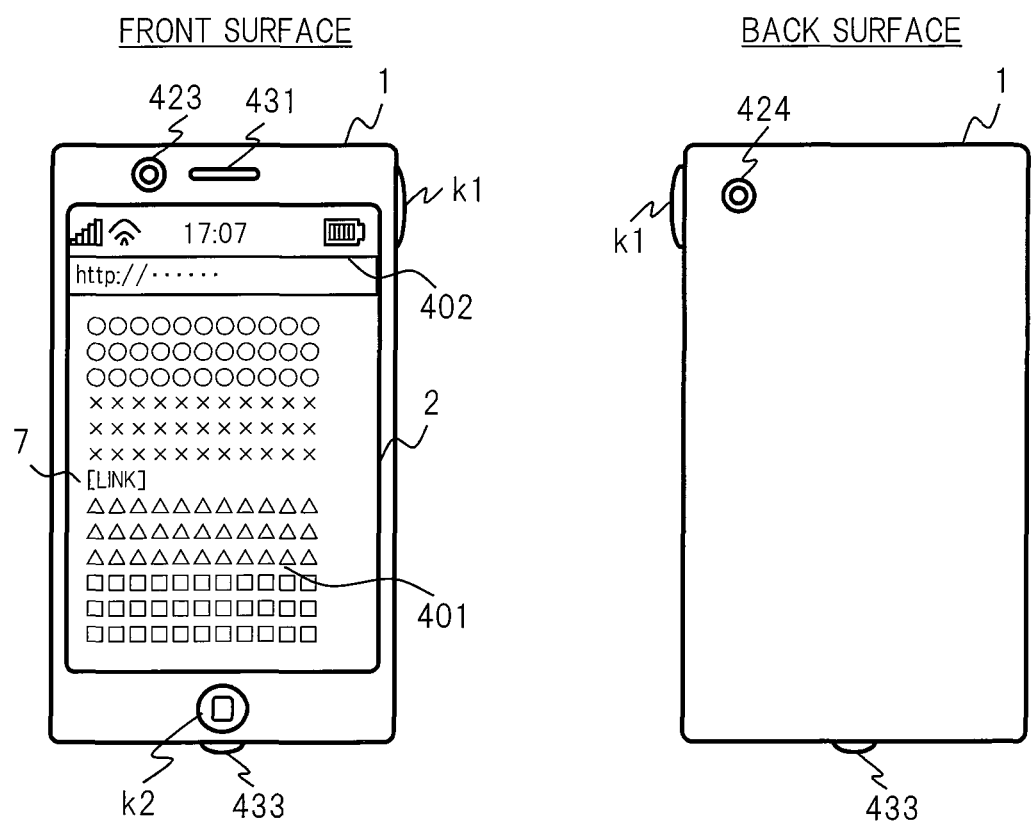
FIG. 4 is a diagram showing content display on an application screen in the portable terminal device according to Embodiment 1.

FIG. 4 shows an appearance of the portable terminal device and an example of content display on the application screen. FIG. 4 shows, on its left side, a configuration of a front surface of the casing 1 having the display screen 2 and shows, on its right side, a configuration of a back surface thereof. The front surface of the substantially tabular casing 1 has the substantially rectangular display screen 2. In this example, a partial area of a Web page on an application screen by a Web browser is displayed as content display information 401 in the display screen 2. Incidentally, texts, and images, etc. in the Web page are simply illustrated with symbols such as ○, x, △, and □. An object such as a link may be included in the content. This example simply illustrates a case where a link 7 such as a URL is included between an area indicated by x and an area indicated by △. Also provided in the display screen 2 is an area 402 for displaying information on a clock, and an address, etc.

The casing 1 is provided with: a front camera unit 423 corresponding to a first video-image input unit 123; a back camera unit 424 corresponding to a second video-image input unit 124; a speaker 431 of an audio output unit 131; a microphone 433 of an audio input unit 133; and the like.

The casing 1 has, as operation keys, a power key k1 and a home key k2. The power key k1 enables input operations of turning on/off the power of the portable terminal device and transitioning/returning to/from a standby state. The power is switched on/off by depressing the power key k1 for a predetermined time or more. Depressing the power key k1 for a time shorter than the predetermined time brings the transition to the standby state or the return therefrom. The home key k2 enables an input operation concerning the display of the home screen which is a basic operation screen as described later. Depressing the home key k2 in a state of displaying the application screen brings the switching to the display of the home screen.

The user performs an input operation of touching a spot of the link 7 etc. of the content in the application screen on the display screen 2, or a spot of an object such as an icon in the home screen. This causes the portable terminal device to, for example, read and display the content associated with the link 7. For example, the portable terminal device executes an application associated with an icon, and displays an application screen.

[Touch Pressing Detection]

Figure 5:
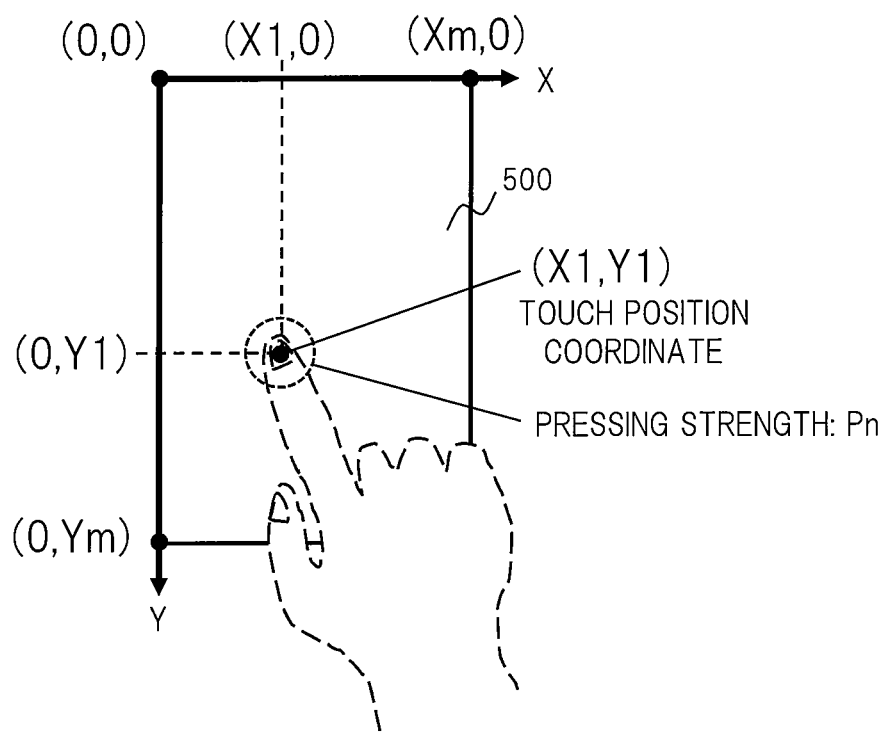
FIG. 5 is a diagram showing detection of a touch pressing sensor in the portable terminal device according to Embodiment 1.

FIG. 5 shows detection of a touch position coordinates and a pressing by using the touch pressing sensor 117. FIG. 5 has an area 500 corresponding to the display screen 2 and the touch pressing sensor 117. The area 500 is an area in which touch and pressing states can be detected. The area 500 has a position coordinate (X, Y) in a plane formed by the X and Y directions. A position of a point touched and pressed by the finger in the area 500 is indicated as a position coordinate (X1, Y1). It is assumed that an origin of the area 500 is an upper-left position coordinate (0, 0), and that a longitudinal width of the area 500 is Xm and a vertical width is Ym.

The touch detector 201 uses the touch pressing sensor 117 to detect the position coordinate (X1, Y1) of the touched point in the area 500. The pressing detector 202 uses the touch pressing sensor 117 to detect a pressing strength at a point pressed with the touch. It is assumed that the pressing strength is Pn. Additionally, the touch detector 201 uses the touch pressing sensor 117, thereby making it possible to detect the number of touches, and each of their touch position coordinates, etc. in a case where a plurality of fingers are simultaneously touched in the area 500.

Incidentally, methods of touch detection and pressing detection are not particularly limited, and a known method can be applied thereto. As an example, a capacitance type touch pressing detection method can be applied. This method detects, as a voltage value, a variation in capacitances due to finger's proximity or/and a pressing onto the display screen, and obtains a touch position coordinate or/and a pressing strength by calculation based on the voltage value.

[Use State, Tilt Angle, and Operation]

Figure 6:
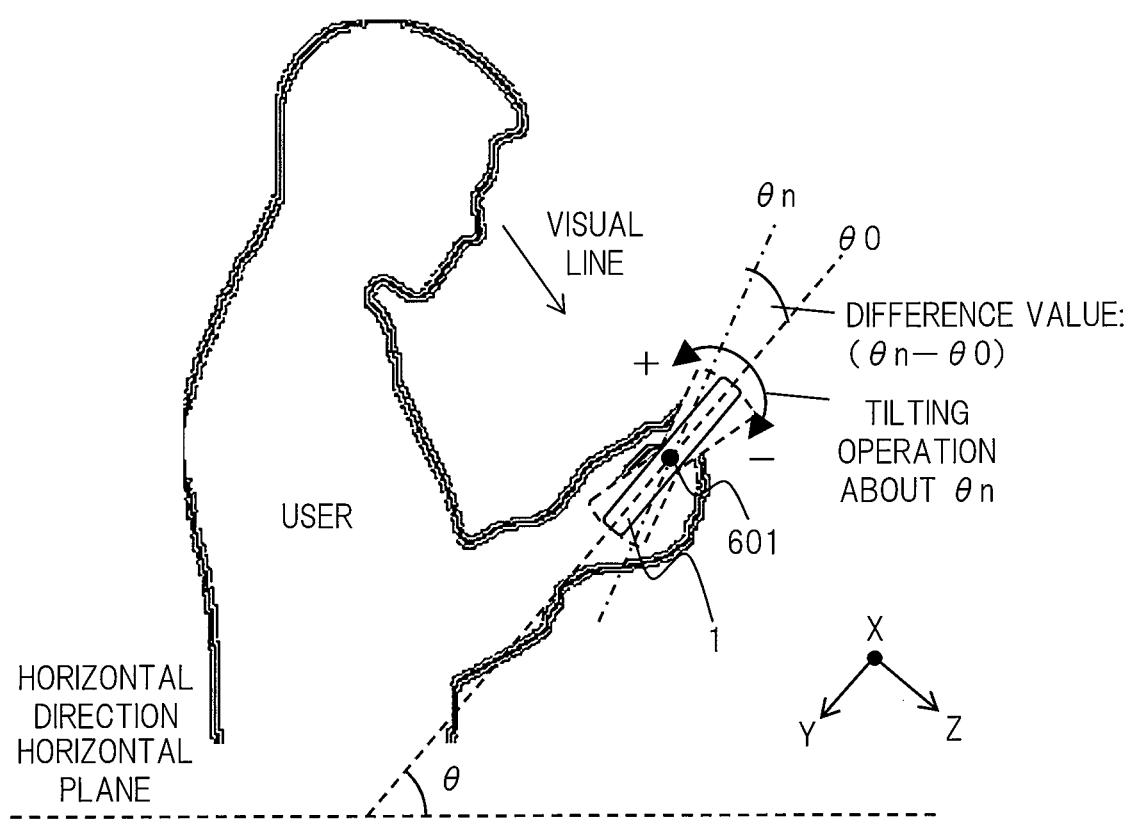
FIG. 6 is a diagram showing, under a state viewed from transversely, a state used by a user, a tilt angle, a tilting operation, and/or the like in the portable terminal device according to Embodiment 1.

FIG. 6 shows, under a state of viewing the user and the casing 1 from transversely, a state in which the user holds the portable terminal device in the hand and uses it, a tilt angle of the portable terminal device, and a tilting operation, etc. In this state, a plane corresponding to the casing 1 and the display screen 2 is inclined with respect to the horizontal plane and/or the vertical plane. This inclined state has an absolute tilt angle θ with respect to the horizontal direction or the horizontal plane. The portable terminal device according to Embodiment 1 detects this angle θ, and sets it as a reference angle θ0. From a state of the reference angle θ0, the user performs an operation of tilting the casing 1 for scrolling or the like.

Figure 7:
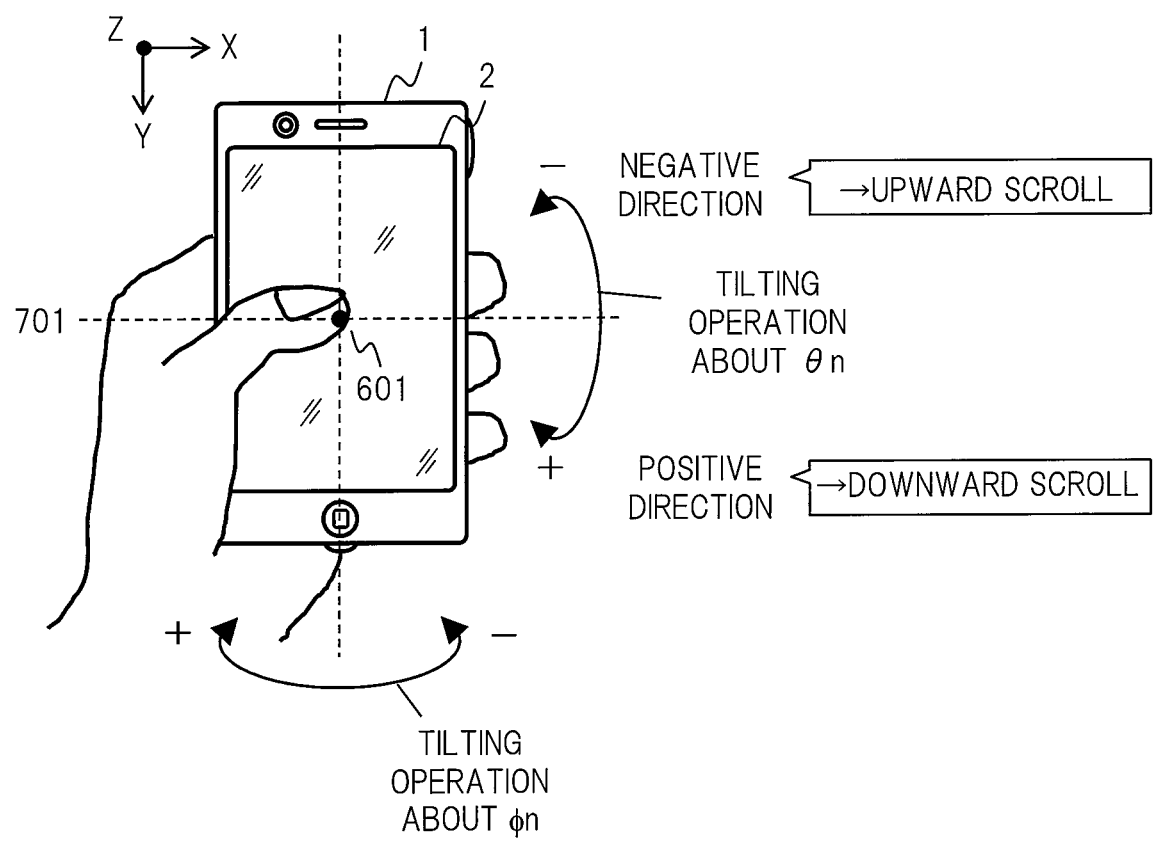
FIG. 7 is a diagram showing, under a state viewed from a front surface of a display screen, a tilting operation and/or the like in the portable terminal device according to Embodiment 1.

FIG. 7 shows a tilt operation etc. corresponding to FIG. 6 under a state of viewing a front face of the display screen 2 on a user's visual line. In an example of FIG. 7, a point near a center of the display screen 2 in the X and Y directions is touched. Further, it is assumed that this point is a reference point 601 for supporting the portable terminal device held in the hand. A rotational axis in performing the tilting operation is an X-directional axis, and is indicated by a line 701.

In FIGS. 6 and 7, it is assumed that an absolute tilt angle in further performing the tilting operation with respect to the reference angle $\theta 0$ is an angle $\theta n$. In this example, the angle $\theta n$ is an angle of inclination about the Y direction of the display screen 2 and the content. A difference value ($\theta n-\theta 0$) between the reference angle $\theta 0$ and the angle $\theta n$ is given as an amount representing a relative tilt angle. Additionally, positive and negative directions are shown with respect to the tilting operation and the tilt angle $\theta n$. If it is assumed that the reference point of the support is fixed, the positive direction is a direction of tilting an upper side of the display screen 2 to a user's side in being viewed from the user, and the negative direction is a direction of tilting the upper side of the display screen 2 to a side away from the user in being viewed from the user.

[Display Range Change Control and Scroll Display]

Figure 8:
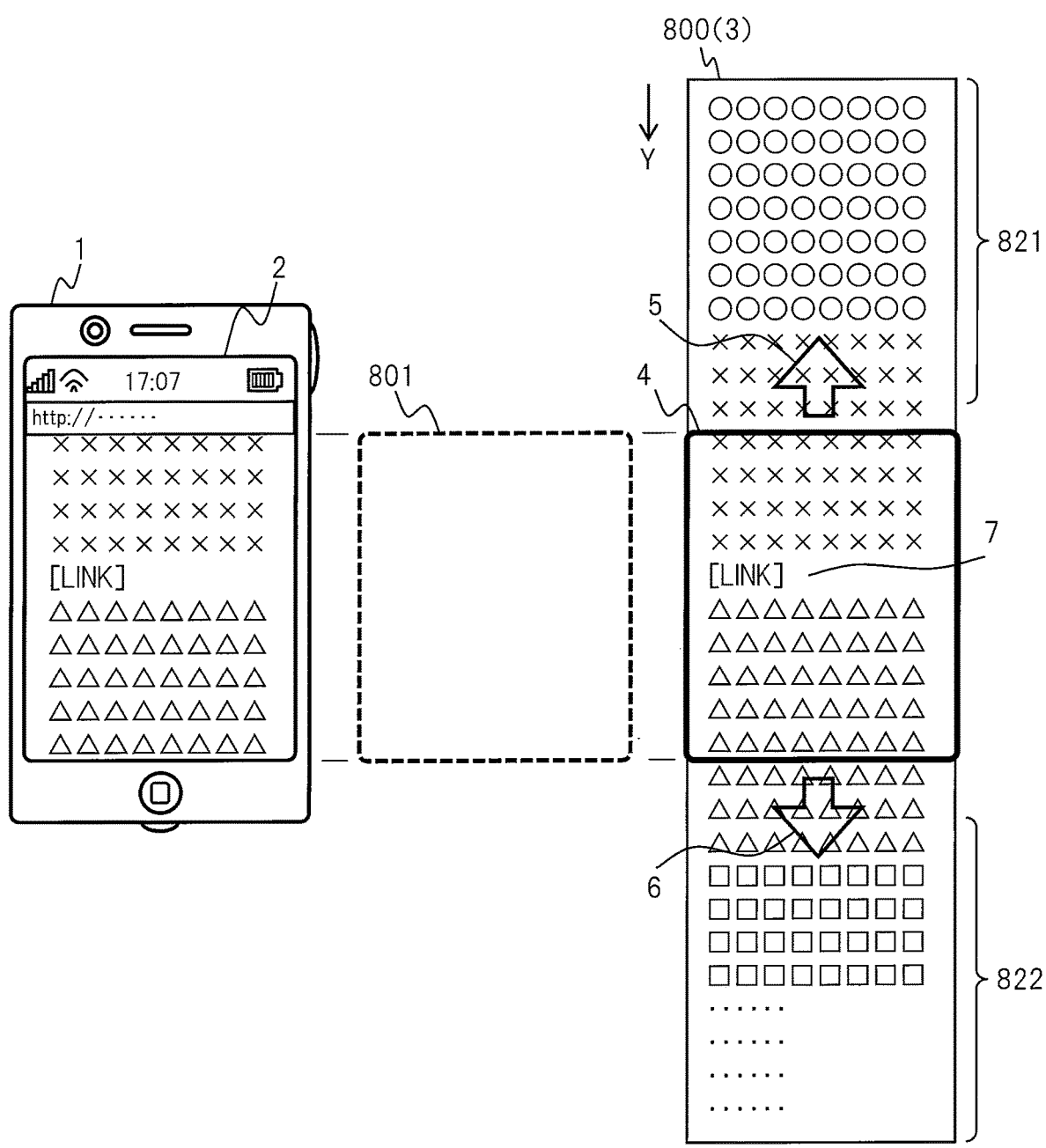
FIG. 8 is a diagram showing content's scroll display as display range change control in the portable terminal device according to Embodiment 1.

FIG. 8 shows, as display range change control, a scroll display behavior of content in the portable terminal device according to Embodiment 1. The application screen in the display screen 2 includes a region 801 in which content 800 can be displayed. The region 801 displays the display range 4 as a part of the display information 3 of the content 800. The content 800 is an example of a Web page, and its actual data is composed of HTML or the like. The display information 3 of the content 800 shows a case where the link 7 is included between regions such as texts and images. The display information 3 of the content 800 is variable in accordance with a size of the region 801 by the application.

The overall size of the display information 3 of the content 800, that is, a standard size without its enlargement, reduction, or the like is larger than the size of the region 801. Consequently, the entire display information 3 cannot be displayed in the region 801. Therefore, the region 801 displays, as the display range 4, a part of the display information 3 of the content 800. The display range 4 is a range defined when the display information 3 of the content 800 is displayed in the region 801 of the display screen 2. In this example, the display range 4 shows a case of being an area in the middle of the Web page, and includes: a part of a region indicated by x; the link 7; and a part of a region indicated by Δ.

When wishing to browse etc. another part of the non-displayed content 800 from a state of the display range 4 displayed in the region 801, the user conventionally scrolls it by swiping, flicking, or the like. This example shows a case where the display information 3 can be scrolled upward or downward in the Y direction. Conventionally, when wishing to browse etc. the large-size content 800, the user needs to repeat an operation such as a swipe many times, which is troublesome.

Meanwhile, in Embodiment 1, the user presses the area 801 of the display screen 2 to perform a tilting operation of the casing 1, thereby being able to scroll the display range 4 in the region 801. Consequently, the display range 4 of the display information 3 of the content 800 can be changed. The scroll 5 is a first-direction scroll, and indicates a top of the content 800 or a scroll in a relatively upward direction. By the scroll 5, the display range 4 is moved upward, and a part of the content 800 in its relatively upward direction is displayed in the region 801. The scroll 6 is a second-direction scroll, and indicates a terminal of the content 800 or a scroll in its relatively downward direction. By the scroll 6, the display range 4 is moved downward, and a part of the contents 800 in its relatively downward direction is displayed in the region 801. Incidentally, a video-image portion is moved in a direction opposite to a scroll direction in the region 801 of the display screen 2.

[Display Control]

The display control in the portable terminal device according to Embodiment 1 will be described as follows. When displaying the content on the application screen of the display screen 2, the display controller 204 of the portable terminal device accepts a specific touch pressing operation by the user and an operation of tilting the casing 1, and causes the display range 4 to scroll, thereby performing the display region change control.

It is assumed that the user is initially in a state of holding the device in the hand as shown in FIG. 6 and browses, as the display range 4, a part of the content 800 as shown in FIG. 8. When wishing to browses etc. another part of the content 800 from the above state, the user firstly touches and presses the region 801 of the display screen 2 with the finger. At this time, the user presses it with a strength (force) equal to or more than a certain level. When its pressing strength is equal to or more than a predetermined value (magnitude), the portable terminal device shifts to a specific control mode. The portable terminal device detects the angle $\theta$ of FIG. 6 corresponding to the state at that time, and sets it as the reference angle $\theta 0$. The reference angle $\theta 0$ is an angle that is temporarily set for control.

The user performs an operation of tilting the casing 1 in a desired direction with the finger touched and pressed as described above. For example, when wishing to perform the scroll 5 in the upward direction, the user performs an operation of tilting the device in the negative direction. The portable terminal device detects the angle $\theta n$ in accordance with the tilting operation, and detects a difference value ($\theta n-\theta 0$) which is an amount of relative tilt angles. The portable terminal device uses the magnitude of the angle $\theta n$, more specifically, the difference value ($\theta n-\theta 0$) to determine whether to perform the scroll, what direction the scroll is performed in, what speed the scroll is performed at, or the like. The portable terminal device controls a scroll display behavior so as to be a different scroll depending on the direction and magnitude of the angle $\theta n$. This scroll display behavior brings a change of the display range 4 in the region 801 of the display screen 2.

After the desired display range 4 reaches a state of being displayed in the region 801 by the scroll, the user releases the finger therefrom. Consequently, the portable terminal device stops scrolling at that time. That is, the display range 4 at that time is displayed in the region 801. The user can browse etc. another part of the content 800 corresponding to the display range 4. When a position of stopping the scroll and releasing the finger corresponds to an object such as the link 7, the portable terminal device performs a processing of executing the object, for example, a processing of reading content of the link 7 and displaying it.

[Control Flow]

Figure 9:
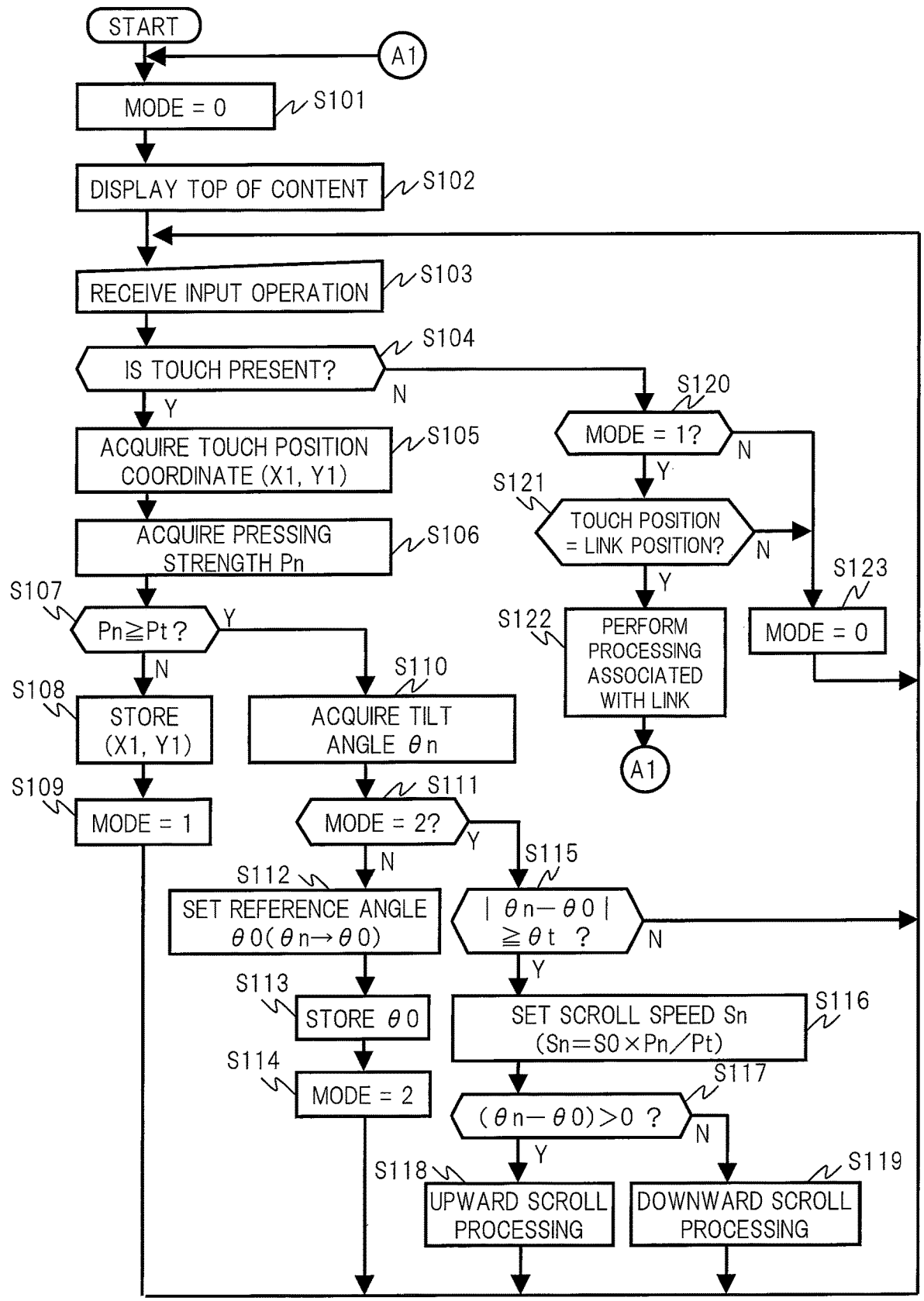
FIG. 9 is a diagram showing a flow of a control processing in the portable terminal device according to Embodiment 1.

FIG. 9 shows a flow of a control processing for realizing the display range change control in Embodiment 1. The basic behavior execution unit 104a, particularly, the display controller 204 performs a processing of the flow of FIG. 9. Incidentally, a mode, which is a control state for realizing this flow, includes a first mode, a second mode, and a third mode. Administrative values of the respective modes are set at 0, 1, and 2. Mode=0 (first mode) indicates an initial state. Mode=1 (second mode) is a touch-present state, and indicates a state of not setting the reference angle θ0. Mode=2 (third mode) is a state of having a predetermined pressing, and indicates a state of setting the reference angle θ0. FIG. 9 includes steps S101 to S123. The steps will be explained in order hereinafter.

(S101) The display controller 204 reads the content selected by the user. The display controller 204 initially sets a mode to mode=0 (first mode). (S102) The display controller 204 initially displays the top of the content, for example, a region 821 of FIG. 8 on the display screen 2. Incidentally, such a display position is determined in accordance with the application and the content. (S103) The portable terminal device receives an input operation performed by the user through the operation unit 106 and/or the touch pressing sensor 117, and acquires input information corresponding thereto. The display controller 204 acquires touch input information through the touch detector 201. At that time, the touch detector 201 detects the presence or absence of touch and a touch position coordinate (X1, Y1). Further, the pressing detector 202 detects the presence or absence of the pressing and the pressing strength Pn. (S104) The display controller 204 branches the processing by determining the presence or absence of the touch based on the input information. If the touch is present (Y), the processing proceeds to S105. If the touch is absent (N), the processing proceeds to S120.

(S105) The display controller 204 acquires the touch position coordinate (X1, Y1) from the touch detector 201. (S106) Additionally, the display controller 204 acquires the pressing strength Pn at the touched position from the pressing detector 202. (S107) The display controller 204 compares the pressing strength Pn acquired in S106 with a predetermined threshold value Pt, determines whether the strength Pn is equal to or larger than the threshold value Pt, and branches the processing. If Pn≥Pt, the processing proceeds to S110. If Pn<Pt, the processing proceeds to S108.

(S108) The display controller 204 stores and retains, in a memory, the touch position coordinate (X1, Y1) acquired in S105. (S109) The display controller 204 sets the mode to mode=1 (second mode), and returns to S103.

(S110) The display controller 204 acquires the tilt angle θn of the portable terminal device by the tilt angle detector 203. (S111) The display controller 204 checks whether the current mode is mode=2 (third mode), and branches the processing. If the current mode is mode=2 (third mode), the processing proceeds to S115. If not, the processing proceeds to S112.

(S112) The display controller 204 sets, as the reference angle θ0, the angle θn acquired in S110. (S113) The display controller 204 stores and retains the reference angle θ0 in the memory. (S114) The display controller 204 sets the mode to mode=2 (third mode), and returns to S103.

(S115) Meanwhile, in a case of mode=2 (third mode), the display controller 204 compares, with a predetermined threshold value θt, an absolute value |θn−θ0| of a difference value between the angle θn and the reference angle θ0 in S115, determines whether the absolute value is equal to or more than the threshold value θt, and branches the processing. If |θn−θ0|≥θt, the processing proceeds to S116. If not, the processing returns to S103. Incidentally, if the difference value is 0 or almost 0, this indicates that a state of the reference angle θ0 has not changed. Therefore, setting the threshold value θt makes it possible to prevent the display range from scrolling even when the tilt angle slightly changes without intention of the user.

(S116) The display controller 204 uses the pressing strength Pn etc. acquired in S106 to set a scroll speed Sn for use in a scroll display behavior based on the following expression (1).

$$Sn = S0 \times Pn/Pt \tag{1}$$

It is assumed that a predetermined reference scroll speed is S0. The reference scroll speed S0 may be a fixed setting value on the mounting, or may a setting value that can be variably set by the user. In a case of the expression (1), the scroll speed Sn is determined so as to increase the reference scroll speed S0 by multiplication in accordance with magnitude of a ratio (Pn/Pt) of the pressing strength Pn to the threshold value Pt. That is, as the pressing by the user becomes larger, the scroll speed Sn can be made higher.

(S117) Next, the display controller 204 judges whether a sign of the difference value (θn−θ0) between the angle θn and the reference angle θ0 is positive or negative, and branches the processing. If the sign is positive ((θn−θ0)>0), the processing proceeds to S118. If the sign is negative ((θn−θ0)<0), the processing proceeds to S119. (S118) The display controller 204 uses the scroll speed Sn set in S116 correspondingly to a positive-direction inclination to perform a downward scroll processing for causing the scroll 6 in FIG. 8 to be performed, and thereafter returns to S103. (S119) The display controller 204 uses the scroll speed Sn set in S116 correspondingly to a negative-direction inclination to perform an upward scroll processing for causing the scroll 5 in FIG. 8 to be performed, and thereafter returns to S103.

(S120) Meanwhile, in a case of no touch at S104, the display controller 204 checks in S120 whether the current mode is mode=1 (second mode), and branches the processing. If mode=1 (second mode), the processing proceeds to S121. If not, the processing proceeds to S123. (S121) The display controller 204 compares the touch position coordinate (X1, Y1) stored in S108 and serving as a touch position on the display screen 2, and a position of an object such as the link 7 among the display information 3 of the display screen 2. The display controller 204 branches the processing depending on whether their positions coincide with each other. If the both positions coincide, the processing proceeds to S122. If not, the processing proceeds to S123. (S122) The display controller 204 executes a processing associated with the link 7. For example, the display controller 204 performs processings of: acquiring, from the server on the Internet, content designated by URL of the link 7; reading the content; and displaying the content on the display screen 2. In this case, the portable terminal device exits a loop of this flow as indicated by Δ1, and similarly performs a processing about new content from the beginning of this flow. (S123) The display controller 204 sets the mode to mode=0 (first mode), and returns to S103.

[Setting of Scroll Speed]

Figure 10:
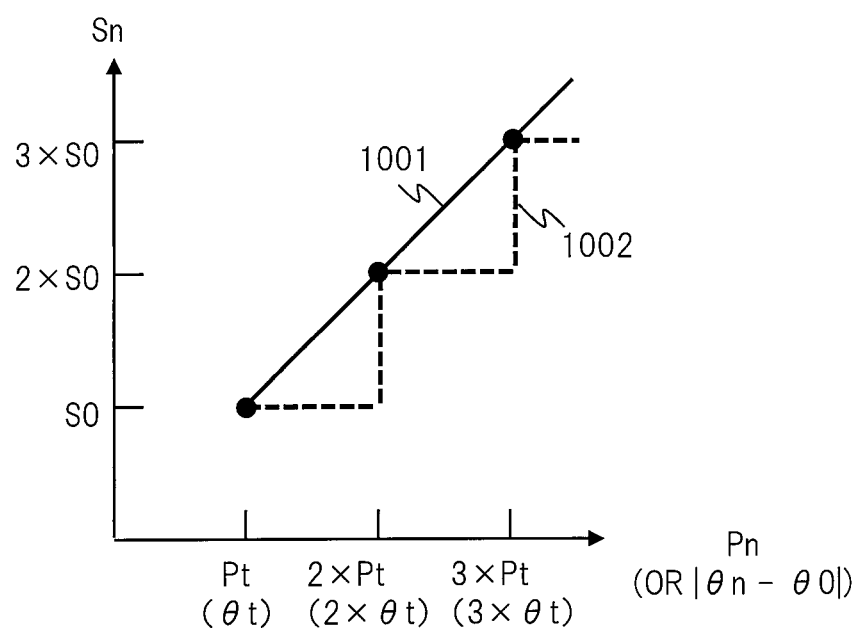
FIG. 10 is a diagram showing a relationship between a pressing and a scroll speed in the portable terminal device according to Embodiment 1.

FIG. 10 shows a relationship between the pressing strength Pn and the scroll speed Sn related to the setting of the scroll speed Sn and corresponding to the step S116 in FIG. 9. A lateral axis indicates the pressing strength Pn and, for example, shows threshold values Pt, 2×Pt, and 3×Pt. A longitudinal axis indicates the scroll speed Sn and, for example, shows values of reference scroll speeds S0, 2×S0, and 3×S0. A straight line 1001 indicates a function corresponding to the expression (1), and the scroll speed Sn linearly increases in accordance with the strength Pn.

[Effects Etc.]

As described above, the portable terminal device according to Embodiment 1 can realize a change of the display range of the content etc. with less time and effort correspondingly to various states of the user, thereby being able to realize more preferable usability. The portable terminal device uses the pressing strength Pn and the relative tilt angle θn to change the display range 4 of the content by scroll display control. The user sets the casing 1 of the portable terminal device to a state that is held in the hand and is suitable for the user and/or surroundings, for example, a state naturally held in one hand. The user can set, as the reference angle θ0, the state by the pressing at a desired time point. Then, the user performs an operation of tilting the casing 1 in a desired direction as it is, thereby scrolling the display information of the content to enable the change of the display range 4. The user does not require repeating the touch operation many times, and can quickly browse etc. the desired display range 4 with a simple operation. The user can move the display range by a desired distance by the scrolling with a single operation.

The reference angle θ0 is set by entering a control mode in which the predetermined pressing serves as a trigger, so that the scrolling is not erroneously performed when the user unintentionally performs the touch operation. Also, the user can adjust the scroll speed etc. to a user's desired speed in accordance with the pressing strength etc. Additionally, the user can quickly perform the link etc. without requiring a separate touch operation in conjunction with the scroll behavior.

Modification Example 1

The following is possible as a modification example of Embodiment 1. Various kinds of images such as photographic images can be applied, without being limited to a Web page(s) etc., as the content serving as a target to be subjected to the display range change control. For example, when a size of the photographic image is large or enlarged, a part of the photographic image is displayed on the display screen 2. At that time, the scroll control etc. of Embodiment 1 is similarly applicable. Further, the display range change control is not limited to the scroll display behavior, and is applicable also to an enlarging or downsizing behavior etc. For example, when the portable terminal device displays a photographic image and the user performs the tilting operation with the display screen 2 pressed, a display size of the photographic image is enlarged or reduced in accordance with the tilt angle. Consequently, the user can browse etc. a desired part or the whole of the photographic image.

Modification Example (2)

Embodiment 1 shows a case of using, as shown in FIG. 1 etc., the tilt angle related to the Y direction of the display screen 2 and the content to control the scroll display behavior in the Y direction. However, Embodiment 1 is not limited to this and is possible also about another case. Embodiment 1 is similarly possible also about a form of using the tilt angle related to the X direction of the display screen 2 and the content to control the scroll display behavior in the X direction. Additionally, Embodiment 1 is possible also about a form of controlling the scroll display behavior in all the directions including an up-down direction and a right-left direction by simultaneously executing both of the Y-direction control and the X-direction control. Such control in each direction may be applied fixedly on the mounting, selectably in accordance with user's setting, or selectively in accordance with an application(s), content, or the like. For example, in a case of an application displaying content, which has a relatively large size and can be enlarged or reduced, such as a photo or a map, Embodiment 1 may be a form of applying the above-described control in all the directions.

Embodiment 1 use, as a correspondence relationship of the control, the downward scroll 6 in a case of a positive-direction tilt, and the upward scrolling 5 in a case of a negative-direction tilt, but a reversed correspondence relationship may be used.

The scroll display behavior of Embodiment 1 is a behavior of continuously changing the display range 4, for example, a behavior of smoothly moving it per pixel unit, but is not limited to those and is applicable also to another behavior. For example, the above-mentioned scroll display behavior is applicable also to an intermittently scrolled behavior per constant region or distance.

Modification Example (3)

Step S116 of FIG. 9 determines the scroll speed Sn so as to vary in accordance with the pressing strength Pn. However, the determination of the scroll speed is not limited thereto, and is possible. The scroll speed Sn may be determined in accordance with the magnitude (value) of the angle θn by using the following expression (2).

$$Sn = S0 \times |\theta n - \theta 0|/\theta t \qquad (2)$$

In a case of the expression (2), the scroll speed Sn is determined so as to increase the reference scroll speed S0 in accordance with magnitude of a ratio of the absolute value |θn−θ0| to the threshold value θt. In a case of this modification example, a relationship at a time of setting the scroll speed Sn is a relationship obtained by replacing the pressing strength Pn with the absolute value |θn−θ0| of the difference value related to the tilt angle θn in FIG. 10.

Modification Example (4)

Step S116 of FIG. 9 determines the scroll speed Sn by a linear function such as the straight line 1001 in FIG. 10. However, the determination of the above scroll speed is not limited to this, and is possible. For example, the scroll speed may be determined by a stepwise function such as a function 1002 of FIG. 10. In this function 1002, the scroll speed Sn is determined to be a constant value in accordance with a section(s) of a range of the pressing strength Pn. Further, the determination of the scroll speed Sn applies a function including a predefined upper limit value or lower limit value, and may be made within a range from the lower limit value to the upper limit value. Additionally, not only a linear function but also a nonlinear function may be also applied.

Further, the scroll speed Sn may be set to a constant value regardless of the pressing strength Pn or/and the angle θn. Additionally, the scroll speed Sn may be settable by user's setting. As user's setting means, for example, an item for setting the scroll speed Sn etc. by displaying a user's setting screen etc. on the display screen 2 may be provided.

The threshold value Pt relating to the pressing strength Pn in step S107 of FIG. 9 or the threshold value θt relating to the angle θn in step S115 may be a fixed setting value on the mounting, or may be a variably settable setting value by the user's setting. In a case of a form settable by the user, the user can obtain a preferable setting that is easy for him/her to operate.

Modification Example (5)

When the reference angle θ0 is set by a pressing equal to or more than a predetermined value (magnitude) to transition to a specific control mode, the display screen 2 may display therein predetermined information representing a state of the control mode. This is not limited to such display, and may also be a predetermined sound output(s) or vibration generation. Further, when the finger is released and the control mode is canceled, the display of the predetermined information may be erased or another predetermined output may be made.

Further, when the strength of the pressing equal to or more than a predetermined value is used as a trigger to be shifted to the control mode, a touch continuation time may be further judged as a condition. That is, when the touch continuation time at a time of the pressing equal to or more than the predetermined value is equal to or more than a predetermined threshold value, the normal mode may be shifted to the control mode.

Embodiment 2

A portable terminal device according to Embodiment 2 of the present invention will be described with reference to FIGS. 11 to 18. Each basic configuration of Embodiment 2 etc. is almost the same as that of Embodiment 1, and Embodiment 2 different from Embodiment 1 in configurations will be described hereinafter.

[Home Screen]

Figure 11:
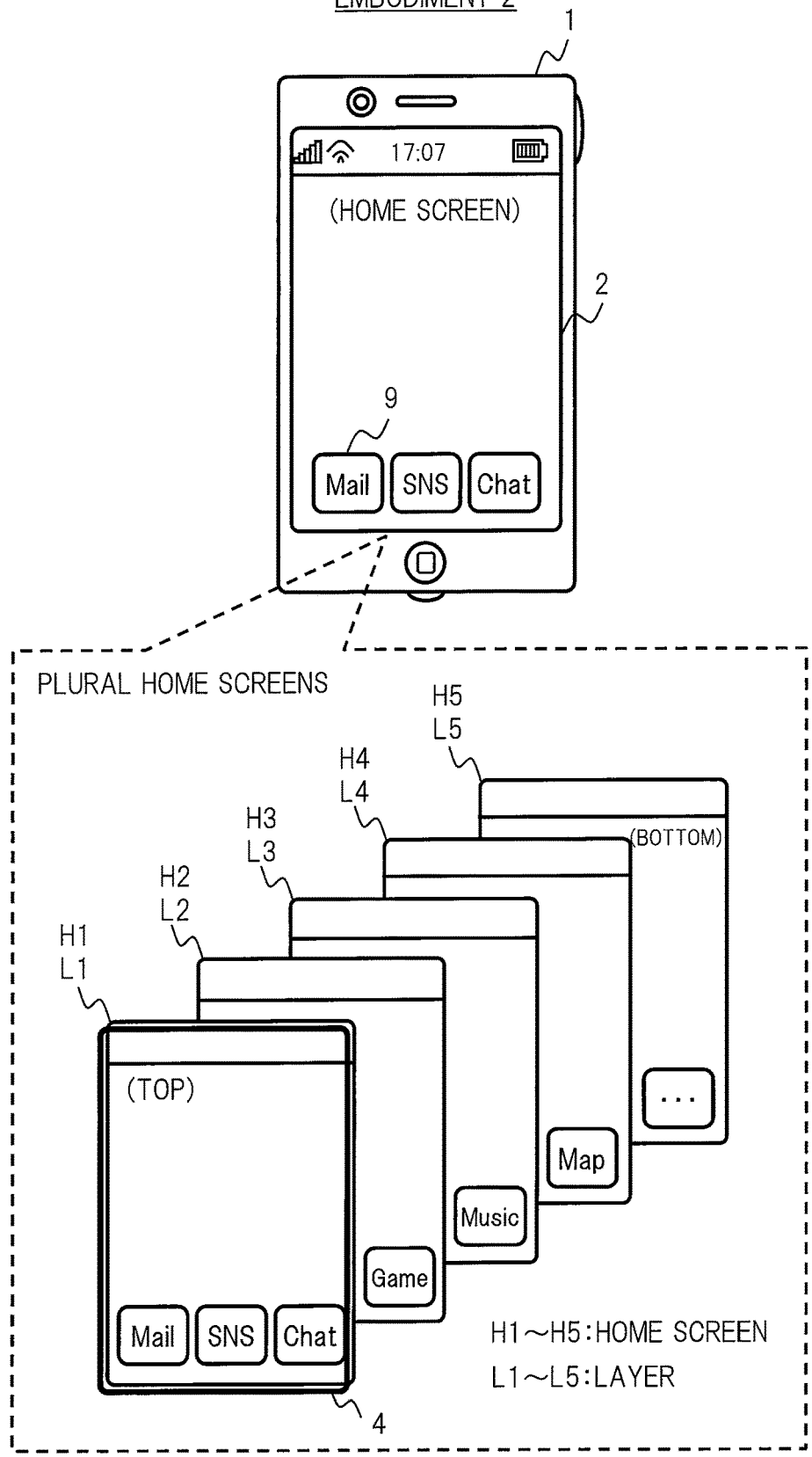
FIG. 11 is a diagram showing a display screen and switching-display of a plurality of home screens in a portable terminal device according to Embodiment 2 of the present invention.

FIG. 11 shows, in Embodiment 2, a home screen on the display screen 2 and switching of a plurality of home screens thereon. A portable terminal device according to Embodiment 2 switches and displays a plurality of home screens on the display screen 2 in accordance with a specific touch pressing operation. The home screen has a plurality of home screens different from each other in contents. Basically, one home screen is displayed in the display screen 2. One home screen selected out of the plural home screens corresponds to the display range 4. The icons 9 etc. associated with an application are arranged on a background in one home screen. When the user selects and operates the icon 9, the home screen is shifted (transitions) to a corresponding application screen.

This example has home screens H1 to H5 as the plural home screens. The home screens H1 to H5 are managed in a virtually layered arrangement as information by an OS of the portable terminal device. That is, the home screens H1 to H5 are managed as layers L1 to L5. For example, the home screen H1 is the top layer L1, and is arranged on a front side. The home screen H5 is the bottom layer L5, and is arranged on a back side. The number of home screens and layers is increased or decreased as necessary. Incidentally, the bottom layer may be linked to the top layer in a loop shape.

The home screens H1 to H5 show a case of being divided per, for example, genre. For example, arranged in a lower portion of the home screen H1 are three icons 9 corresponding to applications of communication related genres such as Mail, SNS, and Chat. For example, arranged on the home screen H2 is a genre icon such as Game. The plural home screens can be also set by the user. Additionally, when the plural icons do not fall within the one home screen, they may be automatically divided into the plural home screens.

[Display Control]

Figure 12:
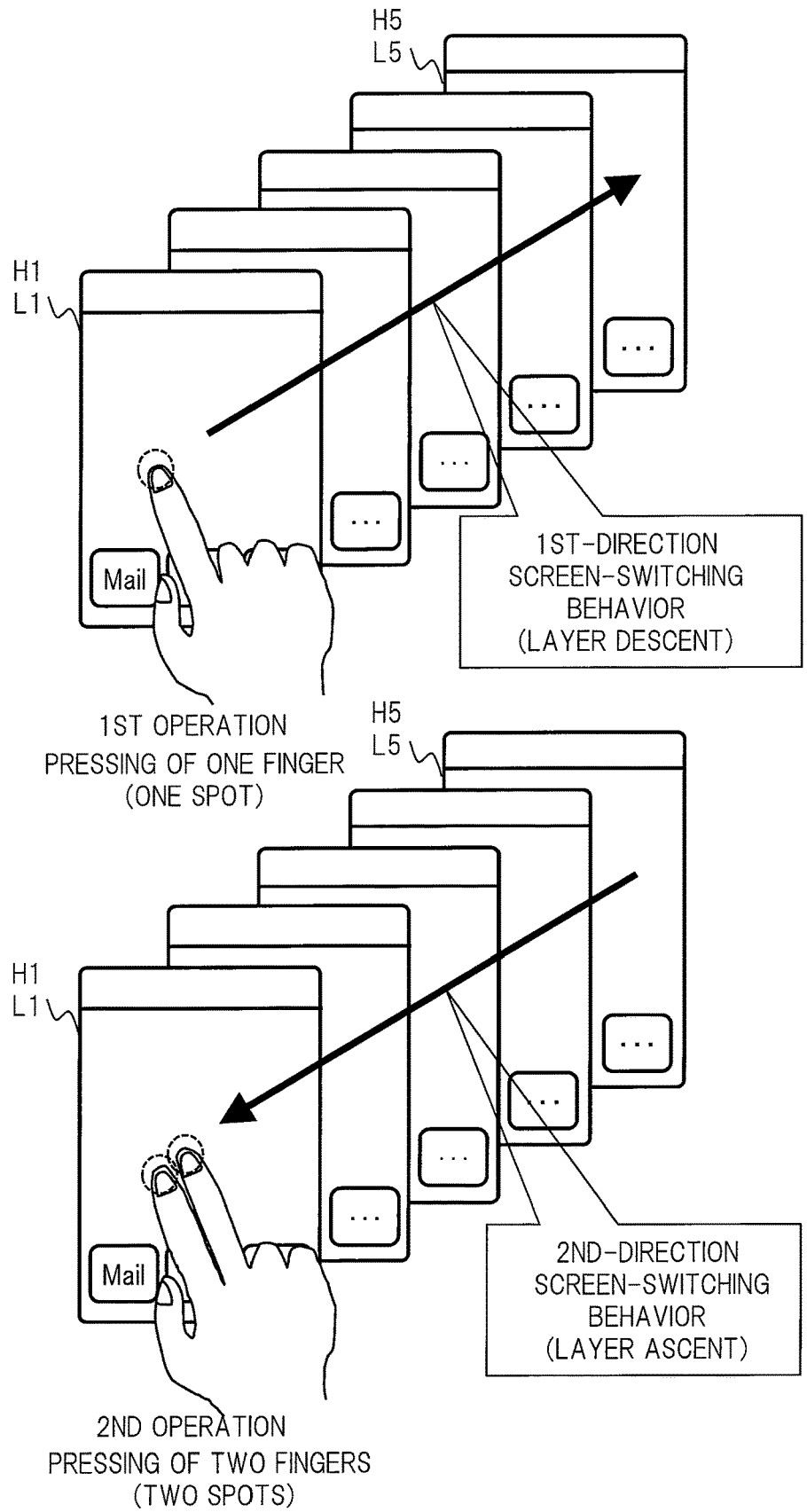
FIG. 12 is a diagram showing, as display control, an operation onto the home screens and screen-switching in the portable terminal device according to Embodiment 2.

FIG. 12 shows, as display control of Embodiment 2, a touch pressing operation and a screen-switching display behavior with respect to a home screen. The portable terminal device according to Embodiment 2 accepts a specific touch pressing operation by the user and controls, as display range change control, the switching of the plural home screens on the display screen 2. A target of the display range change control is the content display information in a case of Embodiment 1, but is the plural home screens in a case of Embodiment 2.

Embodiment 1 etc. show a case where the user can operate the portable terminal device held in one hand. Meanwhile, Embodiment 2 shows a case where the user operates the portable terminal device held in both hands. It is assumed that the user holds a portable terminal device in a not-shown left hand similarly to FIG. 7. Then, it is assumed that, as shown in FIG. 12, the user touches and presses a spot in the display screen 2 with the finger of the right hand. Embodiment 2 selectively uses one or two fingers as the touch pressing operation. The touch detector 201 and the pressing detector 202 use the touch pressing sensor 117 to distinguish a touch pressing with one finger and a touch pressing with two fingers onto the display screen 2 from each other and detect both. In other words, detected are a state in which one spot in the display screen 2 has a pressing equal to or more than a predetermined value and a state in which two spots in the display screen 2 each have a pressing equal to or more than a predetermined value at the same time.

The display controller 204 applies two kinds of screen-switching behaviors in accordance with the selective use of the above two kinds of touch pressing operations. As shown in FIG. 12, the display controller 204 controls first and second directions as a direction of switching the screen. As a correspondence relation, the pressing with one finger indicates the screen-switching in the first direction, for example, in a layer falling direction, and the pressing with the two fingers indicates the screen-switching in the second direction, for example, in a layer rising direction.

As shown in an upper side of FIG. 12, the display controller 204 sequentially switches the plural home screens in the layer falling direction serving as the first direction while the pressing equal to or more than a predetermined value with one finger is detected. That is, in a state of holding the pressing, one home screen displayed as the display range 4 on the display screen 2 is sequentially switched in a direction from the front-side top layer L1 toward the back-side bottom layer L5.

As shown in a lower side of FIG. 12, the display controller 204 sequentially switches the plural home screens in the layer rising direction serving as the second direction while the pressing equal to or more than the predetermined value with two fingers is detected. That is, in a state of holding the pressing, one home screen displayed as the display range 4 on the display screen 2 is sequentially switched in a direction from the back-side bottom layer L5 toward the front-side top layer L1.

Additionally, when switched to the desired home screen by the above screen-switching, the user releases the finger from the display screen 2, and puts it into a non-pressing state. At that time, the display controller 204 stops the screen-switching.

[Control Flow (1)]

Figure 13:
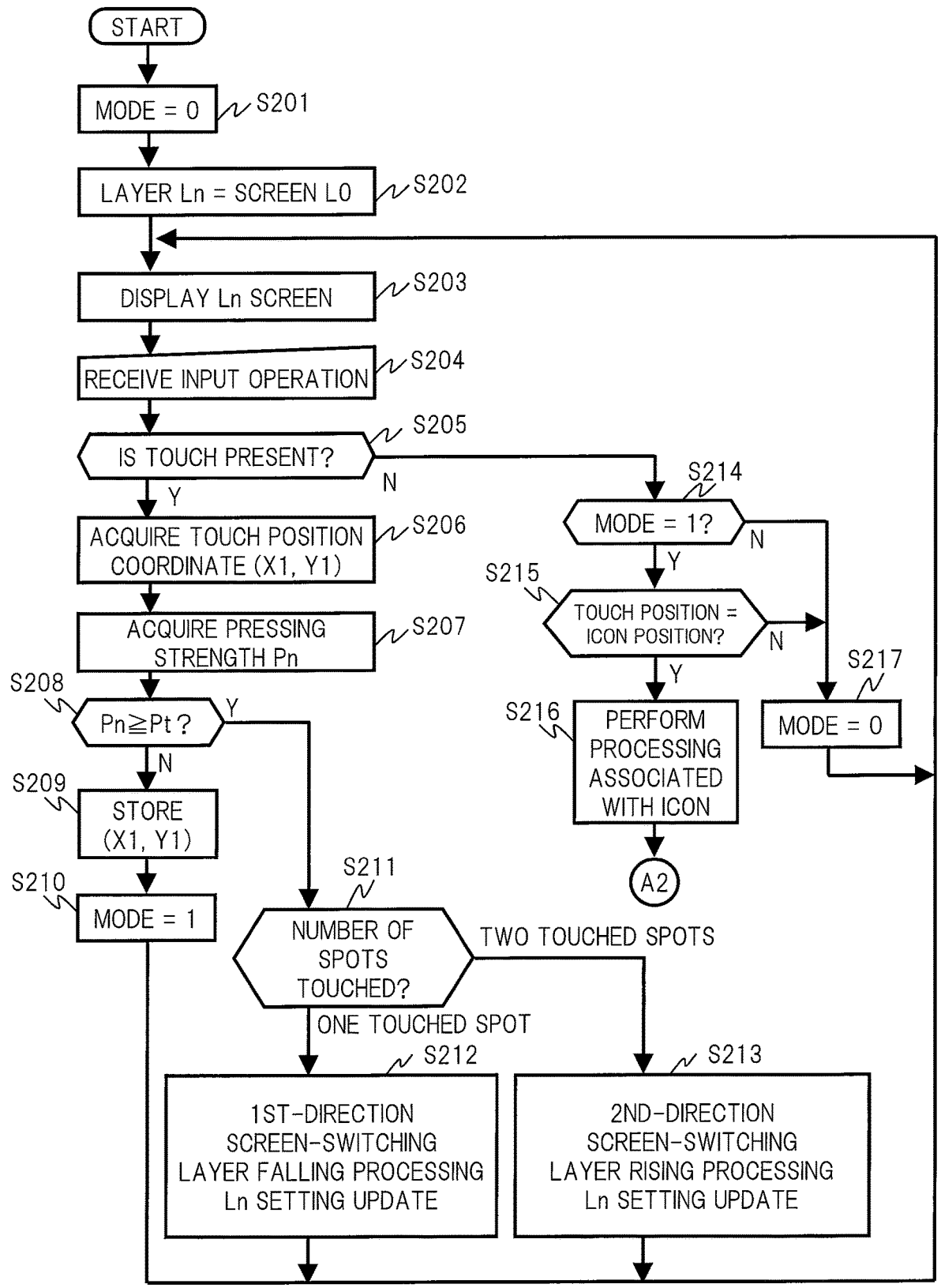
FIG. 13 is a diagram showing a flow of a control processing in the portable terminal device according to Embodiment 2.

FIG. 13 shows a flow of a control processing by the display controller 204 of the portable terminal device according to Embodiment 2. FIG. 13 has steps S201 to S217. The steps will be explained in order hereinafter. Embodiment 2 has, as modes, a first mode, a second mode, a third mode, and a fourth mode. Incidentally, the modes in each of Embodiments are independent, and have different meanings.

(S201) The display controller 204 sets a mode to mode=0 (first mode). (S202) A layer of one home screen to be displayed on the display screen 2 is set to a layer Ln. Firstly, the display controller 204 sets the layer Ln to a top layer L1. (S203) The display controller 204 displays, on the display screen 2, the home screen corresponding to the set layer Ln. At the beginning, the home screen H1 corresponding to the layer L1 is displayed. (S204) The display controller 204 receives a touch pressing operation through the operation unit 106 and the touch pressing sensor 117. (S205) The display controller 204 branches a processing in accordance with presence or absence of a touch. If the touch is present, the processing proceeds to S206. If not, the processing proceeds to S214.

(S206) The display controller 204 acquires touch input information including a touch position coordinate (X1, Y1) detected by the touch detector 201. This touch input information includes information on a distinction between the one-finger touch and the two-finger touch. (S207) The display controller 204 acquires a pressing strength Pn detected by the pressing detector 202. (S208) The display controller 204 determines whether the pressing strength Pn is equal to or more than a threshold value Pt, and branches the processing. If Pn≥Pt, the processing proceeds to S211. If Pn<Pt, the processing proceeds to S209.

(S209) The display controller 204 stores the touch position coordinate (X1, Y1) in the memory, and retains it. (S210) The display controller 204 sets the mode to mode=1 (second mode), and returns to S203.

(S211) Meanwhile, in S211, the display controller 204 determines, based on the touch input information acquired in S206, whether the touch position is one or two, that is, how many spots the touch are made at, and branches the processing. If the touch is made at one spot, the processing proceeds to S212. If the touches are made at two spots, the processing proceeds to S213. (S212) The display controller 204 performs a layer falling processing as first-direction screen-switching corresponding to the one-spot touch. The display controller 204 updates the setting of the layer Ln as necessary in the layer falling processing, and returns to S203. (S213) The display controller 204 performs a layer rising processing as second-direction screen-switching corresponding to the two-spot touches. The display controller 204 updates the setting of the layer Ln as necessary in the layer rising processing, and returns to S203.

(S214) Meanwhile, in a case of no touch at S205, the display controller 204 checks whether the mode is mode=1 (second mode) at S214, and branches the processing. If mode=1 (second mode), the processing proceeds to S215. If not, the processing proceeds to S217. (S215) The display controller 204 determines whether the touch position coordinate (X1, Y1) stored in S209 coincides with a position of the icon in the home screen displayed on the display screen 2, and branches the processing. If the touch position corresponds to the icon position, the processing proceeds to S216. If not, the processing proceeds to S217. (S216) The display controller 204 performs a processing for executing an application associated with the corresponding icon position. Then, the processing exits a loop of this flow similarly to A2, and shifts (transitions) to a processing of the application screen of the application to be executed. (S217) The display controller 204 sets the mode to mode=0 (first mode), and returns to S203.

[Control Flow (2)]

Figure 14:
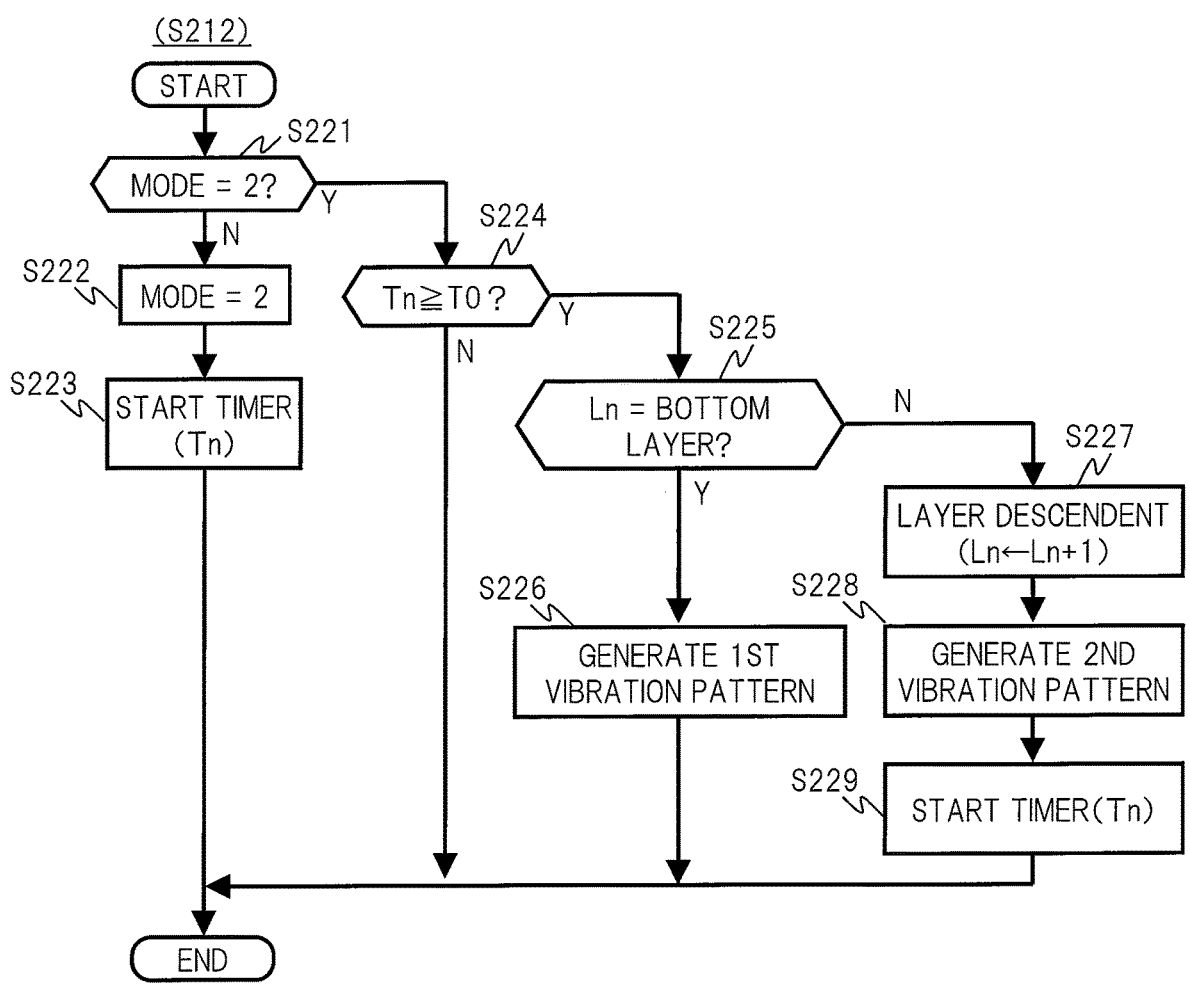
FIG. 14 is a diagram showing a flow of a processing of screen-switching in a first direction in the portable terminal device according to Embodiment 2.

FIG. 14 shows details of the layer falling processing in step S212 of FIG. 13. This processing has steps S221 to S229. For control, a processing at S212 has mode=2 (third mode). The third mode represents a layer falling processing.

(S221) The display controller 204 checks whether the current mode is mode=2 (third mode), and branches the processing. If mode=2 (third mode), the processing proceeds to S224. If not, the processing proceeds to S222. (S222) The display controller 204 sets the mode to mode=2 (third mode). (S223) The display controller 204 starts a timer, and measures its time. It is assumed that a value of the measurement time of the timer is Tn. Then, the layer falling processing of S212 is ended. This value Tn corresponds to a time during which a touch pressing state onto the display screen 2 is held by the user.

(S224) The display controller 204 judges whether the value Tn of the timer is equal to or more than a threshold value T0 at a predetermined time, and branches the processing. If the value Tn is equal to or more than the threshold value T0, the processing proceeds to S225. If not, the layer falling processing of S212 is ended.

(S225) The display controller 204 judges whether the layer Ln of the home screen displayed on the display screen 2 is the bottom layer (for example, layer L5), and branches the processing. If the layer Ln is the bottom layer, the processing proceeds to S226. If not, the processing proceeds to S227. (S226) The display controller 204 uses the vibration controller 205 to generate a predetermined first vibration pattern. This informs the user that the currently displayed home screen has become the home screen H5 corresponding to the bottom layer L5. Then, the layer falling processing of S212 is ended.

(S227) The display controller 204 adds one to a layer number of the layer Ln to be displayed on the display screen 2 so as to cause the layer Ln to descend. For example, if the layer Ln is the first layer L1, it becomes the next layer L2. (S228) The display controller 204 uses the vibration controller 205 to generate a predetermined second vibration pattern. This informs the user that the currently displayed home screen has become a home screen corresponding to a layer other than the bottom layer. For example, when switching the home screen to a screen of the bottom layer, the display controller 204 generates, as the first vibration, a vibration larger than the second vibration. (S229) Thereafter, the display controller 204 starts the timer again, and ends the layer falling processing of S212.

[Control Flow (3)]

Figure 15:
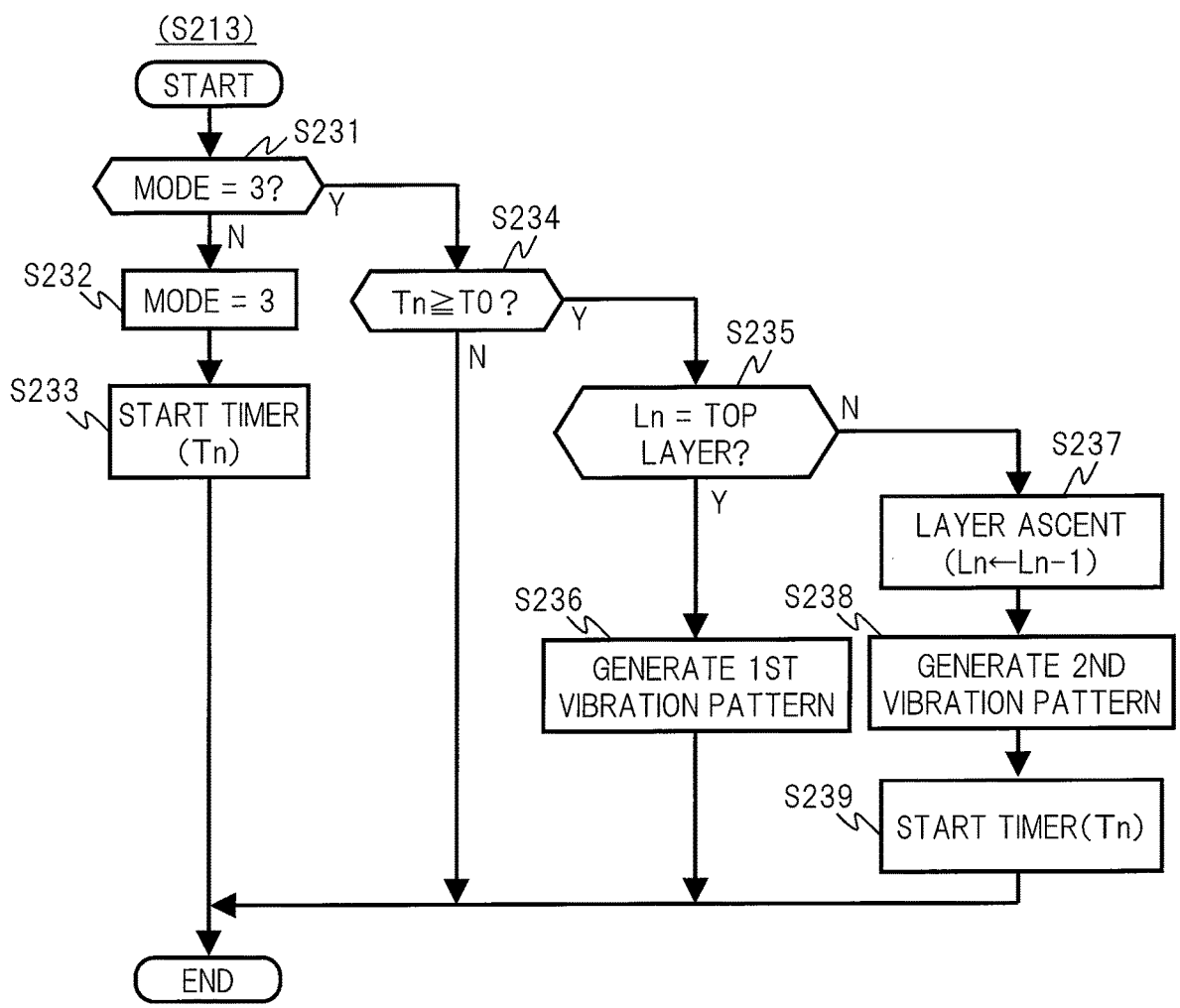
FIG. 15 is a diagram showing a flow of a processing of screen-switching in a second direction in the portable terminal device according to Embodiment 2.

FIG. 15 shows details of the layer rising processing in step S213 of FIG. 13. This processing has steps S231 to 239. This processing is basically thought similarly to the layer falling processing of FIG. 14. For control, a processing at S213 has mode=3 (fourth mode). The fourth mode represents the layer rising processing.

In S231, the display controller 204 checks whether the current mode is mode=3 (fourth mode), and branches the processing. If mode=3 (fourth mode), the processing proceeds to S234. If not, the processing proceeds to S232. In S232, the display controller 204 sets the mode to mode=3 (fourth mode). In S233, the display controller 204 starts the timer, measures its time, and ends the layer rising processing of S213. In S234, the display controller 204 judges whether the value Tn is equal to or more than the threshold value T0, and branches the processing. If the value Tn is equal to or more than the threshold value T0, the processing proceeds to S235. If not, the layer rising processing of S213 is ended.

In S235, the display controller 204 determines whether the layer Ln of the home screen currently displayed on the display screen 2 is the top layer L1, and branches the processing. If the layer Ln is the top layer L1, the processing proceeds to S236. If not, the processing proceeds to S237. In S236, the display controller 204 uses the vibration controller 205 to generate a predetermined first vibration pattern. This informs the user that the currently displayed home screen has become the home screen H1 corresponding to the top layer L1. Then, the layer rising processing of S213 is ended.

In S237, the display controller 204 subtracts one from a layer number of the layer Ln to be displayed on the display screen 2 so as to cause the layer Ln to ascend. In S238, the display controller 204 uses the vibration controller 205 to generate a predetermined second vibration pattern. This informs the user that the currently displayed home screen has become a home screen corresponding to a layer other than the top layer. For example, when switching the home screen to the top screen, the display controller 204 generates, as the first vibration, vibration larger than the second vibration. In S239, the display controller 204 starts the timer again, and ends the layer rising processing of S213.

[Effects Etc.]

As described above, in Embodiment 2, the operation of pressing the display screen 2 with one or two fingers makes, as shown in FIG. 12, it possible to switch and display the plural home screens in the first or second direction. When selecting the desired home screen from the plural home screens, the user does not require performing an operation of the swipe etc. many times, and can easily switch to the above home screen only by one operation. Additionally, every time the screens are switched, vibration is generated, so that the user can easily recognize a screen-switching state.

Modification Example (1)

A modification example of Embodiment 2 is possible as follows. The modification examples is not limited to detection of simultaneous touches at two spots by two fingers, and may use detection of simultaneous touches at a plurality of spots by a plurality of fingers. A correspondence relationship with control may be set to a layer rise in a case of one finger and a layer fall in a case of two fingers. Further, the modification example is not limited to a layered arrangement of the plural screens, and is applicable also to a parallel arrangement in the X and Y directions. Additionally, the modification example may have a form in which the vibration-generation steps are omitted from FIGS. 14 and 15. One vibration pattern may be used without being divided into the first and second vibration patterns. Additionally, the modification example may substitute display of predetermined characters and images, and predetermined sound outputs, etc. without being limited to the generation of vibration.

Modification Example (2)

Figure 16:
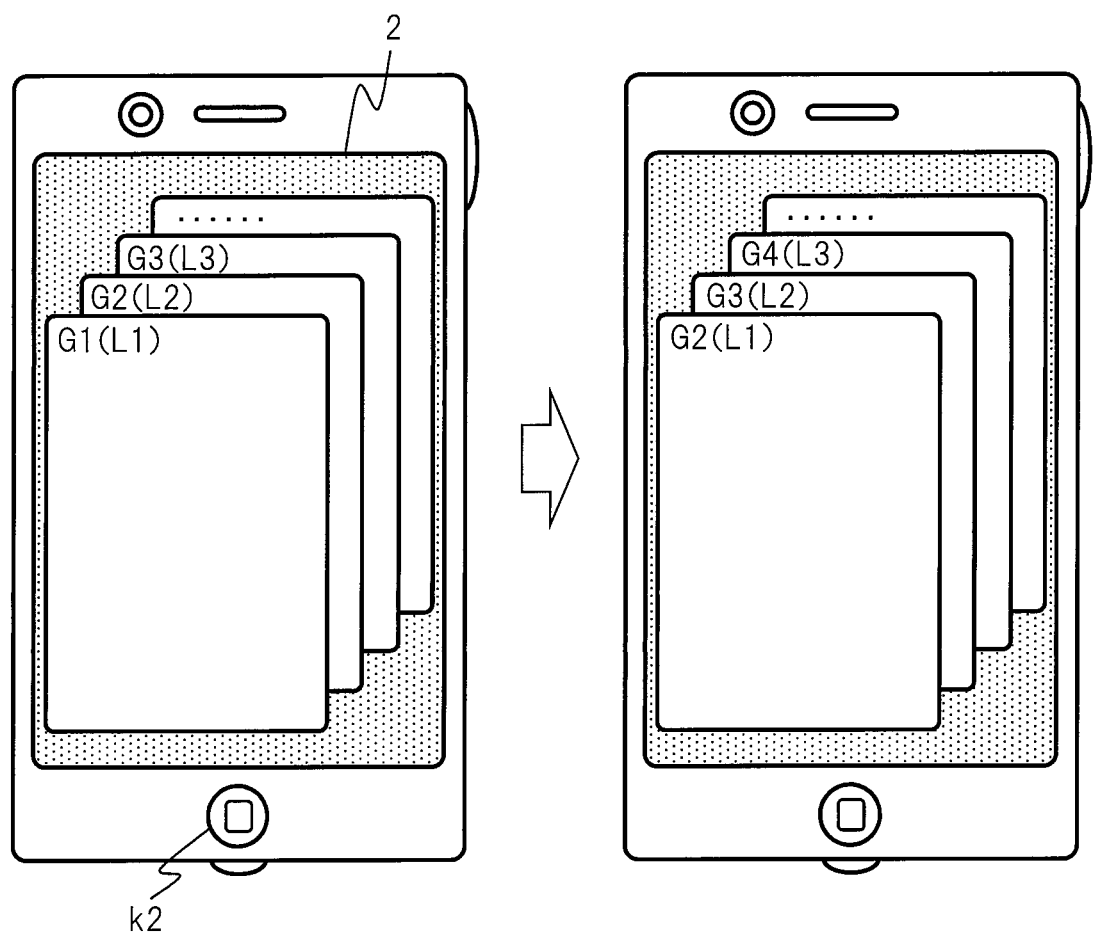
FIG. 16 is a diagram showing a display state of a display screen in a portable terminal device that is a modification example of Embodiment 2.

FIG. 16 shows a display state of the display screen 2 in a modification example. As shown in FIG. 16, the screen display 2 may display therein a plurality of screens at a layered or parallel arrangement. In such a case, the modification example can be applied to almost the same control as that of Embodiment 2. For example, when a home key k2 is depressed twice, a state of the ordinary home screen shifts (transitions) to a layer display state of having the plural screens as shown on a left side of FIG. 16. This example shows a case of a layered arrangement of a plurality of application screens G1 to G4 etc. The left-side state displays such a state that the application screen G1 is, as the layer L1, at the frontmost position. If this state is pressed with one finger therefrom, the layer falls and the left-side state of FIG. 16 is switched to a layer display state on a right side of FIG. 16. This state displays such a state that the application screen G2 is displayed, as the layer L1, at the frontmost position.

Modification Example (3)

Information serving as a target to be subjected to the display range change control is not limited to the plural home screens, and can be similarly applied also to the plural application screens etc.

Figure 17:
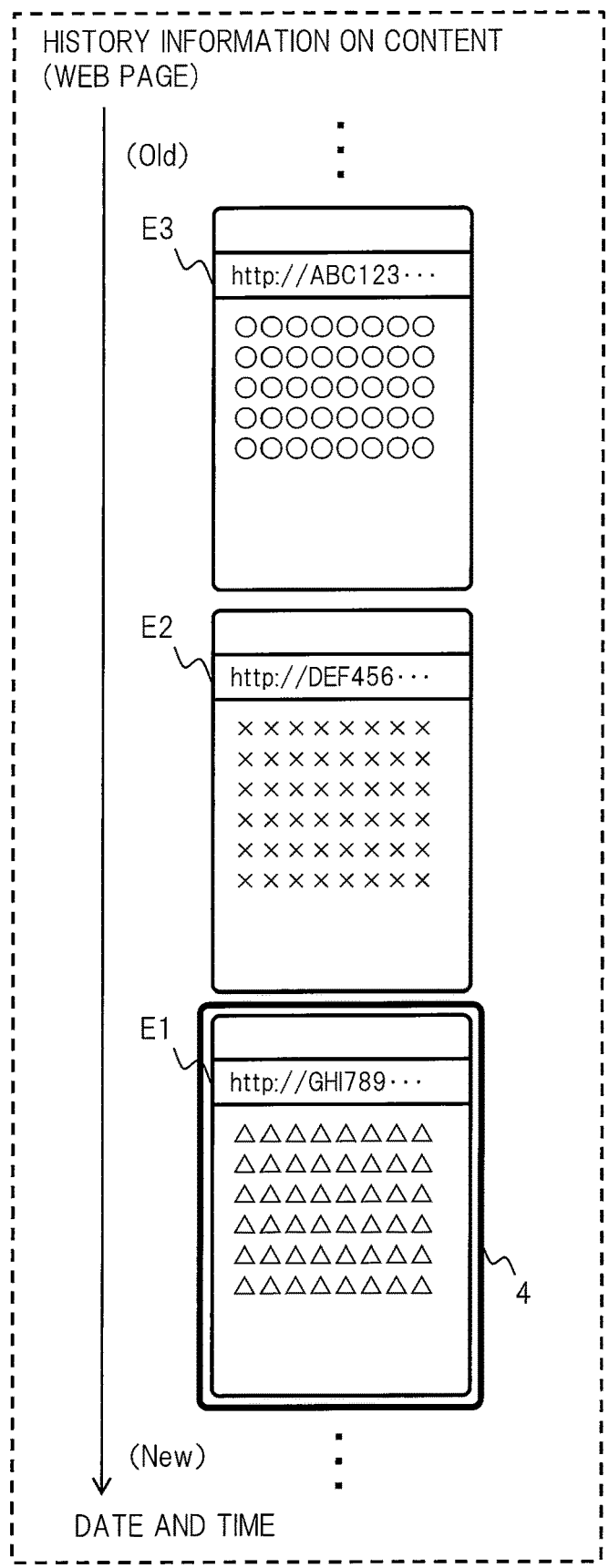
FIG. 17 is a diagram showing content history information in the portable terminal device that is the modification example of Embodiment 2.

FIG. 17 shows a case where content history information in the application screen is used as a target to be subjected to the change control. FIG. 17 has content history information in chronological order and, for example, shows history screens E1 to E3 etc. corresponding to pieces of browse history information on Web pages. For example, in this example, the latest history screen E1 is set at the display range 4. The operation of pressing the display screen to change an inclination in the Y direction like Embodiment 1, the operation of pressing the display screen with one or two fingers like Embodiment 2, or the like displays the history screens E1 to E3 etc. by causing them to be switched in a direction of the present toward the past or a direction of the past toward the present.

Figure 18:
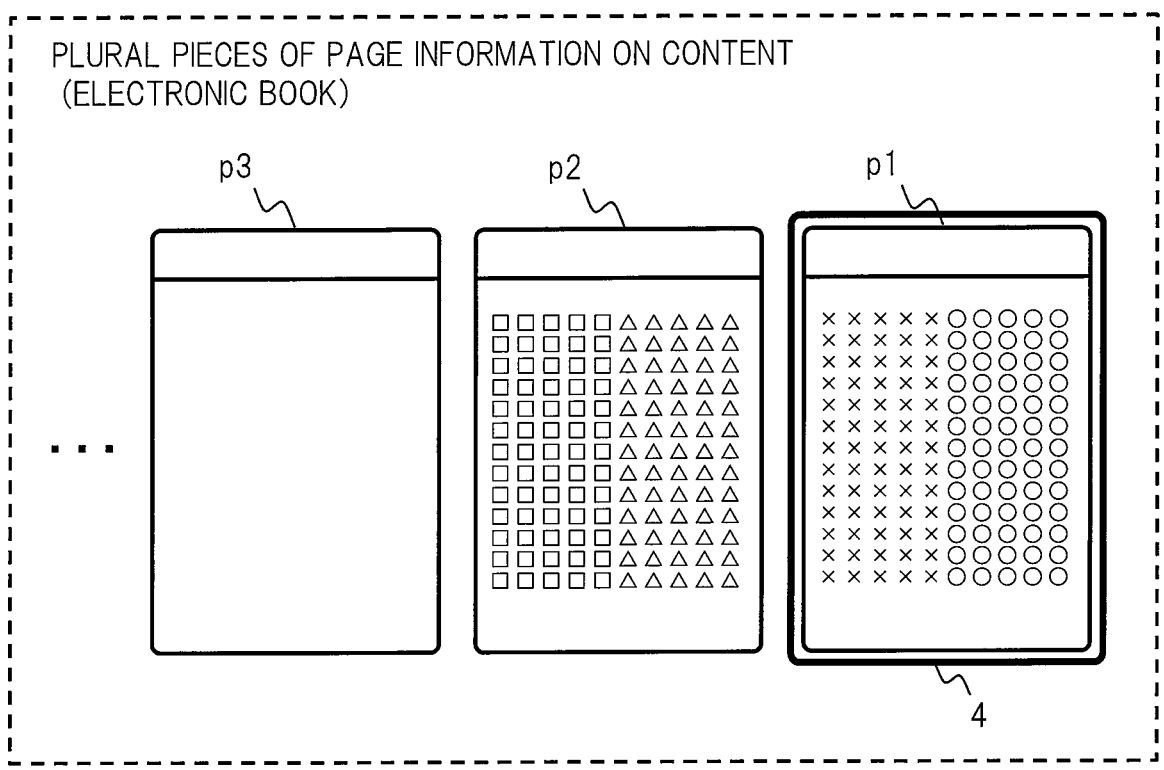
FIG. 18 is a diagram showing a plurality of pieces of page information of content in the portable terminal device according to Embodiment 2.

FIG. 18 shows a case where content in the application screen, for example, a plurality of pieces of page information constituting an electronic book is set as a target to be subjected to the change control. For example, page screens p1 to p3 etc. corresponding to each page are shown as a plurality of pieces of page information. For example, the top page screen p1 becomes the display range 4. Similarly, the operation of pressing the display screen to change the tilt in the X direction, the operation of pressing the display screen with one or two fingers, or the like makes it possible to switch the page screens p1 to p3 etc. to a desired direction and display them.

Embodiment 3

A portable terminal device according to Embodiment 3 of the present invention will be described With reference to FIGS. 19 to 22. Hereinafter, Embodiment 3 different from Embodiment 1 etc. in components (constituent parts) will be described. Embodiment 3 shows a case of controlling the switching of the plural home screens similarly to Embodiment 2.

[Display Control]

FIG. 19 shows display control of Embodiment 3. The user selectively uses two kinds of touch pressing operations. The portable terminal device is separately provided with two kinds of areas, an upside area R1 and a downside area R2, in the display screen 2, that is, in a region of the home screen. The two kinds of touch pressing operations has a first operation for pressing a spot in the upside area R1 and a second operation for pressing a spot in the downside area R2. As shown in an upper side of FIG. 19, when the first operation is performed, the portable terminal device performs the screen-switching in the first direction similarly to an upside behavior of FIG. 12 in Embodiment 2. As shown in a lower side of FIG. 19, when the second operation is performed, the portable terminal device performs the screen-switching in the second direction similarly to a downside behavior of FIG. 12. Incidentally, a boundary line 190 indicated by a dash-single-dot line is a boundary line between the upside area R1 and the downside area R2, and is not displayed in the display screen 2.

[Control Flow (1)]

Figure 20:
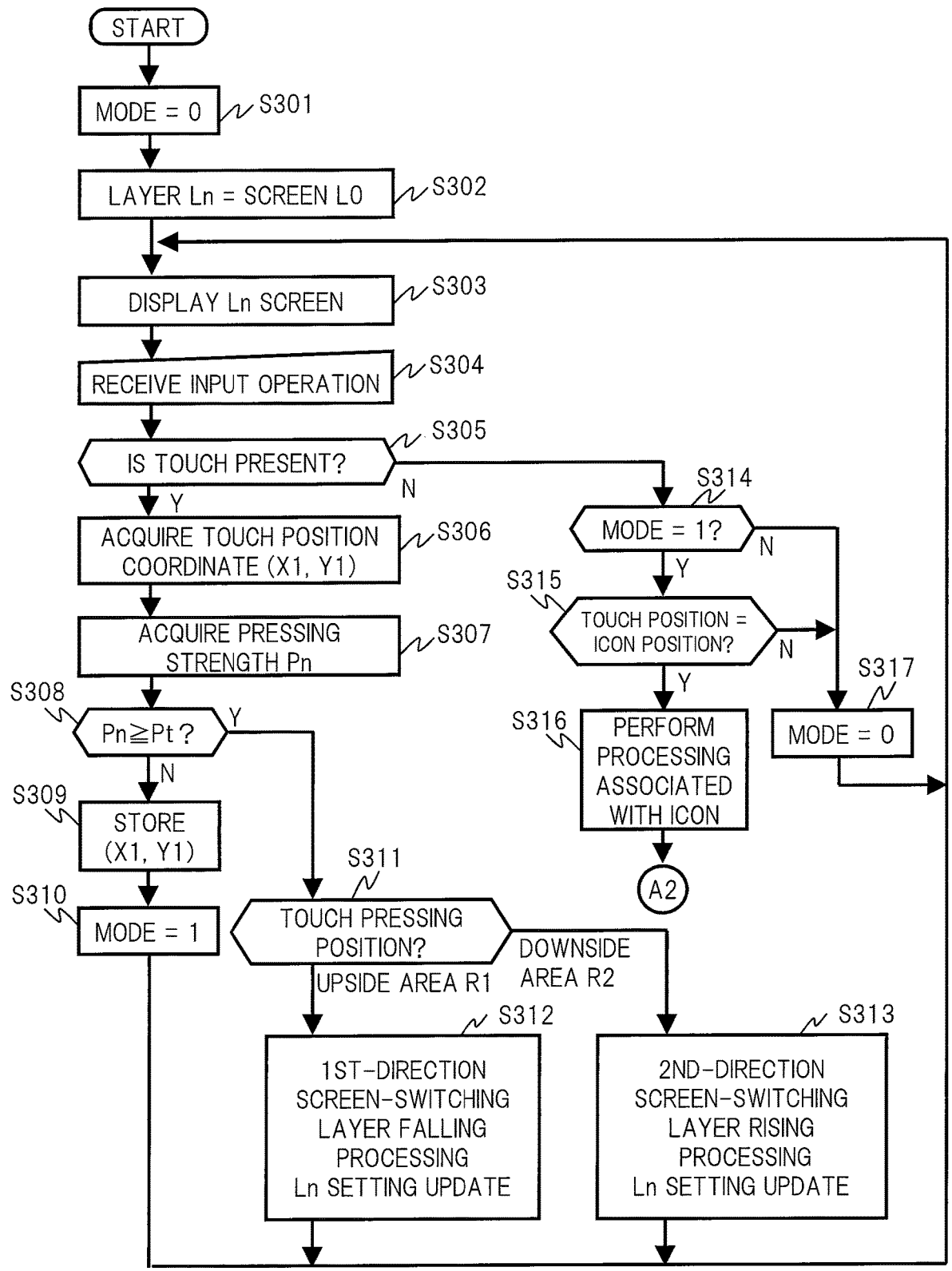
FIG. 20 is a diagram showing a flow of a control processing in the portable terminal device according to Embodiment 3.

FIG. 20 shows a flow of a control processing of the display controller 204 in Embodiment 3. The flow has steps S301 to S317. The flow of FIG. 20 mainly different from the flow of FIG. 13 in Embodiment 2 is to include steps S311 to S313. If the pressing strength Pn is equal to or more than the threshold value Pt at S308, the processing proceeds to S311. This flow has a first mode to a fourth mode for the control.

(S311) The display controller 204 determines whether the touch pressing position indicated by the touch position coordinate (X1, Y1) acquired in S306 is within the upside area R1 or downside area R2. For example, the display controller 204 determines that the touch pressing position is within the upside area R1 when a value Y1 is smaller than the half (Ym/2) of a vertical width Ym, and the touch pressing position is within the downside area R2 when the value Y1 is larger. The display controller 204 branches the processing in accordance with a distinction between these two kinds of areas. If the touch pressing position is within the upside area R1, the processing proceeds to S312. If the touch pressing position is within the downside area R2, the processing proceeds to S313.

(S312) The display controller 204 performs a layer falling processing as first-direction screen-switching corresponding to the upside area R1, updates setting of the layer Ln in the above falling processing as necessary, and returns to S303.

(S313) The display controller 204 performs a layer rising processing as second-direction screen-switching corresponding to the downside area R2, updates the setting of the layer Ln in the above rising processing as necessary, and returns to S303.

[Control Flow (2)]

Detailed processings of S312 and S313 in FIG. 20 are as follows. Those processings are basically the same as those in FIGS. 14 and 15, and a difference therebetween is as follows. In S224 of FIG. 14 and S234 of FIG. 15, whether the time value Tn of the timer is equal to or more than the threshold value T0 is determined when the mode of their steps is the third or fourth mode. Embodiment 3 performs the following processing instead of S224 in FIG. 14 and S234 in FIG. 15.

First, the display controller 204 determines a time interval Kn related to an update of the layer Ln in a screen-switching display operation based on the following expression (3).

$$Kn = K0 \times Pt/Pn \qquad (3)$$

It is assumed that a time interval to be obtained in the expression (3) is Kn, and that a predetermined time interval as a reference is K0. The display controller 204 uses a pressing strength Pn and a pressing threshold value Pt. Incidentally, concrete values like Pt etc. are different for each Embodiment. The expression (3) calculates the time interval Kn so as to decrease the time interval K0 in accordance with magnitude of a ratio (Pt/Pn) of the threshold value Pt to the pressing strength Pn. That is, the calculation is determined so that the time interval Kn becomes shorter as the pressing strength Pn becomes larger. The display controller 204 uses the time interval Kn as a threshold value T0 related to the time value Tn of the timer.

Next, the display controller 204 compares the time value Tn of the timer with the time interval Kn which is the threshold value T0, thereby branching the processing. If the value Tn is equal to or more than a value of the time interval Kn, the processing proceeds to S225 or S235. If not, the processing is ended. As described above, Embodiment 3 variably sets, in accordance with the pressing strength Pn, the time interval related to a layer update in switching the screen.

[Setting of Time Interval]

Figure 21:
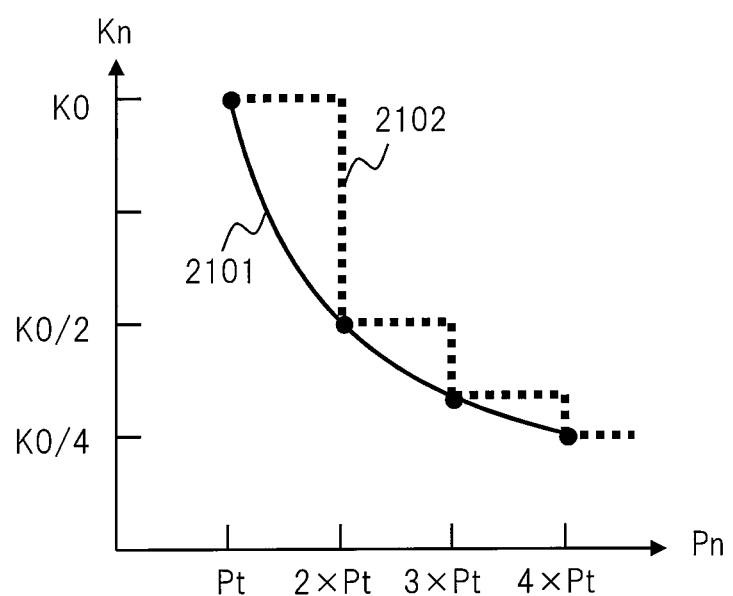
FIG. 21 is a diagram showing a relationship between a pressing and a time interval in the portable terminal device according to Embodiment 3.

FIG. 21 shows a relationship between the pressing strength Pn and the time interval Kn, which is related to setting of the above time interval Kn. Embodiment 3 determines the time interval Kn by a curve 2101 following the expression (3). The curve 2101 is a nonlinear function and, as Pn is made larger than Pt, decreases Kn steeply at the beginning and gradually thereafter.

Incidentally, as a modification example, a stepwise relationship like a function 2102 may be applied, or a linear function may be applied. By the function 2102, the time interval Kn is determined as a constant value for each area of Pn. An upper limit value and a lower limit value of the time interval Kn may be defined. The time interval Kn may be a constant value regardless of the pressing strength Pn, or may be a user set value.

[One-Hand Operation]

Figure 22A:
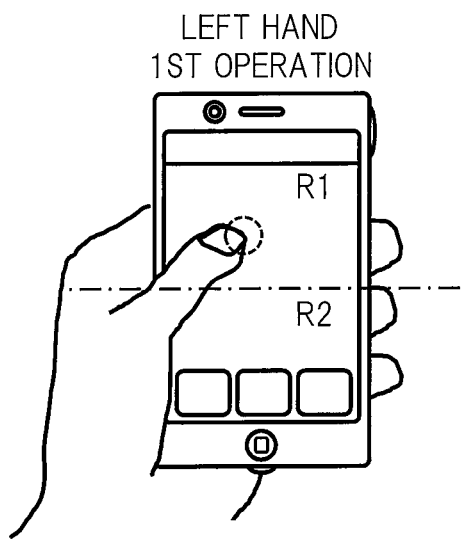
Figure 22B:
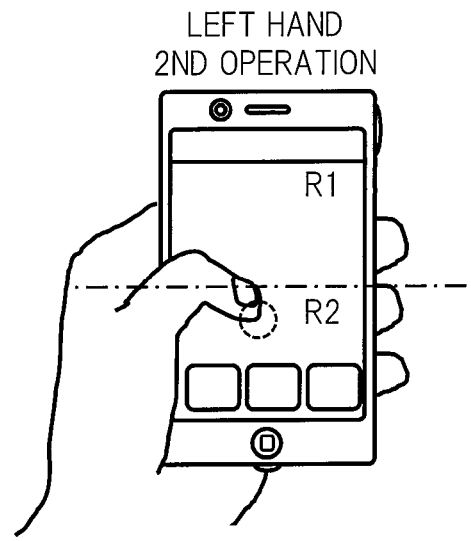
Figure 22C:
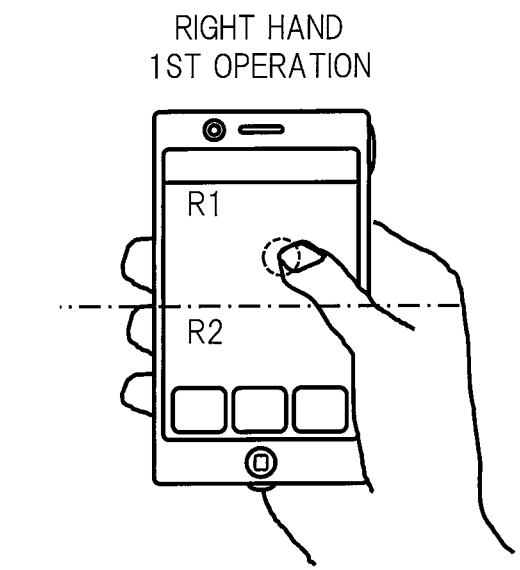
Figure 22D:
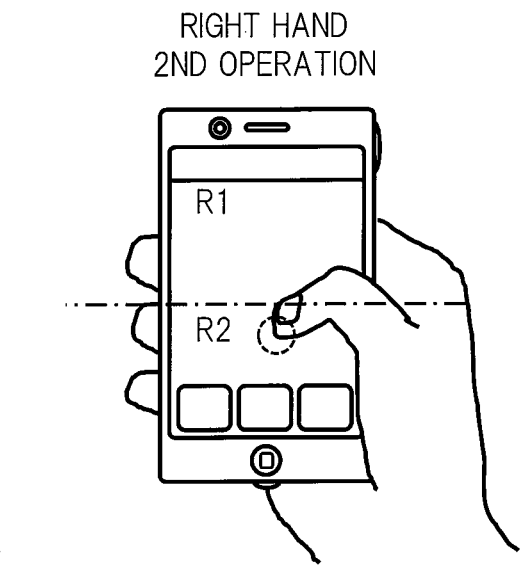

FIGS. 22(a)-22(d) show operations corresponding to right and left hands in Embodiment 3. FIG. 22(a) shows a first operation of pressing the upside area R1 with the left hand. FIG. 22(b) shows a second operation of pressing the downside area R2 with the left hand. FIG. 22(c) shows a first operation of pressing the upside area R1 with the right hand. FIG. 22(d) shows a second operation of pressing the downside area R2 with the right hand. As described above, Embodiment 3 has a function capable of handling both one-hand operations composed of the operation only by the left hand and the operation only by the right hand. The user can select any one-hand operation. Incidentally, each of Embodiment 1 etc. also has a function capable of handling the both one-handed operations similarly to the above. Embodiment 2 uses both hands and two fingers.

[Effects Etc.]

As described above, in Embodiment 3, the user performs an operation of pressing the upside area R1 or downside area R2 in the display screen 2, thereby being able to switch and display the plural home screens. This makes it possible to easily switch, similarly to Embodiment 2, to the desired home screen without requiring performing the touch input operation many times.

Modification Example

The following is possible as a modification example of Embodiment 3. A correspondence relationship with control may be a layer rise in a case of the upside area R1, and a layer fall in a case of the downside area R2. The two kinds of regions composed of the upside area R1 and the downside area R2, and the position of the boundary line 190 therebetween may be fixed setting values on the mounting, or may be variable setting values settable by the user. The user setting makes it possible to set a suitable area easily operated by the user in accordance with each size etc. of the user's hand and finger. A user setting means may display, for example, the boundary line between the upside area R1 and the downside area R2 on a user setting screen, move the boundary line in accordance with the user input operation, and set it at a position desired by the user. Alternatively, the user may touch and press two desired spots on the user setting screen. The portable terminal device acquires information on their positions and pressing strengths, and sets a boundary line between the two kinds of areas in the middle of these positions. Similarly, user setting may be made possible also by the operations in other Embodiments.

Additionally, two kinds of areas are not limited to the above areas, and are applicable. For example, the display screen 2 may be divided into two kinds of regions like a left area and a right area. In this case, the modification example has a first operation of pressing the left area and a second operation of pressing the right area. Depending on the first and second operations, a direction etc. of switching the screen are caused to differ. For example, it is assumed that a plurality of application screens and a plurality of icons, etc. are arranged in parallel in the X direction. The first operation may be the screen-switch and/or scroll in a left direction, and the second operation may be the screen-switch and/or scroll in a right direction. Further, two kinds of areas may be set to have arbitrary areas at arbitrary positions in the display screen 2.

Embodiment 4

A portable terminal device according to Embodiment 4 of the present invention will be described with reference to FIGS. 23(*a*) and 23(*b*) to FIG. 25. Hereinafter, Embodiment 4 different from Embodiment 1 etc. in components will be described. Embodiment 4 sets, as targets to be subjected to the display range change control, a plurality of icons displayed in the home screen, and performs arrangement change control of the plural icons.

[Control Outline and Icon Arrangement]

FIGS. 23(*a*) and 23(*b*) each show, as an outline of display control in Embodiment 4, a display example of arrangement of a plurality of icons on the home screen. Incidentally, shown is a case in which the user holds the casing 1 in the left hand and operates the device with the thumb.

FIG. 23(*a*) shows a first arrangement state. A plurality of icons 9 are arranged in a matrix in parallel in the X and Y directions and in a region where the home screen is displayed on the display screen 2. This example shows a case in which eight icons 9 associated with eight applications are arranged in an area close to a lower side. The eight icons 9 are indicated by "App 1" to "App 8" for identification.

FIG. 23(*b*) shows a second arrangement state. The plural icons 9 in the second arrangement are arranged like circle or ring, and move so as to rotate on a circumference of the ring. A group of icons 9 is moved for each predetermined time interval similarly to Embodiment 2 etc. Embodiment 4 places a ring whose predetermined position in the display screen 2 is set as a center point Q0.

Embodiment 4 receives a pressing operation of pressing a spot in the display screen 2, a strength of the pressing being equal to or more than a predetermined value. A position of the pressing is set at an arbitrary position in the display screen 2. Incidentally, the position of the pressing may be particularly a position on the icon 9 or a position in an area other than an area of the icon 9. The portable terminal device performs control for changing a display state of the home screen, that is, an icon arrangement in accordance with a predetermined pressing operation. The portable terminal device causes, as its change control, the first arrangement state to transition to the second arrangement state. Then, the portable terminal device in the second arrangement state moves the plural icons arranged like the ring with the pressing held so as to rotate in a predetermined direction.

Additionally, the portable terminal device stops rotating the icons in accordance with a predetermined operation, that is, an operation of releasing the finger to have no pressing, and automatically selects and executes the icon corresponding to a finger-releasing position. The user may shift another position from the firstly pressed position while the pressing strength equal to or more than the predetermined value is maintained. For example, the user shifts the finger to a desired icon position, and releases the finger at the position. Consequently, the portable terminal device selects the icon at the position. Alternatively, the user shifts the finger to a position having no icon, and releases the finger at the position. This returns the portable terminal device to the first arrangement state without selecting the icon.

[Control Flow (1)]

FIG. 24 shows a flow of a control processing of the display controller 204 in Embodiment 4. The flow has steps S401 to S415. For control, the flow has a first mode to a third mode. The flow mainly includes S410 and S415 as characteristic processing parts.

(S401) The display controller 204 sets a mode to mode=0 (first mode). (S402) The display controller 204 displays the home screen on the display screen 2 in the first arrangement state as shown in FIG. 23(*a*). (S403) The display controller 204 receives a user input operation. (S404) The display controller 204 branches the processing in accordance with presence or absence of a touch. If the touch is present, the processing proceeds to step S405. If the touch is absent, the processing proceeds to step S411.

(S405) The display controller 204 acquires a touch position coordinate (X1, Y1). (S406) The display controller 204 acquires a pressing strength Pn. (S407) The display controller 204 determines whether the pressing strength Pn is equal to or larger than the threshold value Pt, and branches the processing. If Pn≥Pt, the processing proceeds to S410. If Pn<Pt, the processing proceeds to S408. (S408) The display controller 204 stores and retains the touch position coordinate (X1, Y1) in the memory. (S409) The display controller 204 sets the mode to mode=1 (second mode), and returns to S403. (S410) The display controller 204 performs an icon arrangement change processing. That is, the display controller 204 causes the icon arrangement state of the display screen 2 to transition from the first arrangement state to the second arrangement state. Details of this processing are shown by FIG. 25. After this processing, the display controller returns to S403.

(S411) Meanwhile, if the touch is absent in S404, the display controller 204 checks in step S411 whether the mode is mode=1 (second mode), and branches the processing. If mode=1 (second mode), the processing proceeds to S412. If not, the processing proceeds to S414. (S412) The display controller 204 compares the touch position coordinate (X1, Y1) stored in S408 with the icon position in the home screen, judges whether the both positions coincide with each other, and branches the processing. If the touch position, that is, the position where the pressing is held corresponds to the icon position, the processing proceeds to S413. If not, the processing proceeds to S414. (S413) The display controller 204 performs a processing of executing an application associated with the corresponding icon. Thereafter, as shown by A4, this flow exits its loop, and is shifted (transitions) to a processing of an execution-destination application. (S414) The display controller 204 sets the mode to mode=0 (first mode), and proceeds to S415. (S415) The display controller 204 performs an icon arrangement restoration processing. That is, the display controller 204 causes the icon arrangement state to transition from the second arrangement state to the first arrangement state. Then, the display controller returns to S403.

[Control Flow (2)]

FIG. 25 shows details of an icon arrangement change processing in step S410. FIG. 25 has steps S421 to S428. FIG. 25 includes S423 and S427 as characteristic processing parts.

(S421) The display controller 204 confirms whether the mode is mode=2 (third mode), and branches the processing. If mode=2 (third mode), the processing proceeds to S425. If not, the processing proceeds to S422. (S422) The display controller 204 sets the mode to mode=2 (third mode). (S423) The display controller 204 performs an icon arrangement rotation display processing. The display controller 204 arranges the plural icons into a ring shape as shown in FIG. 23(b). The ring is arranged based on a center point Q0. In an initial state, for example, the icon "App 1" is placed at a predetermined position, at a position of an upper end (12 o'clock of a clock) in this example, and the icons "App 2" to "App 8" are sequentially arranged at regular intervals clockwise therefrom. The regular intervals are determined in accordance with the number of icons. Alternatively, the display controller 204 may place the icon closest to the pressing position (for example, "App 2" in FIG. 23(a)) at the nearest position on the ring (for example, the position of "App 8" in FIG. 23(b)). Incidentally, depending on the number of icons, the display controller may adjust a change of a size of the ring, a change of a size of each icon, display of a part of the ring in the display screen 2, and/or the like. (S424) The display controller 204 starts the timer, measures its time as a value Tn, and ends this flow.

(S425) Meanwhile, if mode=2 (third mode), the display controller 204 sets, in S425, a time interval Kn similarly to Embodiment 3. That is, Kn=K0×Pt/Pn is calculated based on the above expression (3). This time interval Kn is used as a time interval in moving the icon by a predetermined distance. Its concrete value is different from that in Embodiment 3. As described above, the time interval Kn decreases depending the pressing strength Pn, so that the icon position is switched more quickly for such decrease. (S426) The display controller 204 judges whether the value Tn of the timer is equal to or more than a value of a time interval Kn which is the threshold value T0, and branches the processing. If Tn≥Kn, the processing proceeds to S427. If not, this flow is ended. (S427) The display controller 204 performs an icon arrangement movement processing in the second arrangement state. As the display of the icon group arranged on the circumference of the ring, the display controller 204 causes the icons to move in units of a predetermined regular distance in a predetermined direction (clockwise) for each icon. For example, the icon "App 1" initially placed at an upper-end position in FIG. 23(b) is moved to a position of the icon "App 2". Each icon is similarly moved to a position of its next icon. (S428) The display controller 204 starts the timer again, and ends this flow.

[Effects Etc.]

As described above, in Embodiment 4, even if the finger does not reach a desired icon that the user wishes to select in the first arrangement state, the user changes to the second arrangement state and releases the finger when the desired icon reaches a position of the finger, thereby being able to select the desired icon. Conventionally, when the user selects an icon with one finger of one hand, the finger has not reached a desired icon in some cases. In this case, the user needs to take time and effort such as a change of a state of the hand holding the portable terminal device, or a push of the desired icon with a finger of another hand. Embodiment 4 brings unnecessity of such time and effort, and makes it possible to easily and quickly select the icon(s) with one hand and/or one finger. Additionally, changing the time interval of rotation of the icons in accordance with the pressing strength makes it possible to quickly move the desired icon at the position where the finger reaches.

Modification Example

The following is possible as a modification example of Embodiment 4. The display control of Embodiment 4 is similarly applicable by targeting other objects without being limited to the plural icons arranged in the screen. Examples of other objects include a plurality of mail items etc. on an application screen of a mail.

Additionally, the movement of the icon group is not limited to intermittent movement per time interval, and may be continuous movement similarly to the scroll of Embodiment 1. The movement of the icon group is not limited to the ring-like rotation, and is possible. For example, the plural icons are arranged in parallel in the X direction, the Y direction, or an arbitrary direction, and a head icon and an end icon are connected like a loop. At their arrangement, the icon group is moved per time interval or by the continuous scrolling or the like.

Further, a position of the center point Q0 of the virtual ring formed along the icon arrangement is not limited to the fixed set value on the mounting, and may be a variable position depending on the user setting. For example, the position of the center point can be set to a suitable position in accordance with the positions of the hand and the finger used by the user. Additionally, the position of the center point Q0 may be determined in accordance with the position of the touch pressing in each case. For example, a point of the touch position coordinate (X1, Y1) may be the center point Q0, or the center point Q0 may be set near the point.

Further, the modification example may be an embodiment in which the icon arrangement change control of Embodiment 4 is combined to the control for utilizing two kinds of operations of Embodiments 2 and 3. In this case, a rotation direction etc. of the icons can be changed in accordance with a kind of the pressing operation. For example, the rotation direction can be set clockwise in pressing a first area, counterclockwise in pressing a second area, or the like.

Embodiment 5

A portable terminal device according to Embodiment 5 of the present invention will be described with reference to FIGS. 26 to 27. Hereinafter, Embodiment 5 different from Embodiment 1 etc. in components will be described. Embodiment 5 selectively uses, as two kinds of operations, a pressing operation onto the front surface of the casing 1 by a pressing sensor, and a pressing operation onto the back surface of the casing 1 by a pressing sensor. The portable terminal device performs different display range change control in accordance with those operations. Similarly to Embodiment 2 etc., a case of switching the plural home screens is shown as a target and a behavior of the change control, but scrolling etc. of the content display information can be also applied similarly to the above.

[Appearance and Operation]

FIG. 26 shows an appearance, and an operation, etc. of the portable terminal device according to Embodiment 5. A left side of FIG. 26 shows a front surface of the portable terminal device, and shows a state of holding it in a left hand. The touch pressing sensor 117 is disposed in a region corresponding to the display screen 2. A right side of FIG. 26 shows a back surface of the portable terminal device, and shows a state of holding it with a left hand. A back-surface pressing sensor 118 is disposed on the back surface and at a predetermined position, for example, a position of being at an X-direction center and in the Y-direction upside area. An operation of pressing the back-surface pressing sensor 118 with one finger of the left hand is shown.

[Device Configuration]

The portable terminal device according to Embodiment 5 includes, as configurations different from the configurations of FIG. 2 in Embodiment 1, the back-surface pressing sensor 118 in addition to the touch pressing sensor 117 within the sensor 110. The back-surface pressing sensor 118 detects presence or absence of a pressing and its strength. The pressing detector 202 of FIG. 3 detects not only a pressing state of the touch pressing sensor 117 but also a pressing state of the back-surface pressing sensor 118.

[Control Flow]

FIG. 27 shows a flow of a control processing of the display controller 204 in Embodiment 5. The flow has steps S501 to S518. Processings of S501 to S510 are almost the same as those of S201 to S210 in Embodiment 2. In step S502, a layer Ln for a layer update in switching the screen is set. Firstly, a screen of the layer L1 is displayed. In step S507, a pressing strength Pn is detected by using the touch pressing sensor 117 lying on the front surface. In S508, if the pressing strength Pn is equal to or more than the threshold value Pt, the processing proceeds to S511. (S511) The display controller 204 performs a layer falling processing as first-direction screen-switching, updates the layer Ln as necessary, and returns to S503.

(S512) Meanwhile, if no touch is judged through the touch pressing sensor 117 at step S505, the processing proceeds to step S512. In S512, the pressing detector 202 detects a pressing state through the back-surface pressing sensor 118. The pressing detector 202 acquires a pressing strength Pm as the above pressing state. (S513) The display controller 204 judges whether the pressing strength Pm is equal to or more than a predetermined threshold value Ps, and branches the processing. If Pm≥Ps, the processing proceeds to S514. If not, the processing proceeds to S515. (S514) The display controller 204 performs a layer rising processing as second-direction screen-switching, updates the layer Ln as necessary, and returns to S503. The processings subsequent to S515 are almost the same as the processings subsequent to S214 in FIG. 13.

Details of the layer falling processing of S511 are as follows. They are basically almost the same as the layer falling processing of Embodiment 2 or 3. In S511, for the pressing strength Pn acquired in S507, a time interval Kn related to a layer update is set similarly to S425 of FIG. 25. Then, the display controller 204 judges whether the time value Tn of the timer is equal to or more than a value of the time interval Kn which is the threshold value T0, and branches the processing. Processings subsequent thereto are almost the same as those described above.

Details of the layer rising processing of S514 are as follows. They are basically almost the same as the layer rising processing of Embodiment 2 or 3. In S514, for the pressing strength Pm of the back surface acquired in S512, the time interval Kn related to the layer update is set similarly to S425 of FIG. 25. For example, the time interval Kn is determined based on the following expression (4).

$$Kn = K0 \times Ps/Pm \quad (4)$$

Then, the display controller 204 judges whether the time value Tn of the timer is equal to or more than the value of the time interval Kn which is the threshold value T0, and branches the processing. Processings subsequent thereto is almost the same as those described above.

[Effects Etc.]

As described above, in Embodiment 5, when the user performs an operation in which the touch pressing sensor 117 of the display screen 2 in the front surface is pressed with a force of a predetermined value or more, the plural home screens are switched in the first direction and displayed. Additionally, when the user performs an operation in which the back-surface pressing sensor 118 in the back surface is pressed with a force of a predetermined value or more, the plural home screens are switched in the second direction and displayed. The user can easily perform the screen-switching etc. while selectively using the pressing onto the front surface and the pressing onto the back surface with the portable terminal device held in one hand.

Modification Example

The following is possible as a modification example of Embodiment 5. As a correspondence relationship with the control Embodiment 5 performs the layer falling processing in a case of pressing the front surface, and the layer rising processing in a case of pressing the back surface, but may also adopt an opposite correspondence relationship. Not only the back-surface pressing sensor 118 but also the pressing sensor may be provided at another position of the casing 1, for example, at a position of its side surface.

Other Embodiment

Embodiments as described above have described a case where the targets of the display range change control are the content, home screen, application screen, and icon, etc. Additionally, described as the display behaviors of the change control have been the scroll, screen-changing, and icon movement, etc. Those are not limited to a combination (s) of Embodiments as described above, and variously combined forms are possible as a matter of course.

For example, such a form is possible as to combine, with each other, the control of the touch pressing and the tilt angle in Embodiment 1 and the control for switching the plural screens in Embodiment 2. In a case of this form, when the user performs an operation of pressing the screen to tilt the casing, the portable terminal device uses the pressing strength and the tilt angle to control a direction, speed, time interval, and the like of the screen-switching.

For example, such a form is possible as to combine the scroll display control of the content of Embodiment 1 with the pressing control by the plural fingers of Embodiment 2 or the pressing control of the two kinds of areas of Embodiment 3. In this form, when the user performs the operation of pressing the screen, the portable terminal device uses the pressing strength, the pressed positions, and the number of pressed positions to control the scroll direction and speed, and the like of the content.

Embodiment 6

A portable terminal device according to Embodiment 6 of the present invention will be described with reference to FIGS. 28 to 30. Hereinafter, Embodiment 6 different from Embodiment 1 in components will be described.

[Configuration Outline]

FIG. 28 shows a configuration Outline of a portable terminal device according to Embodiment 6. FIG. 28 shows a state in which the user holds the casing 1 of the portable terminal device in the left hand and touches and presses a spot in the display screen 2 with the thumb. The portable terminal device is tilted with an absolute tilt angle θ with respect to the horizontal plane and the horizontal direction. Some of all pieces of display information 3 such as content are displayed, as the display range 4, on the display screen 2.

The portable terminal device includes a display, a touch detector, a pressing detector, a tilt angle detector, and a display controller, etc. The display displays the display information 3 such as content on the display screen 2. The touch detector detects presence or absence of a touch onto the display screen 2, and its position coordinate, etc. The pressing detector detects a pressing strength etc. onto the display screen 2. The tilt angle detector detects a tilt angle θ of the portable terminal device. The display controller controls, as control for changing the display range 4 of the display information 3, the scrolls 5 and 6 etc. based on a state of the pressing or tilt angle.

When wishing to browse etc. another part of the content displayed on the display screen 2, the user touches and presses a spot in the display screen 2 with, for example, the thumb while holding the device in the hand suitable for the user. It is assumed that this operation is a first pressing operation. In performing the first pressing operation, the user presses the spot with a strength of a certain level or higher and then releases the finger therefrom. At this time, the pressing detector detects a first pressing having a strength equal to or more than a predetermined value. Further, the tilt angle detector detects the tilt angle θ of the casing 1 in the first pressing. The display controller causes a normal mode to shift to a specific control mode based on the detection of the first pressing. The display controller sets, as a reference angle θ0, the tilt angle θ detected in the first pressing. The control mode after the first pressing operation is a state in which the finger is released from the display screen 2, the first pressing is not held, and the touch is absent.

The user performs an operation of tilting the casing 1 in a state of the control mode. In other words, the casing 1 is rotated around a predetermined rotation axis and in a predetermined direction. The tilt angle detector similarly detects an operation of tilting the device, and a tilt angle θn associated with the rotation. The display controller performs the control for changing the display range 4 on the display screen 2 in accordance with magnitude of a value of a difference between the tilt angle θn detected under the state of the control mode and the reference angle θ0. The display controller controls, as its change control, the display behaviors of the scrolls 5 and 6 etc. The scrolls 5 and 6 are behaviors in which the display range 4 displayed on the display screen 2 is continuously moved upward and downward, etc. with respect to the Y direction.

After a part of the desired content is displayed as the display range 4 by the behaviors of the scroll 5 and 6 etc., the user again touches and presses the spot in the display screen 2. It is assumed that this operation is a second pressing operation. At a time of the second pressing operation, the user presses it with a strength having a certain level or higher and releases the finger therefrom. The pressing detector detects a second pressing of a strength equal to or more than a predetermined value at the time of the second pressing operation. Based on the detection of the second pressing, the display controller ends the behaviors of the scrolls 5 and 6 etc., cancels the control mode, and returns to the normal mode. Additionally, during the control mode, the user may tilt the device so as to return the angle θn to a state close to the initial reference angle θ0. In that case, the portable terminal device temporarily stops the scrolls 5 and 6.

A lower side of FIG. 28 shows the above control by a time axis.

The portable terminal device initially enters the control mode from the state of the normal mode by performing the first pressing operation onto the display screen 2, and sets the reference angle θ0. During the control mode, the portable terminal device changes the display range 4 with no first pressing maintained in accordance with the angle θn of the tilting operation. The portable terminal device ends the change of the display range 4 from a state of the control mode by performing the second pressing operation on the display screen 2, releases the control mode, and returns to the normal mode. Thus, the user changes the display range 4 of the content etc. by a simple operation(s), and can browse etc. the desired spot.

[Touch Pressing Detection]

The touch detector 201 can detect a pinch operation etc. In a case of the pinch operation, the user touches the display screen 2 with two fingers, and either widens or narrows an interval between the two fingers as it is. The display controller 204 controls a display behavior such as enlargement or reduction of a display image size in the display screen 2 in accordance with detection of a state of the pinching operation.

[Display Range Change Control and Scroll Display]

In FIG. 8, Embodiment 6 causes the user to perform the first pressing operation onto the region 801 in the display screen 2 and the operation of tilting the casing 1, thereby making it possible to scroll the display range 4. That is, Embodiment 6 can change the display range 4 of the display information 3.

[Display Control]

The display control in the portable terminal device according to Embodiment 6 is as follows. When displaying the content on the application screen of the display screen 2, the display controller 204 of the portable terminal device receives a specific touch pressing operation by the user and an operation of tilting the casing 1, and performs the displays range change control for scrolling the display range 4.

It is assumed that the user is initially in a state of holding the device in the hand as shown in FIG. 6 and browses, as the display range 4, a part of the content 800 as shown in FIG. 8. When wishing to browse etc. another part of the content 800 from that state, the user first preforms the first pressing operation onto the region 801 in the display screen 2 as shown in FIG. 28. At this time, the user presses it with a strength of a certain level or higher, and releases the finger therefrom. The portable terminal device is shifted to the control mode when the pressing strength Pn is the first pressing having a strength equal to or more than a predetermined value. The portable terminal device detects the angle θ at a time of detecting the first pressing, and sets it as the reference angle θ0. Incidentally, the angle θ may use an angle detected within a predetermined time from a time point of detecting the first pressing.

The user performs an operation of tilting the casing 1 in a desired direction with the finger released from the display screen 2 after the first pressing operation. The user tilts it in the negative direction, for example, in a case of desiring to perform the scroll 5 upward. The portable terminal device detects an angle θn corresponding to a tilting operation, and detects a difference value (θn−θ0) which is a relative amount of tilt angles. The portable terminal device uses a first pressing strength Pn and the difference value (θn−θ0) to determine whether to scroll the display range, what direction the scroll is performed in, what speed the scroll is performed at, or the like. The portable terminal device performs the control so as to achieve a different scroll display behavior in accordance with a direction and value indicated by the difference value (θn−θ0). This scroll display behavior brings a change of the display range 4 in the region 801 of the display screen 2.

After a state where the desired display range 4 is displayed in the region 801 by the scrolling, the user returns an inclination of the casing 1 to a state close to the initial reference angle θ0, thereby being able to temporarily stop the scrolling. Also, the user performs the tilting operation from the above state, thereby being able to resume scrolling.

The user can return to the normal mode by the second pressing operation under a state of the desired display range 4. The portable terminal device detects the second pressing at the time of the second pressing operation, ends the change of the display range 4 by the scrolling at that time point, cancels the control mode, and returns to the normal mode. The user can browse etc. a part of the content 800 corresponding to the display range 4 at a time point of the cancelation.

Additionally, before the second pressing operation, the user may select and operate an object such as the link 7 in the desired display range 4 by the touching. In this case, the portable terminal device performs a processing of executing the object, for example, a processing of reading and displaying the content of the link 7, and concurrently cancels the control mode.

[Control Flow]

FIG. 29 shows a flow of a control processing for realizing the display range change control in Embodiment 6. The basic behavior execution unit 104a, particularly, the display controller 204 executes a processing of the flow of FIG. 29. Incidentally, a mode that is a control state for realizing this flow includes a first mode, a second mode, and a third mode. It is assumed that administrative values of the respective modes are 0, 1, and 2. Mode=0 (first mode) indicates an initial state. Mode=1 (second mode) indicates a touch-present state etc. Mode=2 (third mode) indicates a first pressing-present state etc. FIG. 29 has steps S601 to S626. Hereinafter, the steps will be explained in order.

(S601) The display controller 204 reads the content selected by the user. The display controller 204 firstly sets a mode to mode=0 (first mode). (S602) The display controller 204 initially displays a head of the content, for example, the region 821 of FIG. 8 on the display screen 2. (S603) The portable terminal device receives an input operation by the user through the operation unit 106 and the touch pressing sensor 117, and acquires input information corresponding thereto. The display controller 204 acquires touch input information through the touch detector 201. At that time, the touch detector 201 detects presence or absence of the touch, and the touch position coordinate (X1, Y1). Further, the pressing detector 202 detects presence or absence of the pressing, and the pressing strength Pn. (S604) The display controller 204 judges whether the tough is present or absent based on the input information, and branches the processing. If the touch is present (Y), the processing proceeds to S605. If the touch is absent (N), the processing proceeds to S617.

(S605) The display controller 204 acquires, from the touch detector 201, information including the touch position coordinate (X1, Y1). (S606) Further, the display controller 204 acquires, from the pressing detector 202, information including the pressing strength Pn at the touch position corresponding to the touch position coordinate of S605. (S607) The display controller 204 checks whether the current mode is mode=2 (third mode), and branches the processing. If mode=2, the processing proceeds to S608. If not, the processing proceeds to S610. (S608) The display controller 204 compares the pressing strength Pn acquired in S606 with a predetermined threshold value Pt, determines whether the strength Pn is equal to or more than the threshold value Pt, and branches the processing. If Pn≥Pt, the processing proceeds to S609. If Pn<Pt, the processing returns to S603. (S609) The display controller 204 sets the mode to mode=0 (first mode), and returns to S603. Incidentally, the flows of S607 and S609 correspond to cancellation of the control mode by the second pressing operation.

(S610) Meanwhile, in S610, the display controller 204 compares the pressing strength Pn acquired in S606 with the predetermined threshold Pt, judges whether the strength Pn is equal to or more than the threshold value Pt, and branes the processing. If Pn≥Pt, the processing proceeds to S613. If Pn<Pt, the processing proceeds to S611. (S611) The display controller 204 stores and retains, in the memory, the touch position coordinate (X1, Y1) acquired in S605. (S612) The display controller 204 sets the mode to mode=1 (second mode), and returns to S603.

(S613) Meanwhile, in S613, the display controller 204 acquires a tilt angle θ of the portable terminal device by the tilt angle detector 203. (S614) The display controller 204 sets, as a reference angle θ0, the angle θ acquired in S613. Incidentally, each of the flows of S607, S610, and S614, etc. corresponds to the control at the time of the first pressing operation. (S615) The display controller 204 stores and retains (holds) the reference angle θ0 in the memory. (S616) The display controller 204 sets the mode to mode=2 (third mode), and returns to S603.

(S617) Meanwhile, if the touch is absent at S604, the display controller 204 checks, at S617, the current mode and branches the processing. If mode=0, the processing returns to S603. If mode=1, the processing proceeds to S618. If mode=2, the processing proceeds to S621. (S618) The display controller 204 compares the touch position coordinate (X1, Y1) stored in S611 and serving as the touch position onto the display screen 2 with the position of the object such as the link 7 among the pieces of the display information 3 on the display screen 2. The display controller 204 branches the processing depending on whether their positions coincide with each other. If they coincide, that is, if the touch position of the user corresponds to the link 7 etc., the processing proceeds to S620. If not, the processing proceeds to S619. (S619) The display controller 204 sets the mode to mode=0 (first mode), and returns to S603. (S620) The display controller 204 performs a processing associated with the object. For example, the display controller 204 acquires, from a server on the Internet, content designated by URL of the link 7, reads the content, and performs an operation for displaying the content on the display screen 2. In this case, the portable terminal device exits a loop of this flow as shown by A1, and performs a similar processing(s) about new content from a start of this flow.

(S621) Meanwhile, in S621, the tilt angle detector 203 detects a tilt angle θn of the portable terminal device. The display controller 204 acquires, from the tilt angle detector 203, information including the angle θn. (S622) The display controller 204 compares an absolute value |θn−θ0| of a difference value between the angle θn and the reference angle θ0 with a predetermined threshold value θt, judges whether the absolute value is equal to or more than the threshold value θt, and branches the processing. If |θn−θ0|≥θt, the processing proceeds to S623. If |θn−θ0|<θt, the processing returns to S603. Incidentally, that the difference value is 0 (zero) or almost 0 represents no change from a state of the reference angle θ0. That the absolute value |θn−θ0| is within a range smaller than the threshold value θt brings no scroll. Therefore, the scrolling can be prevented by setting the threshold value θt even when the user unintentionally slightly changes the tilt angle.

(S623) The display controller 204 uses the angle θn etc. acquired in S621, and sets a scroll speed Sn for use in the scroll display behavior based on the following expression (5).

$$Sn = S0 \times |\theta n - \theta 0|/\theta t \qquad (5)$$

It is assumed that a predetermined reference scroll speed is S0. The reference scroll speed S0 may be a fixed setting value on the mounting, or may be a setting value variably settable by the user. The expression (5) determines the scroll speed Sn so as to increase the reference scroll speed S0 by multiplication in accordance with magnitude of a ratio (|θn−θ0|/θt) of the absolute value to the threshold value θt, the absolute value being obtained from the difference between the angles θt and θ0. That is, as the angle θn tilted to the reference angle θ0 becomes larger, the scroll speed Sn can be made higher.

(S624) Next, the display controller 204 branches the processing in accordance with a magnitude relationship between the angle θn and the reference angle θ0, in other words, depending on whether a sign of the difference value (θn−θ0) is positive or negative. If the angle θn is more in value than the reference angle θ0 (θn>θ0), the processing proceeds to S625. If the angle θn is smaller in value than the reference angle θ0 (θn<θ0), the processing proceeds to S626. (S625) The display controller 204 uses the scroll speed Sn set in S623 to perform a downward scroll processing for the scroll 6 of FIG. 8 correspondingly to a positive-direction tilt, and thereafter returns to S603. (S626) The display controller 204 uses the scroll speed Sn set in S623 to perform an upward scroll processing for the scroll 5 of FIG. 8 correspondingly to a negative-direction tilt, and thereafter returns to S603.

Each of the flows of S604, S617, and S625, etc. corresponds to the change of the display range 4 in the control mode. Incidentally, this flow repeats a processing per predetermined time in a loop, and a scroll processing such as S625 corresponds to a scroll which is moved by a predetermined distance in a predetermined time. The processing such as S625 is continued many times by the loop, thereby being able to realize continuous scrolls of a long distance, too.

[Setting of Scroll Speed]

FIG. 10 shows the relationship between the scroll speed Sn and the absolute value |θn−θ0| of the difference between the tilt angles θ about the setting of the scroll speed Sn in step S623 of FIG. 29, the absolute value being obtained from a value of the difference between the tilt angles θn and θ0. The lateral axis is the absolute value |θn−θ0| and indicates, for example, the threshold values θt, 2×θt, and 3×θt. The longitudinal axis is the scroll speed Sn and indicates, for example, values of the reference scroll speeds S0, 2×S0, and 3×S0. The straight line 1001 indicates a function corresponding to the expression (5), and the scroll speed Sn linearly increases in accordance with the absolute value |θn−θ0|.

[Effects, Etc.]

As described above, the portable terminal device according to Embodiment 6 can realize the change of the display range of the content etc. with less time and effort in accordance with various states of the user, thereby being able to realize more preferable usability. The portable terminal device uses the pressing strength Pn and the tilt angle θn to change the display range 4 of the content by the scroll display control. The user sets the casing 1 of the portable terminal device to a hand-held state suitable for the user or circumstances, for example, a state of being naturally held in one hand. The user can set, as the reference angle θ0, such a state by the first pressing operation at a desired point of time. The user performs an operation of tilting the casing 1 in a desired direction as it is, thereby being able to change the display range 4 by the scrolling. Then, the user can cancel the state by the second pressing operation at a desired point of time. The user can quickly browse etc. the desired display range 4 by a simple operation without requiring repeating the touch operation many times. The user can move it a desired distance by the scrolling with a single operation.

The reference angle θ0 is set by entering the control mode in which the first pressing having a strength equal to or more than a predetermined value serves as a trigger, so that the scrolling is not erroneously performed even when the user unintentionally performs the touch operation. Also, the user can adjust the scroll speed Sn etc. to a user's desired speed in accordance with the angular On etc. Additionally, the user can quickly select the link 7 etc. in conjunction with the scroll operation, too.

Further, the portable terminal device according to Embodiment 6 can be suitably applied also to a comparatively small display screen equipping device such as a smart watch. When a size of the display screen is comparatively small, touching and pressing the display screen with the finger lead to hiding a part of the display screen by the finger, and it becomes difficult for the user to visually recognize the part, which makes usability bad in some cases. In contrast, the portable terminal device according to Embodiment 6 makes the scrolling etc. possible in a state of the user pressing the display screen once and releasing the finger therefrom even when the size of the display screen 2 is comparatively small, which makes easy it to visually recognize the display information.

FIG. 30 shows a pressing operation etc. onto the display screen 2 in a case of a smart watch serving as the portable terminal device according to Embodiment 6. FIG. 30 shows a state of touching and pressing a spot in the display screen 2 with one finger of a right hand when the smart watch is attached to a left wrist. FIG. 30 shows a case where the display screen 2 is circular and the display screen 2 has almost the same size as that of a wrist width. A part of the display screen 2 is temporarily hidden in performing the first pressing operation. The entire display screen 2 can be visually recognized under a state of the control mode after the finger is released by finishing the first pressing operation. The user can scroll the display screen by an operation etc. of tilting the wrist while watching the entire display screen 2, thereby making it easy to set it to the desired display range 4.

Modification Examination (1)

The following is possible as a modification example of Embodiment 6. Embodiment 6 shows, as shown in FIG. 28 etc., a case of using the display screen 2 and the tilt angle θ of the content with respect to the Y direction to control the scroll display behavior in the Y direction. However, Embodiment 6 is not limited thereto, and enables various modification examples similar to those of Embodiment 1. For example, use of the display screen 2 and a tilt angle of the content in the X direction also enables a form that controls the scroll display behavior in the X direction. FIG. 7 shows the operation of tilting the display screen at a tilt angle n with respect to the X direction.

Modification Example (2)

The display behavior of the display range change to be applied to enlargement and reduction may have, for example, a correspondence relationship like an enlargement processing at the positive-direction tilt angle and a reduction processing at the negative-direction tilt angle. For example, a digital camera is used as the portable terminal device, and a plurality of photographic images are used as target information. The device displays, in the display screen at the normal mode, the plural photographic images or one selected from them. Such a state makes it possible to scroll the photographic images by the swipe operation etc. or enlarge/reduce the photographic image by the pinch operation etc. When a size of the photographic image is large or enlarged, a part of the photographic image is displayed on the display screen 2. The device enters the control mode from the normal mode in accordance with the first pressing operation. The display of the control mode makes it possible to scroll or enlarge/reduce the photographic image in accordance with the tilt angle, and return to the display of the normal mode from the control mode in accordance with the second pressing operation.

Particularly, the photographic image is applicable also to a panoramic image or full celestial image whose size and angle are large and which cannot be displayed at once as a whole. An operation in the control mode makes it possible to easily change, as a display range corresponding to a visual-line direction, a part of the entire panorama image or celestial image. The user can suitably browse etc. a desired part or the whole of the photographic images.

Modification Example (3)

Step S623 of FIG. 29 determines the scroll speed Sn so as to linearly change in accordance with the absolute value |θn−θ0| similarly to the function of the straight line 1001 in FIG. 10. However, the determination by S623 is possible without being limited thereto. For example, the determination by S623 may be made by a stepwise function similarly to the function 1002 in FIG. 10. This function 1002 may determine the scroll speed Sn at a constant value in accordance with sections in a range of the absolute value |θn−θ0|. Further, the scroll speed Sn may be set to a constant value regardless of the angle θn, or may be variably settable by the user. The threshold values Pt and θt in FIG. 29 may be fixed set values on the mounting or be settable by the user.

Modification Example (4)

When the control mode is shifted in response to the first pressing operation, predetermined information representing the state of the control mode may be displayed in the display screen 2. Further, when the control mode is canceled by the second pressing operation, display of the predetermined information may be erased or other predetermined output may be performed. Additionally, in judging the first pressing to shift to the control mode, a touch continuation time etc. may be further judged as a condition(s).

Modification Example (5)

Embodiment 6 basically uses information on the pressing strength Pn for the judgment of the first and second pressing operations and the switching of the control mode. Further, used as a modification example is the pressing strength Pn in determining the scroll speed etc. For example, the first pressing strength Pn is used to determine the reference scroll speed S0 in step S623 of FIG. 29. For example, the determination is made so that the reference scroll speed S0 becomes higher as the strength Pn becomes larger. Then, the reference scroll speed S0 is used to calculate the scroll speed Sn. That is, the scroll speed Sn is determined so as to reflect both pieces of information on the strength Pn and the angle θn. Additionally, such a form etc. may be utilized as to use the first pressing strength Pn to determine the scroll speed Sn, and use only the angle θn to determine the scroll direction.

Modification Example (6)

In Embodiment 6, the control mode from the first pressing operation to the second pressing operation is in a state of holding no first pressing, and is basically in the touch-absent state. A modification example may be, during the control mode, in states of holding no first pressing and maintaining the touch-presence similarly to Embodiment 7 etc. described below. That is, the modification example is in a state of: detecting the first pressing by the first pressing operation; and then weakening the pressing of the finger to leave the finger touching without releasing it from the display screen. In the control mode, the display range is changed in accordance with the tilt angle, and the touch position can be changed arbitrarily. Then, the control mode is canceled in response to the detection of the second pressing by the second pressing operation.

Additionally, Embodiment 6 has realized a temporary stop of the scrolling by returning the angle θn to an angle close to the reference angle θ0. The modification example may realize the temporary stop of the scrolling as follows. The scrolling is automatically performed in accordance with the angle θn in the touch-absent state after the first pressing operation. When wishing to temporarily stop the scrolling on the way to the above scrolling, the user gently touches the display screen 2 to maintain the touch-present state. The portable terminal device temporarily stops the scrolling during the detection of the touch-present state. When wishing to resume the scrolling, the user releases the finger from the display screen. The portable terminal device resumes the scrolling in response to the detection of the touch-absent state. Then, the control mode is canceled in response to the detection of the second pressing by the second pressing operation.

Embodiment 7

A portable terminal device according to Embodiment 7 of the present invention will be described with reference to FIGS. 31 to 35. Hereinafter, Embodiment 7 different from Embodiment 1 in components will be described. Embodiment 7 shows, similarly to Embodiment 6, a case where the target information is content display information, and shows a case where the display behavior of the display range change control is a scroll in the Y direction.

[Configuration Outline]

FIG. 31 shows an appearance, an operation, and display control, etc. as a configuration outline of Embodiment 7. A left side of FIG. 31 shows a state of performing a first pressing operation to a spot of the content display information 1201 in the display screen 2. The user performs a first pressing operation to a spot in the display screen 2 with a pressing having a strength equal to or more than a predetermined value. This first pressing operation differs from the first pressing operation of Embodiment 6, and is an operation in which the first pressing having the strength equal to or more than a predetermined value is applied and then is weakened to leave the finger touching, that is, an operation of maintaining the touch-present state. The control mode becomes a state of maintaining no first pressing. The portable terminal device treats, as a reference position, a first position corresponding to the touch position coordinate to be subjected to the first pressing operation. The portable terminal device enters the control mode from the normal mode by using the first pressing operation as a trigger.

A right side of FIG. 31 shows a state of entering the control mode. The portable terminal device displays a direction selection icon J1 for controlling the scrolling by using the first position as the reference position. The direction selection icon J1 is a control object that enables selection etc. of a scroll direction. The direction selection icon J1 is configured by an up area e1, a down area e2, and a central stop area e0 therebetween. Firstly, the direction selection icon J1 is displayed in a state in which the central stop area e0 is disposed within a predetermined range with respect to a first position corresponding to a position touched at a tip of the finger performing the first pressing operation. In other words, the direction selection icon J1 is arranged so that the first position is included in the central stop area e0. In such a state, the scrolling is not yet started.

The user performs a slide operation of moving the finger on the direction selection icon J1 with the touch-presence maintained after the first pressing operation, thereby selecting a desired area in the direction selection icon J1. The user can select an upward scroll by placing the tip of the finger in the up area e1, and select a downward scroll by placing the tip of the finger in the down area e2. When the up area e1 is selected, the portable terminal device performs the upward scroll similarly to the scroll 5 of FIG. 8 in Embodiment 6. When the down area e2 is selected, the portable terminal device performs the downward scroll like the scroll 6.

Further, the user can select the temporary stop of the scrolling by placing the finger in the central stop area e0. When the central stop area e0 is selected, the portable terminal device temporarily stops the upward and downward scrolls. For example, the user selects the up area e1 from an initial state of the central stop area e0, and performs the upward scroll. After the desired display range 4 is displayed, the user returns a finger's position to the central stop area e0, and stops performing the upward scroll. Additionally, the user selects the down area e2 from the above upward-scroll stopping state to perform the downward scroll. After the desired display range 4 is displayed, the user returns the finger's position to the central stop area e0, and stops performing the downward scroll.

When a state of the user releasing the finger from the direction selection icon J1, that is, a touch-absent state is detected, the portable terminal device cancels this control mode and returns to the normal mode. The portable terminal device ends, additionally to the release, the scroll in a state of the display range 4 at that time, and also makes the direction selection icon J1 non-display.

Further, when the user moves the finger to a position of the link 7 and releases the finger therefrom during the control mode, the portable terminal device selects the finger-released link 7 to perform a corresponding processing, and concurrently cancels the control mode.

Additionally, the portable terminal device determines a scroll speed in accordance with the first pressing strength Pn applied by the first pressing operation. Further, the portable terminal device variably determines the scroll speed in accordance with a pressing strength applied in selecting the up area e1 or down area e2 of the direction selection icon J1.

[Control Flow]

FIG. 32 shows a flow of a control processing of the display controller 204 in Embodiment 7. FIG. 32 has, as modes, a first mode to a third mode, and administrative values are set to 0, 1, and 2. FIG. 32 includes steps S701 to S722. The steps will be explained in order hereinafter. Processings of S701 to S706 are almost the same as those of Embodiment 6.

(S707) The display controller 204 checks whether the current mode is mode=2 (third mode), and branches the processing. If mode=2, the processing proceeds to S713. If not, the processing proceeds to S708. (S708) The display controller 204 compares the pressing intensity Pn acquired in S706 with the threshold value Pt, determines whether the strength Pn is equal to or more than the threshold value Pt, and branches the processing. If Pn≥Pt, the processing proceeds to S709. If Pn<Pt, the processing proceeds to S711. (S709) The display controller 204 displays the direction selection icon J1 as shown in FIG. 31. At this time, the display controller 204 displays the direction selection icon J1 in a state in which the central stop area e0 is disposed at a position within a predetermined range with respect to the touch position coordinate (X1, Y1) acquired in S705. (S710) The display controller 204 sets the mode to mode=2 (third mode), and returns to S703.

(S711) Meanwhile, in S711, the display controller 204 stores and retains the touch position coordinate (X1, Y1) in the memory. (S712) The display controller 204 sets the mode to mode=1 (second mode), and returns to S703.

(S713) On the other hand, if mode=2 in S707, the display controller 204 determines in S713 whether the touch position coordinate (X1, Y1) acquired in S705 is within an area of the direction selection icon J1, and branches the processing. If the coordinate is within the area of the direction selection icon J1, the processing proceeds to S714. If the coordinate is outside the area, the processing returns to S703.

(S714) The display controller 204 uses the pressing strength Pn etc. acquired in S706 to set the scroll speed Sn based on the following expression (6).

$$Sn = S0 \times Pn/Pt \qquad (6)$$

The expression (6) determines the scroll speed Sn so as to increase the reference scroll speed S0 by multiplication in accordance with the magnitude of the ratio (Pn/Pt) of the pressing strength Pn to the threshold value Pt. That is, the scroll speed Sn is higher as the strength Pn becomes larger.

(S715) The display controller 204 judges which area of the direction selection icon J1 the touch position coordinate (X1, Y1) acquired in S705 corresponds to, and branches the processing. That is, it is judged which of the up area e1, down area e2, or central stop area e0 the touch position is in. If the touch position is in the up area e1, the processing proceeds to S716. If it is in the down area e2, the processing proceeds to S717. If it is in the central stop area e0, the processing returns to S703. Incidentally, when the touch position is in the central stop area e0, the scroll processing such as S716 is not performed, so that such a processing is realized as a temporary scroll stop for a predetermined time.

(S716) The display controller 204 performs the upward scroll processing at the scroll speed Sn set in S714 in accordance with the selection of the up area e1, and returns to S703. This processing performs the scroll 5 continuously moving a predetermined distance for a predetermined time in accordance with the scroll speed Sn. (S717) The display controller 204 performs the downward scroll processing at the scroll speed Sn set in S714 in accordance with the selection of the down area e2, and returns to S703. This processing performs the scroll 6 continuously moving a predetermined distance for a predetermined time in accordance with the scroll speed Sn.

(S718) Meanwhile, if the touch is absent in S704, the display controller 204 checks the current mode and branches the processing in S718. If mode=0 (first mode), the processing returns to S703. If mode=1 (second mode), the processing proceeds to S719. If mode=2 (third mode), the processing proceeds to S721.

(S719) The display controller 204 compares the touch position coordinate (X1, Y1) stored in S711 and serving as a touch position on the display screen 2, and a position of an object such as the link 7 among the pieces of display information 3 of the display screen 2. The display controller 204 branches the processing depending on whether their positions coincide with each other. If they coincide, the processing proceeds to S720. If not, the processing proceeds to S722. (S720) The display controller 204 performs a processing(s) associated with the selected object. For example, the display controller 204 acquires, from a server on the Internet, content designated by URL of the link 7, reads the content, and performs a processing of displaying the content on the display screen 2. In this case, the portable terminal device exits a loop of this flow as indicated by Δ2, and similarly performs a processing about new content from the beginning of this flow. (S721) Meanwhile, the display controller 204 makes, in S721, the direction selection icon J1 non-display. (S722) The display controller 204 sets the mode to mode=0 (first mode), and returns to S703.

[Effects Etc.]

As described above, the portable terminal device according to Embodiment 7 makes, similarly to Embodiment 6, it possible to change the display range with less time and effort without requiring repeating the touch operation many times. The user can quickly scroll the content display information in the desired state by operating the above device with one hand and one finger. The user can adjust the scroll speed in accordance with the pressing strength etc. Embodiment 7 hides a part of the display screen 2 by the direction selection icon J1, but makes it possible to cause the user to clearly recognize a scrollable direction etc.

Modification Example (1)

The following is possible as a modification example of Embodiment 7. Embodiment 7 displays the direction selection icon J1 including the up and down areas in the Y direction, and performs the display control of the Y-direction scroll, but is not limited thereto.

FIG. 33 shows, as a first modification example, a case of performing the display control of the X-direction scroll. FIG. 33 shows, as target information, a case of content display information 1401 such as an electronic book including a vertically written document. The portable terminal device displays a direction selection icon J2 including right and left areas in the X direction in response to the first pressing operation. This direction selection icon J2 has a left area e3, a central stop area e0, and a right area e4. The portable terminal device uses this direction selection icon J2 to control right and left scrolls in the X direction.

FIG. 34 shows, as a second modification example, a case of performing the display control of both the Y and X-direction scrolls. FIG. 34 shows, as target information, a case of map information 1501 having, for example, a relatively large size. The portable terminal device displays a direction selection icon J3 in response to the first pressing operation. This direction selection icon J3 has four directional areas, i.e., up, down, right, and left areas, and a central stop area. The portable terminal device controls each of upward, downward, rightward, and leftward scrolls in accordance with selection of the directional areas.

Further, for example, when a top of the content in the Y direction falls within the display range 4, the upward scroll is ineffective. Another modification example may control, in displaying the direction selection icon, details of such a display state that a directional area corresponding to a direction of making the scroll ineffective is made non-display, non-selectable display, or the like.

FIG. 35 shows, as a third modification example, a form in which the direction selection icon is not provided with the central stop area e0. The portable terminal device displays a direction selection icon J4 in response to the first pressing operation. The direction selection icon J4 has an up area e1 in an upper half of a circle, and a down area e2 in a lower half thereof. The device can select the upward or downward scroll by those areas. Further, when the user shifts the finger from a state of touching the areas of the direction selection icon J4 to a position outside the areas of the direction selection icon J4, the portable terminal device temporarily stops the scroll. Further, when the user releases the finger from inside or outside the areas of the direction selection icon J4, the portable terminal device cancels the control mode. Another modification example may cancel the control mode without temporarily stopping the scroll when the finger moves outside the areas of the direction selection icon J4.

Modification Example (2)

A modification example uses, similarly to Embodiment 6, the first and second pressing operations, and may perform the switching of the control mode. This modification example: enters the control mode by the first pressing operation onto the display screen 2 and displays the direction selection icon; and cancels the control mode by the second pressing operation and makes the direction selection icon non-display. A pressing by the second pressing operation may be, particularly, a second pressing in the central stop area e0, or a second pressing outside the areas of the direction selection icon. During this control mode, the touch-present state may not be maintained. The user releases the finger performing the first pressing operation, and then can select a desired scroll direction etc. by touching the direction selection icon. Additionally, during this control mode, the user can select the link 7 by touching it.

Modification Example (3)

Embodiment 7 uses the information on the pressing strength Pn in determining the first pressing operation and setting the scroll speed Sn. Embodiment 7 is not limited thereto, and may use, as a modification example, the information of the pressing strength Pn for other control variable(s). In setting the scroll speed Sn in step S714 of FIG. 32, a fixed value may be set at, for example, the reference scroll speed S0. Further, during the control mode, the pressing strength Pn etc. in the up area e1 or the down area e2 are detected. Then, the portable terminal device uses the pressing strength Pn in the area to variably determine the scroll speed Sn in its direction. The user moves, for example, the finger into the up area e1, and depresses it with a desired strength. The portable terminal device determines the scroll speed Sn so as to increase with respect to the reference scroll speed S0 in accordance with the pressing strength Pn in the up area e1. That is, as the up area e1 is strongly pressed down, the upward scroll with a higher speed is realized.

Further, the portable terminal device may control display behaviors of enlargement and reduction by detecting the pressing strength Pn applied in the central stop area e0. When wishing to temporarily stop the scroll in the central stop area e0 and enlarge an image(s) at its stop position, the user depresses the central stop area e0 with a desired strength. The portable terminal device controls the enlargement and reduction of the image in accordance with the pressing strength Pn applied in the central stop region e0 and its touch position. The portable terminal device enlarges and displays an image of a map in accordance with the magnitude of the strength Pn, the image's enlargement being centered about, for example, the touched position. Additionally, the portable terminal device reduces and displays the image in accordance with a decrease in the strength Pn. The user releases the finger from the central stop area e0 in a state where the image has a desired size, thereby being able to cancel the control mode in that state.

Embodiment 8

A portable terminal device according to Embodiment 8 of the present invention will be described with reference to FIGS. 36 to 40. Hereinafter, Embodiment 8 different from Embodiment 7 in components will be described. Embodiment 8 shows a case where the target information is map information, and a case where the display behavior of the display range change control is a scroll(s) in any direction within a plane formed by the X and Y directions.
[Configuration Outline]
FIG. 36 shows operations, and display control, etc. as a configuration outline of Embodiment 8. FIG. 36 shows a case where the user performs a touch pressing operation onto the display screen 2 with the thumb while holding the casing 1 in the left hand. It is assumed that a state of FIG. 36 is a first state. The user touches and presses a desired spot of map information 1701 displayed on the display screen 2. It is assumed that this operation is a first pressing operation. It is also assumed that the first pressing operation is an operation of: weakening the first pressing after detection of a first pressing having a strength equal to or more than a predetermined value; and maintaining a touch-present state without releasing the finger. The control mode after the first pressing operation is in a state of holding no first pressing.

It is assumed that the touch position coordinate (X1, Y1) at a time of the first pressing operation is a first position LA, and is expressed as LA=(Xa, Ya). The portable terminal device sets the first position LA as a reference position Lr in accordance with the detection of the first pressing. The reference position is expressed as Lr=(Xr, Yr).

The portable terminal device enters the control mode from the normal mode in accordance with the first pressing operation, and sets the reference position Lr to display a predetermined reference point icon C1 at the reference position Lr. In other words, the reference point icon C1 is a first position icon. In this example, the reference point icon C1 is expressed as a sun mark.

FIG. 37 shows a second state which is a state shifted (transitioning) from the first state of FIG. 36. The user performs a slide operation of moving the finger to a desired position from the first state of touching the reference position Lr with the finger while maintaining the touch-present state. It is assumed that a touch position after moving the finger by this operation is a second position LB. The second position is expressed as LB=(Xb, Yb).

It is assumed that a distance between two points of the reference position Lr serving as the first position LA and the second position LB is Dn. It is also assumed that a direction from the reference position Lr to the second position LB is V1. The portable terminal device grasps the second position LB, the distance Dn, and the direction V1, etc. During the control mode, the reference point icon C1 is left displayed. The user can recognize, based on the reference point icon C1, magnitude (size) of the distance Dn between the two points of the first position LA and the second position LB, and the direction V1.

Incidentally, a modification example may be a form in which the reference point icon C1 etc. are not displayed at the first position LA. It may be also a form in which a predetermined second position icon is displayed at the second position LB. It may be a form in which both of the reference point icon C1 and the second position icon are displayed.

FIG. 38 shows a third state which is a state transitioning from the second state of FIG. 37. The portable terminal device grasps a positional relationship between the reference position Lr and the second position LB in a change of the first state to the second state and controls, based on the positional relationship, determination of whether to perform the scroll, what direction the scroll is performed in, and what speed the scroll is performed at, and the like. In the third state of FIG. 38, a scroll 191 is performed in the direction V1 corresponding to the positional relationship between the two points. Consequently, the display range 4 in the map information 1701 moves in the direction V1. Incidentally, an image part moves in the display screen 2 in a direction 192 which is a direction opposite to the direction V1 of the scroll 191.

FIG. 39 shows a change in the display range 4 on the map information 1701 in performing the scroll 191 in the direction V1 of the second state to the third state. The display range 4 has changed from a display range 2001 of the first and second states to a display range 2002 of the third state.

Additionally, when the user moves the touch position so as to return the reference point icon C1 from the second position LB to the reference position Lr, the portable terminal device temporarily stops the scroll. When the user releases the finger therefrom, the portable terminal device ends the scroll in a state of the display range 4 at that time, makes the reference point icon C1 non-display, cancels the control mode, and returns to the normal mode.

[Control Flow]

FIG. 40 shows a flow of a control processing of the display controller 204 in Embodiment 8. FIG. 40 shows a control processing when map information is displayed in an application screen through an application such as a map or position search. The flow has, as modes, a first mode and a second mode, and administrative values are set at 0 and 1. FIG. 40 has steps S801 to S817. The steps will be explained in order hereinafter.

(S801) The display controller 204 reads the map information. The display controller 204 firstly sets a mode to mode=0 (first mode). (S802) The display controller 204 initially displays, on the display screen 2, a part of predetermined positions of the map displayed by the map information. The predetermined position is, for example, a current GPS position coordinate of the portable terminal device, a position designated by the user through position searches, or the like. (S803) The portable terminal device receives an input operation by the user through the operation unit 106 and the touch pressing sensor 117, and acquires input information corresponding thereto. The display controller 204 acquires touch input information through the touch detector 201. At that time, the touch detector 201 detects presence or absence of the touch and a touch position coordinate (X1, Y1). Further, the pressing detector 202 detects presence or absence of the pressing and the pressing strength Pn. (S804) The display controller 204 judges the presence or absence of the touch based on the input information, thereby branching the processing. If the touch is present (Y), the processing proceeds to S805. If the touch is absent (N), the processing proceeds to S815.

(S805) The display controller 204 acquires, from the touch detector 201, information including the touch position coordinate (X1, Y1). (S806) The display controller 204 acquires, from the pressing detector 202, information including the pressing strength Pn at the touch position. (S807) The display controller 204 checks the current mode, and branches the processing. If mode=0 (first mode), the processing proceeds to S808. If mode=1 (second mode), the processing proceeds to S812. (S808) The display controller 204 compares the pressing strength Pn acquired in S806 with the threshold value Pt, judges whether the strength Pn is equal to or more than the threshold value Pt, and branches the processing. If Pn≥Pt, the processing proceeds to S809. If Pn<Pt, the processing returns to S803.

(S809) The display controller 204 sets, as the reference position Lr=(Xr, Yr), the touch position coordinate (X1, Y1) acquired in S805, and stores and retains it in the memory. The touch position coordinate (X1, Y1) at this time corresponds to a first position LA=(Xa, Ya) in the first state. (S810) As shown in FIG. 36, the display controller 204 displays the reference point icon C1 at the reference position Lr in the display screen 2. (S811) The display controller 204 sets the mode to mode=1 (second mode), and returns to S803. The flow to S811 corresponds to a shift to the control mode in response to the first pressing operation.

(S812) Meanwhile, if mode=1 in S807, the display controller 204 uses, in S812, the pressing strength Pn acquired in S806, and sets the scroll speed Sn based on calculation of the following expression (7) similarly to the expression (6) of Embodiment 7.

$$Sn = S0 \times Pn/Pt \quad (7)$$

(S813) The display controller 204 sets an X-direction scroll speed Sx and a Y-direction scroll speed Sy based on a positional relationship between the touch position coordinate (X1, Y1) acquired in S805 and the reference position Lr=(Xr, Yr) stored in S809. At this time, the display controller 204 uses, as a reference, the scroll speed Sn set in S812 to determine the X-direction scroll speed Sx and the Y-direction scroll speed Sy based on the following expression. The touch position coordinate (X1, Y1) at this time corresponds to the second position LB=(Xb, Yb) in the second state.

Embodiment 8 realizes a scroll in an arbitrary direction in a plane formed by the X and Y directions, that is, the scroll 191 directed toward the direction V 1 in the third state of FIG. 38 by dividing and synthesizing the scroll 191 in the X-direction scroll and the Y-direction scroll. The X-direction scroll speed Sx is a speed of its X-direction component, and the Y-direction scroll speed Sy is a speed of its Y-direction component.

When Y1=Yb≠Yr, the display controller 204 calculates the X-direction scroll speed Sx and the Y-direction scroll speed Sy based on the following expression (8).

$$Sx = Sn \times (Xr - X1)/(Yr - Y1), Sy = Sn \quad (8)$$

When Y1=Yb=Yr, the display controller 204 calculates the X-direction scroll speed Sx and the Y-direction scroll speed Sy based on the following expression (9).

$$Sx = Sn, Sy = 0 \quad (9)$$

The expression (8) uses an X-direction position difference (Xr−X1) and a Y-direction position difference (Yr−Y1) between the reference position Lr and the second position LB=(Xb, Yb)=(X1, Y1) to calculate a ratio (Xr−X1)/(Yr−Y1) thereof. Then, the expression (8) calculates the X-direction scroll speed Sx so as to increase with respect to the scroll speed Sn serving as a reference in accordance with magnitude (value) of the ratio. For example, if (Xr−X1)=(Yr−Y1), the expression (8) obtains Sx=Sn, that is, the X-direction scroll speed Sx becomes equal to the Y-direction scroll speed Sy.

(S814) The display controller 204 uses, as the display control of the map information, the scroll speed {Sx, Sy} set in S813 to perform the scroll processing of scrolling the display screen in the X and Y directions, and then returns to S803. Like the third state of FIG. 38 by S814, the scroll 191 in the direction V1 corresponding to a direction formed by two points of the reference position Lr and the second position LB is realized in a plane formed by the X and Y directions on the display screen 2. In connection with this, the display range 4 in the map information 1701 is changed as shown in FIG. 39. The flow to S814 corresponds to a change of the display range during the control mode. In S814, the scroll is performed by a predetermined distance in a predetermined time, and the processing at S814 is continued in the loop, so that a long-distance scroll is also realized.

(S815) Meanwhile, if the touch is absent at S804, the display controller 204 checks, in S815, the current mode and branches the processing. If mode=0, the processing returns to S803. If mode=1, the processing proceeds to S816. (S816) The display controller 204 makes the reference point icon C1 in the display screen 2 non-display. (S817) The display controller 204 sets the mode to mode=0 (first mode), and returns to S803. The flow to S817 corresponds to cancellation of the control mode.

[Effects Etc.]

As described above, the portable terminal device according to Embodiment 8 makes it possible to change the display range with less time and effort without requiring repeating the touch operation many times similarly to Embodiment 7. The user can scroll the display screen in the desired direction by a simple operation of using one hand and one finger. The user can adjust the scroll speed depending on the pressing strength etc. Embodiment 8 makes it possible to scroll the display screen in an arbitrary direction within a plane, and the user can select a scroll direction(s) at great length.

Modification Example (1)

The following is possible as a modification example of Embodiment 8. Setting of the X-direction scroll speed Sx and the Y-direction scroll speed Sy in step S813 of FIG. 40 may be determined based on the following expression.

When X1=Xb≠Xr, the display controller 204 calculates the X-direction scroll speed Sx and the Y-direction scroll speed Sy based on the following expression (10).

$$Sx = Sn, Sy = Sn \times (Yr - Y1)/(Xr - X1) \qquad (10)$$

When X1=Xb=Xr, the display controller 204 calculates the X-direction scroll speed Sx and the Y-direction scroll speed Sy based on the following expression (11).

$$Sx = 0, Sy = Sn \qquad (11)$$

Incidentally, the expressions (8) and (9) use the Y-direction position as a reference, and the expressions (10) and (11) use the X-direction position as a reference.

Step S812 of FIG. 40 uses the pressing strength Pn to determine the scroll speed Sn. As a modification example, however, the expression (7) may be replaced with the following expression (12).

$$Sn = S0 \times Dn/Dt \qquad (12)$$

The expression (12) uses a distance Dn between the two points in FIG. 37. The reference value Dt indicates a predetermined reference value related to the distance Dn. The expression (12) determines the scroll speed Sn so as to increase with respect to the reference scroll speed S0 in accordance with magnitude of a ratio (Dn/Dt) of the distance Dn to the reference value Dt. The portable terminal device determines, based on this scroll speed Sn, the scroll speeds {Sx, Sy} in the respective directions in step S813.

Modification Example (2)

Various modification examples are possible in Embodiment 8 similarly to Embodiment 7. For example, mode-switching may be performed by using the first and second pressing operations similarly to Embodiment 6. This modification example performs the first pressing operation to the display screen 2, thereby entering the control mode to set the reference position Lr and display the reference point icon C1, and performs the second pressing operation thereto, thereby canceling the control mode. During this control mode, the touch-present state may not be maintained. The user can select a desired scroll direction etc. by touching the second position LB after releasing the finger performing the first pressing operation. The second pressing operation may be particularly an operation of applying a second pressing onto the reference point icon C1.

Modification Example (3)

Similarly to the modification example of Embodiment 7, information on the pressing strength Pn may be used as other control variables. For example, in setting the scroll speed Sn in step S812 of FIG. 40, the variable may be a fixed value, for example, the reference scroll speed S0. Alternatively, the scroll speed Sn may be determined in accordance with a value (size) of the distance Dn etc. Additionally, this modification example detects, during the control mode, the pressing strength Pn etc. at the second position LB, and uses the strength Pn to variably determine the scroll speed Sn. The portable terminal device determines the scroll speed Sn so as to increase with respect to the reference scroll speed S0 by multiplication in accordance with the strength Pn. That is, as the user strongly presses down the second position LB, the scroll with a higher speed is realized.

Further, similarly to the modification example of Embodiment 7, the portable terminal device may detect the pressing strength Pn at the reference position Lr, and control a display behavior of enlargement and reduction at the touch position.

Embodiment 9

A portable terminal device according to Embodiment 9 of the present invention will be described with reference to FIGS. 41 to 42. Hereinafter, Embodiment 9 different from Embodiment 6 etc. in components will be described. Embodiment 9 shows, as target information, a case of a plurality of home screens or a plurality of application screens. Embodiment 9 controls, as display range change control, screen-switching in switching one of a plurality of screens and displaying it on the display screen 2. Additionally, Embodiment 9 corresponds to the modification example of Embodiment 6 and uses, by the display range change control, the tilt angle to control the screen-switching.

[Home Screen]

FIG. 11 shows a state in which one home screen selected from the plural home screens is displayed on the display screen 2 of the portable terminal device according to Embodiment 9. The portable terminal device according to Embodiment 9 switches and displays the plural home screens on the display screen 2 in accordance with a specific touch pressing operation.

[Display Control]

FIG. 41 shows, as the display control of Embodiment 9, a touch pressing operation to the home screens, and the screen-switching on the home screens. The portable terminal device according to Embodiment 9 receives a first pressing operation, a second pressing operation, and a tilting operation, etc., and controls the screen-switching of the plural home screens on the display screen 2. The screen-switching is a display behavior of switching the home screen, which becomes the display range 4 on the display screen 2, per predetermined time interval. Incidentally, FIG. 41 shows a case in which the user holds the casing 1 in the not-shown left hand and presses the display screen 2 with one finger of the right hand.

The user performs a first pressing operation to a spot in the home screen. Upon detecting a first pressing at that time, the portable terminal device enters the control mode from the normal mode and sets, as a reference angle θ0, a tilt angle θ of the casing 1 at that time. The user performs an operation of tilting the casing in a desired direction, for example, in the Y direction in a state of the control mode. The portable terminal device determines a direction etc. of the screen-switching in accordance with a difference value (θn−θ0) of the angle θn at that time. For example, the portable terminal device determines the screen-switching in the first direction when a tilt is in the negative direction, and determines the screen-switching in the second direction when it is in the positive direction. The first direction is a layer falling direction for lowering the layer that is the display range 4, and the second direction is a layer rising direction. Further, the portable terminal device may determine a time interval etc. of updating for each screen and each layer in accordance with the angle θ, the time interval corresponding to the speed at a time of the screen-switching.

When the screen is switched in the first direction, the display controller 204 sequentially switches the plural home screens in the layer falling direction. That is, the home screens displayed as the display range 4 on the display screen 2 are sequentially switched, for example, in a direction from a top layer L1 to a bottom layer L5. The user can temporarily stop the screen-switching by returning the tilt to a state close to the initial reference angle θ0 during the control mode. Further, during the control mode, the user performs an operation of touching and selecting the icon 9 in the home screen, thereby being able to cause the display controller to perform a corresponding processing. The user performs the second pressing operation in a state in which a desired home screen has become the display range 4. Consequently, the portable terminal device ends the screen-switching, cancels the control mode, and returns to the normal mode.

[Effects Etc.]

As described above, Embodiment 9 makes it possible to switch the plural home screens with less time and effort without requiring repeating the touch operation many times. The user can switch the home screen in the desired direction by a simple operation(s). The user can adjust a speed of the screen-switching in accordance with the pressing strength, the tilt angle, or the like.

Modification Example (1)

The following is possible as a modification example of Embodiment 9. The time interval of the updating at the time of the screen-switching may be determined based on, for example, the following expression (13). It is assumed that the time interval is Kn. It is also assumed that a predetermined reference time interval is K0. The expression (13) calculates the time interval Kn so as to decrease with respect to the reference time interval K0 in accordance with a ratio (Pt/Pn) of the threshold value Pt to the pressing strength Pn.

$$Kn = K0 \times Pt/Pn \quad (13)$$

Shown by FIG. 21 is the function 2101 corresponding to the expression (13). The longitudinal axis indicates the strength Pn, and the lateral axis indicates the time interval Kn. The function 2101 determines the time interval Kn so that the time interval Kn is gradually smaller in value as the strength Pn is larger. That is, as the strength Pn is larger, the speed is higher in switching the screen. Additionally, a stepwise function similar to the function 2102 may be applied to the modification example, or an upper limit value or a lower limit value may be provided. Similarly to Embodiment 6, the time interval Kn can be variously set as a constant value, a user set value, or the like.

Modification Example (2)

The target information is similarly applicable not only to the plural home screens but also to the plural application screens etc. Further, the plural display screens are similarly applicable not only to a layered arrangement but also to a parallel arrangement in the X and/or Y directions.

Shown by FIG. 16 is a display state of the display screen 2 in the modification example. On the display screen 2 like this, images of the plural screens may be arranged in a layered shape or in parallel and displayed. In this case, the control of Embodiment 9 can be applied by using the plural screens as target information. For example, when the home key k2 is pressed down twice from a state of the ordinary home screen, the state is changed (transitions) to a layer display state as shown on the left side of FIG. 16. This example shows a case of arranging a plurality of application screens G1 to G4 etc. in a layered shape. This state displays, as the layer L1, the application screen G1 lying at the frontmost position. The application screen G1 enters the control mode from this state in accordance with the first pressing operation. During the control mode, for example, the switching for only one screen in the layer falling direction brings switching to a layer display state on the right side of FIG. 16. This state displays, as the layer L1, the application screen G2 lying at the frontmost position.

Shown by FIG. 17 is a case of using, as target information, content history information in the application screen. The modification example has content history information on a time line, and FIG. 17 shows, for example, history screens E1 to E3 etc. corresponding to browse history information on Web pages. For example, the latest history screen E1 becomes the display range 4. During the control mode, the history screens E1 to E3 etc. can be switched in a direction of the present to the past or of the past to the current by an operation etc. of changing the tilt angle in the Y direction and be displayed.

Shown by FIG. 18 is a case where the content information in the application screen, for example, a plurality of pieces of page information configuring an electronic book are used as target information. FIG. 18 shows page screens p1 to p3 etc. corresponding to the plural pieces of page information. For example, the top page screen p1 becomes the display range 4. During the control mode, the page screens p1 to p3 etc. can be switched in the desired direction and displayed by an operation etc. of changing the tilt in the X direction.

Modification Example (3)

The screen-switching is set as a display behavior in which the screens are intermittently moved per predetermined time interval and per screen. However, the screen-switching is not limited thereto, and may be a display behavior of being continuously moved similarly to the scroll of Embodiment 6. Additionally, in switching the screen, a vibration pattern may be generated per switching of only one screen, or display of predetermined characters and images, sound outputs, or the like may be performed. A form of determining a direction and a speed etc. of the screen-switching is also possible in accordance with the operation of the direction selection icon of Embodiment 7 or/and the positional relationship between the two points of Embodiment 8. Further, the modification example may be a form in which a direction and a speed etc. of the display behavior are determined by distinguishing a difference between the touch positions in pressing the display screen 2.

FIG. 42 shows an operation onto the display screen 2 in a modification example. FIG. 42 shows, as the first pressing operation, an example of determining: a display behavior in the first direction in a case of pressing the upside area R1 in the display screen 2; and a display behavior in the second direction in a case of pressing the downside area R2. A line 2801 indicates a boundary line between the upside area R1 and the downside area R2 on the setting. Further, a direction, and a speed, etc. of the display behavior may be determined in accordance with distinction of the number of touch positions in pressing the display screen 2. For example, the first pressing operation may be determined so as to have a relatively low first speed in a case of touching one spot in the display screen 2, and a relatively high second speed in a case of simultaneously touching two spots therein.

A modification example may include, as shown in FIG. 26, a plurality of pressing sensors in the portable terminal device. In that case, the modification example may determine a direction, and a speed, etc. of the display behavior in accordance with proper use of these pressing sensors. For example, the portable terminal device as the modification example determines a first-direction display behavior in a case of the first pressing onto the front-side touch pressing sensor 117, and a second-direction display behavior in a case of the first pressing onto the back-side pressing sensor 118.

Embodiment 10

A portable terminal device according to Embodiment 10 of the present invention will be described with reference to FIGS. 43(a) and 43(b). Hereinafter, Embodiment 10 different from Embodiment 6 etc. in components will be described. Embodiment 10 shows, as target information, a case of a plurality of icons displayed in the display screen 2. Embodiment 10 controls, as display range change control, a display behavior in arranging and displaying the plural icons in the display screen 2. Embodiment 10 also corresponds to a modification example of Embodiment 6 and uses, by the display range change control, the tilt angle to control the display behavior.

[Control Outline and Icon Arrangement]

FIGS. 43(a) and 43(b) show, as display control of Embodiment 10, a display example of arrangement, and an operation, etc. of the plural icons in the home screen similarly to FIGS. 23(a) and 23(b). FIGS. 43(a) and 43(b) show a case where the user holds the casing 1 in the left hand and operates the device with the thumb in such a hand-held state. FIG. 43(a) shows a first arrangement state. FIG. 43(b) shows a second arrangement state.

In the first arrangement state, the user performs a first pressing operation of: pressing a spot in the display screen 2 with a strength equal to or more than a predetermined value; and releasing the finger therefrom. A position of its pressing is set to an arbitrary position in the display screen 2. Incidentally, the position of its pressing may be particularly a position on the icon 9 or a position in an area other than that of the icon 9. The portable terminal device enters the control mode in response to the first pressing operation, and sets a tilt angle of the casing 1 as a reference angle $\theta 0$. The portable terminal device changes the arrangement of the plural icons 9 from the first arrangement state to the second arrangement state.

In the second arrangement state during the control mode, the portable terminal device moves the plural icons 9 arranged like a virtual ring so as to rotate in a predetermined direction, for example, clockwise. Further, the portable terminal device may determine an initial speed of movement of the icons 9 in accordance with the first pressing strength Pn applied by the first pressing operation.

Further, the portable terminal device variably controls a direction and a speed of movement of the icons 9 in accordance with an angle $\theta n$ of a tilting operation in the second arrangement state. For example, the portable terminal device is set clockwise at a positive-direction tilt, or counterclockwise at a negative-direction tilt, and determines the speed in accordance with an absolute value $|\theta n - \theta 0|$.

Further, when the user returns the tilt angle $\theta n$ to an angle close to the reference angle $\theta 0$, the portable terminal device temporarily stops the movement of the icons 9. Furthermore, the portable terminal device may temporarily stop the movement in a case etc. of a touch to a ring's center by the user. Additionally, when the user performs an operation of touching and selecting a desired icon 9, the portable terminal device performs a processing of an application associated with the selected icon 9, and cancels the control mode.

In the second arrangement state, the user performs a second pressing operation of: pressing a spot in the display screen 2, for example, a center or an outside area of the ring with a strength equal to or more than a predetermined value; and releasing the finger therefrom. The portable terminal device cancels the control mode in response to the second pressing operation, and returns from the second arrangement state to the first arrangement state.

Incidentally, a position of a center point Q0 may be a user set value or may be a position close to the touch position coordinate in performing the first pressing operation. In the second placement state, the portable terminal device may adjust a size of the ring or each icon 9, partial display of the ring in the display screen 2, or the like in accordance with the number of the icons 9.

[Effects Etc.]

As described above, Embodiment 10 makes it possible to realize an operation of selecting the desired icon 9 in the screen with less time or effort. When the user operates the device with one hand or one finger, when the finger does not reach the desired icon 9 in the first arrangement state in the display screen 2, or when the desired icon 9 is not found, the user switches to the second arrangement state in accordance with the first pressing operation. The user rotates a group of icons 9 in the second arrangement state, and releases the finger when the desired icon 9 reaches a position to be touched by the finger. Alternatively, after temporarily stopping rotation of the icons 9, the desired icon 9 is operated by the touching. This makes it possible to perform the operation of selecting the desired icon 9 and transition to the application screen.

Conventionally, when the finger does not reach the desired icon, the user needs time and effort for changing a state of a hand holding the device, pressing the screen with a finger of another hand, or the like. Embodiment 10 does not require such time or effort, and can easily and quickly select the icon with one hand and one finger. Additionally, the user can adjust the direction and speed of the rotation of the icon in accordance with the pressing strength, the tilt angle, and/or the like, and so can quickly select the desired icon.

As described above, the present invention has been concretely described based on Embodiments. However, the present invention is not limited to Embodiments as mentioned above, and can be variously modified or altered within a range not departing from the gist thereof. Some or all of the functions etc. of the present invention may be realized by hardware such as an integrated circuit, or may be realized by a software program processing(s).

EXPLANATION OF REFERENCE NUMERALS

1 . . . Casing; 2 . . . Display screen; 3 . . . Display information; 4 . . . Display Range; and 5, 6 . . . Scroll.

The invention claimed is:

1. A portable terminal comprising:
a touch panel display displaying information and detecting a touch to the touch panel display; and
a controller executing programs stored in a memory,
wherein the controller is configured to:
generate a home screen that includes icons, and
switch an arrangement state of the icons from a first arrangement state to a second arrangement state by detecting that a strength of a touch pressure is more than a predetermined strength,
wherein in the first arrangement state, the icons are arranged vertically and horizontally in a matrix shape,
wherein in the second arrangement state, the icons are arranged in a circular shape, and
wherein, the controller is further configured to:
while detecting a held touch on the touch panel display in the second arrangement state, rotate the icons along with the circular shape a predetermined time interval, and
upon detecting that the held touch to the touch panel display is released in the second arrangement state, stop rotating the icons and execute a program corresponding to an icon displayed at a predetermined location.

2. The portable terminal according to claim 1,
wherein the controller is further configured to, in the second arrangement state, switch from the second arrangement state to the first arrangement state by detecting a touch to another area of the home screen other than an area where the icons are displayed.

3. The portable terminal according to claim 1,
wherein the controller is further configured to, in the second arrangement state, execute a program corresponding an icon on which the touch pressure is detected.

4. The portable terminal according to claim 1,
wherein a position for detecting the strength of the touch pressure is at any position of the touch panel display.

5. The portable terminal according to claim 1,
wherein the controller is further configured to change the predetermined time interval based on the strength of the touch pressure.

6. The portable terminal according to claim 1,
wherein the controller is further configured to adjust a diameter of the circular shape and a size of each icon based on number of icons to be displayed.

7. The portable terminal according to claim 1,
wherein the controller is further configured to arrange the icons such that top-left icon and bottom-right icon in the matrix shape in the first arrangement state are arranged side by side in the circular shape in the second arrangement state.

8. The portable terminal according to claim 1,
wherein the controller is further configured to change a center position of the circular shape.

9. The portable terminal according to claim 1,
wherein the controller is further configured to change a direction of the rotation in accordance with a position for detecting the strength of the touch pressure.

10. The portable terminal according to claim 1,
wherein the controller is further configured to change a direction of the rotation in accordance with number of contact points detected by the touch panel display.

11. A method executed by a portable terminal including a controller, the method comprising:
displaying, on a touch panel display, information and detecting a touch to the touch panel display;
generating, by a controller, a home screen that includes icons; and
switching, by the controller, an arrangement state of the icons from a first arrangement state to a second arrangement state by detecting that a strength of a touch pressure is more than a predetermined strength,
wherein in the first arrangement state, the icons are arranged vertically and horizontally in a matrix shape, and
wherein in the second arrangement state, the icons are arranged in a circular shape, and
wherein method further includes steps comprising:
while detecting, by the controller, a held touch on the touch panel display in the second arrangement state, rotating the icons along with the circular shape a predetermined time interval; and
upon detecting, by the controller, that the touch to the touch panel display is released in the second arrangement state, stopping of rotating of the icons and executing a program corresponding to an icon displayed at a predetermined location.

12. The method according to claim 11,
wherein the controller is further configured to, in the second arrangement state, switch from the second arrangement state to the first arrangement state by detecting a touch to another area of the home screen other than an area where the icons are displayed.

13. The method according to claim 11,
wherein the controller is further configured to, in the second arrangement state, execute a program corresponding an icon on which the touch pressure is detected.

14. The method according to claim 11,
wherein a position for detecting the strength of the touch pressure is at any position of the touch panel display.

15. The method according to claim 11,
wherein the controller is further configured to change the predetermined time interval based on the strength of the touch pressure.

16. The method according to claim 11,
wherein the controller is further configured to adjust a diameter of the circular shape and a size of each icon based on number of icons to be displayed.

17. The method according to claim 11,
wherein the controller is further configured to arrange the icons such that top-left icon and bottom-right icon in the matrix shape in the first arrangement state are arranged side by side in the circular shape in the second arrangement state.

18. The method according to claim 11,
wherein the controller is further configured to change a center position of the circular shape.

19. The method according to claim 11,
wherein the controller is further configured to change a direction of the rotation in accordance with a position for detecting the strength of the touch pressure.

20. The method according to claim 11,
wherein the controller is further configured to change a direction of the rotation in accordance with number of contact points detected by the touch panel display.

* * * * *